(12) United States Patent
Murphy

(10) Patent No.: US 10,452,264 B2
(45) Date of Patent: Oct. 22, 2019

(54) SYSTEMS AND METHODS FOR WORD IDENTIFICATION THAT USE BUTTON PRESS TYPE ERROR ANALYSIS

(71) Applicant: Michael William Murphy, Bellingham, WA (US)

(72) Inventor: Michael William Murphy, Bellingham, WA (US)

( * ) Notice: Subject to any disclaimer, the term of this patent is extended or adjusted under 35 U.S.C. 154(b) by 628 days.

(21) Appl. No.: 15/139,858

(22) Filed: Apr. 27, 2016

(65) Prior Publication Data
US 2016/0321236 A1 Nov. 3, 2016

Related U.S. Application Data

(60) Provisional application No. 62/155,372, filed on Apr. 30, 2015.

(51) Int. Cl.
| | | |
|---|---|---|
| *G06F 3/0489* | (2013.01) | |
| *G06F 17/24* | (2006.01) | |
| *G06F 17/17* | (2006.01) | |
| *G06F 3/02* | (2006.01) | |
| *G06F 3/023* | (2006.01) | |
| *G06F 3/0484* | (2013.01) | |

(Continued)

(52) U.S. Cl.
CPC ........ *G06F 3/04895* (2013.01); *G06F 3/0219* (2013.01); *G06F 3/0236* (2013.01); *G06F 3/04847* (2013.01); *G06F 9/451* (2018.02); *G06F 17/24* (2013.01); *G06F 17/273* (2013.01)

(58) Field of Classification Search
CPC ...................................... G06F 3/016

USPC .......................................... 715/773, 763–765
See application file for complete search history.

(56) References Cited

U.S. PATENT DOCUMENTS

| | | |
|---|---|---|
| 4,481,508 A | 11/1984 | Kamei et al. |
| 4,912,462 A | 3/1990 | Washizuka et al. |
| 5,202,961 A | 4/1993 | Mills et al. |

(Continued)

FOREIGN PATENT DOCUMENTS

| | | |
|---|---|---|
| WO | 01/49503 A1 | 7/2001 |
| WO | 2014/006639 A1 | 1/2014 |
| WO | 2014/062525 A1 | 4/2014 |

OTHER PUBLICATIONS

International Search Report and Written Opinion, dated Aug. 8, 2016, for corresponding International Application No. PCT/US2016/029611, 10 pages.

(Continued)

*Primary Examiner* — Cao H Nguyen
(74) *Attorney, Agent, or Firm* — Seed IP Law Group LLP

(57) ABSTRACT

Systems, devices and methods are disclosed for error correction in text input systems that use time-dependent button presses. A frequent error type in time-based text input is errors due to inaccurately timed button presses. The result of mistimed button presses is errant button press types within a button press type sequence. An error correction algorithm identifies possible alternative button press type sequences based on the number of button presses in the sequence. The algorithm converts the alternative button press type sequences to alternative character sequences using the received button press value sequence. The algorithm compares the alternative character sequences and the presumed word with a library of known words to determine the word most likely intended by a user.

20 Claims, 42 Drawing Sheets

| NUMBER OF BUTTON PRESSES IN SEQUENCE | 1 | 2 | 3 | 4 | 5 | 6 | ~392 |
|---|---|---|---|---|---|---|---|
| NUMBER OF ALTERNATE BPT SEQUENCES POSSIBLE | 1 | 4 | 11 | 28 | 69 | 168 | |

(51) Int. Cl.
*G06F 9/451* (2018.01)
*G06F 17/27* (2006.01)

(56) References Cited

U.S. PATENT DOCUMENTS

| | | | |
|---|---|---|---|
| 6,011,542 A | 1/2000 | Durrani et al. | |
| 6,271,835 B1 | 8/2001 | Hoeksma | |
| 6,278,384 B1 | 8/2001 | Ide | |
| 6,292,179 B1 | 9/2001 | Lee | |
| 6,295,052 B1 | 9/2001 | Kato et al. | |
| 6,597,345 B2 | 7/2003 | Hirshberg | |
| 6,799,303 B2 | 9/2004 | Blumberg | |
| 7,088,340 B2 | 8/2006 | Kato | |
| 7,218,249 B2 | 5/2007 | Chadha | |
| 7,256,769 B2 | 8/2007 | Pun et al. | |
| 7,382,358 B2 | 7/2008 | Kushler et al. | |
| 7,424,683 B2 | 9/2008 | Van Leeuwen | |
| 7,555,732 B2 | 6/2009 | Van der Hoeven | |
| 7,721,968 B2 * | 5/2010 | Wigdor | G01C 9/00 235/472.01 |
| 7,793,228 B2 | 9/2010 | Mansfield et al. | |
| 8,011,542 B2 | 9/2011 | Gandy et al. | |
| 8,316,319 B1 | 11/2012 | Patel et al. | |
| 8,416,217 B1 | 4/2013 | Eriksson et al. | |
| 8,487,877 B2 | 7/2013 | Murphy | |
| 8,576,184 B2 * | 11/2013 | Arrasvuori | G06F 17/30274 345/173 |
| 8,896,543 B2 | 11/2014 | Ettinger | |
| 8,988,353 B2 | 3/2015 | Shin | |
| 2002/0180622 A1 | 12/2002 | Lui et al. | |
| 2003/0023473 A1 | 1/2003 | Guyan et al. | |
| 2003/0095104 A1 | 5/2003 | Kandogan et al. | |
| 2003/0193478 A1 | 10/2003 | Ng et al. | |
| 2005/0043949 A1 | 2/2005 | Roth et al. | |
| 2005/0060138 A1 | 3/2005 | Wang et al. | |
| 2006/0019717 A1 | 1/2006 | Gong | |
| 2006/0066583 A1 | 3/2006 | Toutonghi et al. | |
| 2006/0016135 A1 | 6/2006 | Ure | |
| 2006/0119582 A1 | 6/2006 | Ng et al. | |
| 2006/0202865 A1 | 9/2006 | Nguyen | |
| 2006/0213754 A1 | 9/2006 | Jarrett et al. | |
| 2006/0290536 A1 | 12/2006 | Tzeng | |
| 2008/0291059 A1 | 11/2008 | Longe | |
| 2008/0316065 A1 | 12/2008 | Maber | |
| 2009/0201252 A1 | 8/2009 | Lee | |
| 2010/0120469 A1 | 5/2010 | Mousseau et al. | |
| 2010/0257478 A1 | 10/2010 | Longe et al. | |
| 2010/0271241 A1 | 10/2010 | Weller et al. | |
| 2010/0333011 A1 | 12/2010 | Kornev et al. | |
| 2011/0009813 A1 * | 1/2011 | Rankers | G06F 19/00 604/66 |
| 2011/0032200 A1 | 2/2011 | Park et al. | |
| 2011/0163973 A1 | 7/2011 | Ording et al. | |
| 2011/0167375 A1 | 7/2011 | Kocienda | |
| 2011/0304483 A1 | 12/2011 | Moon | |
| 2011/0304550 A1 * | 12/2011 | Romera Jolliff | G06F 3/016 345/168 |
| 2012/0047453 A1 * | 2/2012 | Hale | G06F 3/04886 715/773 |
| 2012/0062465 A1 | 3/2012 | Spetalnick | |
| 2012/0102401 A1 | 4/2012 | Ijas et al. | |
| 2012/0306747 A1 | 12/2012 | Davidson et al. | |
| 2012/0306754 A1 | 12/2012 | Jeong | |
| 2013/0021252 A1 | 1/2013 | Lu et al. | |
| 2013/0021258 A1 | 1/2013 | Salman et al. | |
| 2013/0046544 A1 | 2/2013 | Kay et al. | |
| 2013/0120274 A1 | 5/2013 | Ha et al. | |
| 2013/0187831 A1 | 7/2013 | Sirpal et al. | |
| 2013/0194191 A1 | 8/2013 | Bradford et al. | |
| 2013/0278506 A1 | 10/2013 | Murphy | |
| 2014/0049477 A1 | 2/2014 | Dai et al. | |
| 2014/0173522 A1 | 6/2014 | Murphy | |
| 2016/0063036 A1 | 3/2016 | Kawai | |
| 2017/0118383 A1 | 4/2017 | Bollman et al. | |
| 2017/0199661 A1 | 7/2017 | Murphy | |

OTHER PUBLICATIONS

International Search Report and Written Opinion, dated Aug. 10, 2016, for corresponding International Application No. PCT/US2016/029614, 11 pages.

Murphy, "Method of Character Identification That Uses Button Press Types," U.S. Appl. No. 14/701,417, filed Apr. 30, 2015, 56 pages.

Extended European Search Report, dated Feb. 18, 2015, for corresponding European Application No. 11168711.7-1959/2395415, 7 pages.

International Search Report and Written Opinion, dated May 11, 2016, for corresponding International Application No. PCT/US2015/058654, 11 pages.

Murphy, "Novel Character Specification System and Method That Uses a Limited Number of Selection Keys," U.S. Appl. No. 14/511,064, filed Oct. 9, 2014, 70 pages.

Murphy, "Improved Method of Word Identification That Uses an Array Variable," U.S. Appl. No. 15/139,872, filed Apr. 27, 2016, 62 pages.

Murphy, "Improved Method of Word Identification That Uses Interspersed Time-Independent Selection Keys," U.S. Appl. No. 15/139,862, filed Apr. 27, 2016, 56 pages.

Murphy, "Method and System of Multi-Variable Character Input," U.S. Appl. No. 15/139,866, filed Apr. 27, 2016, 84 pages.

Murphy, "Systems, Methods and Devices for Input of Characters With Optional Time-Based Button Taps," U.S. Appl. No. 14/627,822, filed Feb. 20, 2015, 38 pages.

* cited by examiner

ALL POSSIBLE ERRORS IN TIMING FOR EACH BPT

| CASE NO. | INTENDED BUTTON PRESS TYPE (400) | | ERRANT BUTTON PRESS TYPE (402) | EXPLANATION; HOW IT HAPPENS (404) |
|---|---|---|---|---|
| 1. | SHORT | > | LONG | IF BUTTON RELEASE OCCURS AFTER ETP EXPIRES INSTEAD OF BEFORE |
| 2. | LONG | > | SHORT | IF BUTTON RELEASE OCCURS BEFORE ETP EXPIRES INSTEAD OF AFTER |
| 3. | SHORT, LONG | > | PAIR | IF ONSET OF SECOND PRESS OCCURS BEFORE ETP EXPIRES INSTEAD OF AFTER |
| 4. | LONG, SHORT | > | PAIR | IF ONSET OF SECOND PRESS OCCURS BEFORE ETP EXPIRES INSTEAD OF AFTER |
| 5. | SHORT, SHORT | > | PAIR | IF ONSET OF SECOND PRESS OCCURS BEFORE ETP EXPIRES INSTEAD OF AFTER |
| 6. | LONG, LONG | > | PAIR | IF ONSET OF SECOND PRESS OCCURS BEFORE ETP EXPIRES INSTEAD OF AFTER |
| 7. | PAIR | > | SHORT, SHORT | IF ONSET OF SECOND PRESS OCCURS AFTER ETP EXPIRES INSTEAD OF BEFORE |
| 8. | PAIR | > | LONG, LONG | IF ONSET OF SECOND PRESS OCCURS AFTER ETP EXPIRES INSTEAD OF BEFORE AND BOTH PRESSES HELD UNTIL EXPIRATION |
| 9. | PAIR | > | LONG, SHORT | IF ONSET OF SECOND PRESS OCCURS AFTER ETP EXPIRES INSTEAD OF BEFORE AND THE FIRST PRESS IS HELD UNTIL EXPIRATION |
| 10. | PAIR | > | SHORT, LONG | IF ONSET OF SECOND PRESS OCCURS AFTER ETP EXPIRES INSTEAD OF BEFORE AND IS HELD UNTIL EXPIRATION |

*FIG. 13*

ALL POSSIBLE BPT SEQUENCES FOR 4-BUTTON-PRESS WORD

SHORT - SHORT - SHORT - SHORT
SHORT - SHORT - SHORT - LONG
SHORT - SHORT - LONG - SHORT
SHORT - LONG - SHORT - SHORT
LONG - SHORT - SHORT - SHORT
SHORT - SHORT - LONG - LONG
SHORT - LONG - LONG - SHORT
LONG - LONG - SHORT - SHORT
SHORT - LONG - LONG - LONG
LONG - LONG - LONG - SHORT
LONG - LONG - SHORT - LONG
LONG - SHORT - LONG - LONG
LONG - SHORT - SHORT - LONG
LONG - SHORT - LONG - SHORT
SHORT - LONG - SHORT - LONG

LONG - LONG - LONG - LONG
SHORT - SHORT - PAIR
SHORT - LONG - PAIR
LONG - SHORT - PAIR
LONG - LONG - PAIR
SHORT - PAIR - SHORT
SHORT - PAIR - LONG
LONG - PAIR - SHORT
LONG - PAIR - LONG
PAIR - SHORT - SHORT
PAIR - SHORT - LONG
PAIR - LONG - SHORT
PAIR - LONG - LONG

PAIR - PAIR

| 397 CASE NO. | INTENDED BUTTON PRESS TYPE | ERRANT BUTTON PRESS TYPE | EXPLANATION; HOW IT HAPPENS — 404 | LIKELIHOOD TO OCCUR IN ACTUAL USE — 406 |
|---|---|---|---|---|
| 1. | SHORT | > LONG | IF BUTTON RELEASE OCCURS AFTER ETP EXPIRES INSTEAD OF BEFORE | LOW |
| 2. | LONG | > SHORT | IF BUTTON RELEASE OCCURS BEFORE ETP EXPIRES INSTEAD OF AFTER | HIGH |
| 3. | SHORT, LONG | > PAIR | IF ONSET OF SECOND PRESS OCCURS BEFORE ETP EXPIRES INSTEAD OF AFTER | HIGH ⎫ 409 |
| 4. | LONG, SHORT | > PAIR | IF ONSET OF SECOND PRESS OCCURS BEFORE ETP EXPIRES INSTEAD OF AFTER | HIGH ⎬ |
| 5. | SHORT, SHORT | > PAIR | IF ONSET OF SECOND PRESS OCCURS BEFORE ETP EXPIRES INSTEAD OF AFTER | HIGH ⎭ |
| 6. | LONG, LONG | > PAIR | IF ONSET OF SECOND PRESS OCCURS BEFORE ETP EXPIRES INSTEAD OF AFTER | LOW ⎫ 407 |
| 7. | PAIR | > SHORT, SHORT | IF ONSET OF SECOND PRESS OCCURS AFTER ETP EXPIRES INSTEAD OF BEFORE | LOW ⎬ |
| 8. | PAIR | > LONG, LONG | IF ONSET OF SECOND PRESS OCCURS AFTER ETP EXPIRES INSTEAD OF BEFORE AND BOTH PRESSES HELD UNTIL EXPIRATION | LOW ⎭ |
| 9. | PAIR | > LONG, SHORT | IF ONSET OF SECOND PRESS OCCURS AFTER ETP EXPIRES INSTEAD OF BEFORE AND THE FIRST PRESS IS HELD UNTIL EXPIRATION | LOW |
| 10. | PAIR | > SHORT, LONG | IF ONSET OF SECOND PRESS OCCURS AFTER ETP EXPIRES INSTEAD OF BEFORE AND IS HELD UNTIL EXPIRATION | LOW |

FIG. 27

| 397 ⇲ CASE NO. | 408 ⇲ RANK (MOST TO LEAST LIKELY) | 400 ⇲ INTENDED BUTTON PRESS TYPE | 402 ⇲ ERRANT BUTTON PRESS TYPE | 404 ⇲ EXPLANATION: HOW IT HAPPENS |
|---|---|---|---|---|
| 2. | 1 | LONG | > SHORT | IF BUTTON RELEASE OCCURS BEFORE ETP EXPIRES INSTEAD OF AFTER |
| 5. | 2 | SHORT, SHORT | > PAIR | IF ONSET OF SECOND PRESS OCCURS BEFORE ETP EXPIRES INSTEAD OF AFTER |
| 3. | 3 | SHORT, LONG | > PAIR | IF ONSET OF SECOND PRESS OCCURS BEFORE ETP EXPIRES INSTEAD OF AFTER |
| 4. | 4 | LONG, SHORT | > PAIR | IF ONSET OF SECOND PRESS OCCURS BEFORE ETP EXPIRES INSTEAD OF AFTER |
| 6. | 5 | LONG, LONG | > PAIR | IF ONSET OF SECOND PRESS OCCURS BEFORE ETP EXPIRES INSTEAD OF AFTER |
| 1. | 6 | SHORT | > LONG | IF BUTTON RELEASE OCCURS AFTER ETP EXPIRES INSTEAD OF BEFORE |
| 7. | 7 | PAIR | > SHORT, SHORT | IF ONSET OF SECOND PRESS OCCURS AFTER ETP EXPIRES INSTEAD OF BEFORE |
| 9. | 8 | PAIR | > LONG, SHORT | IF ONSET OF SECOND PRESS OCCURS AFTER ETP EXPIRES INSTEAD OF BEFORE AND THE FIRST PRESS IS HELD UNTIL EXPIRATION |
| 10. | 9 | PAIR | > SHORT, LONG | IF ONSET OF SECOND PRESS OCCURS AFTER ETP EXPIRES INSTEAD OF BEFORE AND IS HELD UNTIL EXPIRATION |
| 8. | 10 | PAIR | > LONG, LONG | IF ONSET OF SECOND PRESS OCCURS AFTER ETP EXPIRES INSTEAD OF BEFORE AND BOTH PRESSES HELD UNTIL EXPIRATION |

*FIG. 32*

INDIVIDUAL BUTTON PRESS ERRORS THAT LEAD TO EACH
POSSIBLE ERRANT BPT FOR SEVERAL 3-PRESS BPT SEQUENCES

SSL

| BPT SEQUENCE | INTENDED BPT | ERRANT BPT | ERROR CASE |
|---|---|---|---|
| SSS | S | L | 1 |
| PL | P | SS | 7 |
| SP | P | SL | 10 |
| SLL | L | S | 2 |
| LSL | L | S | 2 |
| PS | P,S | SS,L | 7,1 |
| SLS | L,S | S,L | 2,1 |
| LSS | L,S | S,L | 2,1 |
| LP | L,P | S,SL | 2,10 |
| LLL | L,L | S,S | 2,2 |
| LLS | L,L,S | S,S,L | 2,2,1 |

SLS

| BPT SEQUENCE | INTENDED BPT | ERRANT BPT | ERROR CASE |
|---|---|---|---|
| SSS | S | L | 1 |
| PS | P | SL | 10 |
| SP | P | LS | 9 |
| SLL | L | S | 2 |
| LLS | L | S | 2 |
| SSL | S,L | L,S | 1,2 |
| LSS | L,S | S,L | 2,1 |
| PL | P,L | SL,S | 10,2 |
| LP | L,P | S,LS | 2,9 |
| LLL | L,L | S,S | 2,2 |
| LSL | L,L,S | S,L,S | 2,1,2 |

LSL

| BPT SEQUENCE | INTENDED BPT | ERRANT BPT | ERROR CASE |
|---|---|---|---|
| LSS | S | L | 1 |
| SSL | S | L | 1 |
| LP | P | SL | 10 |
| PL | P | LS | 9 |
| LLL | L | S | 2 |
| SSS | S,S | L,L | 1,1 |
| SP | S,P | L,SL | 1,10 |
| PS | P,S | LS,L | 9,1 |
| LLS | S,L | S,L | 2,1 |
| SLL | S,L | L,S | 1,2 |
| SLS | L,S,L | L,S,L | 1,2,1 |

FIG. 33

ALTERNATIVE BPT SEQUENCES FOR EACH POSSIBLE 2-PRESS BPT SEQUENCE RANKED ACCORDING TO LIKELIHOOD OF OCCURRENCE (ACCORDING TO RANKING OF FIGURE 32; ALTERNATIVE RANKINGS CAN EXIST DEPENDING ON RANKING CRITERIA)

SS (382)

| BPT SEQUENCE | ERROR RANK |
|---|---|
| SL | 1 |
| LS | 1 |
| P | 7 |
| LL | 1,1 |

SL (420 / 408)

| BPT SEQUENCE | ERROR RANK |
|---|---|
| LL | 1 |
| SS | 6  (454) |
| P | 9 |
| LS | 1,6 |

{ 425

LS (420 / 408)

| BPT SEQUENCE | ERROR RANK |
|---|---|
| LL | 1 |
| SS | 6 |
| P | 8 |
| SL | 6,1 |

{ 425

LL

| BPT SEQUENCE | ERROR RANK |
|---|---|
| LS | 6 |
| SL | 6 |
| P | 10 |
| SS | 6,6 |

{ 425

P

| BPT SEQUENCE | ERROR RANK |
|---|---|
| SS | 2 |
| SL | 3 |
| LS | 4 |
| LL | 5 |

ALTERNATIVE BPT SEQUENCES FOR EACH POSSIBLE 3-PRESS BPT SEQUENCE RANKED ACCORDING TO LIKELIHOOD OF OCCURRENCE (ACCORDING TO RANKING OF FIGURE 32; ALTERNATIVE RANKINGS CAN EXIST DEPENDING ON RANKING CRITERIA)

| SSS | | SSL | | SLS | | LSS | | SLL | | LLS | |
|---|---|---|---|---|---|---|---|---|---|---|---|
| BPT SEQUENCE | ERROR RANK | BPT SEQUENCE | ERROR RANK | BPT SEQUENCE | ERROR RANK | BPT SEQUENCE | ERROR RANK | BPT SEQUENCE | ERROR RANK | BPT SEQUENCE | ERROR RANK |
| SSL | 1 | SLL | 1 | SLL | 1 | LSL | 1 | SSL | 1 | LLL | 1 |
| SLS | 1 | LSL | 1 | LLS | 1 | LLS | 1 | LLL | 1 | LSS | 6 |
| LSS | 1 | SSS | 6 | SSS | 6 | SSS | 6 | SLS | 6 | SLS | 6 |
| SP | 7 | PL | 7 | SP | 8 | LP | 7 | PL | 9 | LP | 8 |
| PS | 7 | SP | 9 | PS | 9 | PS | 8 | SP | 10 | PS | 10 |
| SLL | 1,1 | LLL | 1,1 | LLL | 1,1 | LLL | 1,1 | LLS | 1,6 | LSL | 6,1 |
| LLS | 1,1 | SLS | 1,6 | SSL | 6,1 | SSL | 6,1 | LSL | 1,6 | SLL | 6,1 |
| LSL | 1,1 | LSS | 1,6 | LSS | 1,6 | SLS | 1,6 | LP | 1,10 | PL | 10,1 |
| LP | 1,7 | LP | 1,9 | LP | 1,8 | PL | 8,1 | SSS | 6,6 | SSS | 6,6 |
| PL | 7,1 | PS | 7,6 | PL | 9,1 | SP | 6,7 | PS | 9,6 | SP | 6,8 |
| LLL | 1,1,1 | LLS | 1,1,6 | LSL | 1,1,6 | SLL | 6,1,1 | LSS | 1,1,6 | SSL | 6,6,1 |

ALTERNATIVE BPT SEQUENCES FOR EACH POSSIBLE 3-PRESS BPT SEQUENCE RANKED ACCORDING TO LIKELIHOOD OF OCCURRENCE (CON'T FROM FIGURE 35)

*(ACCORDING TO RANKING OF FIGURE 32; ALTERNATIVE RANKINGS CAN EXIST DEPENDING ON RANKING CRITERIA)*

| | LSL | | LLL | | SP | | LP | | PS | | PL | |
|---|---|---|---|---|---|---|---|---|---|---|---|---|
| | BPT SEQUENCE | ERROR RANK | BPT SEQUENCE | ERROR RANK | BPT SEQUENCE | ERROR RANK | BPT SEQUENCE | ERROR RANK | BPT SEQUENCE | ERROR RANK | BPT SEQUENCE | ERROR RANK |
| | LLL | 1 | LLS | 6 | LP | 1 | LSS | 2 | PL | 1 | SSL | 2 |
| | LSS | 6 | LSL | 6 | SSS | 2 | LSL | 3 | SSS | 2 | SLL | 3 |
| | SSL | 6 | SLL | 6 | SSL | 3 | LLS | 4 | SLS | 3 | LSL | 4 |
| | PL | 8 | LP | 10 | SLS | 4 | LLL | 5 | LSS | 4 | LLL | 5 |
| | LP | 9 | PL | 10 | SLL | 5 | SP | 6,2 | SSL | 2,1 | PS | 6 |
| | LLS | 1,6 | LSS | 6,6 | LSS | 1,2 | SSS | 6,3 | SLL | 3,1 | SSS | 2,6 |
| | SLL | 6,1 | SSL | 6,6 | LSL | 1,3 | SSL | 6,4 | LSL | 4,1 | SLS | 3,6 |
| | SSS | 6,6 | SLS | 6,6 | LLS | 1,4 | SLS | 6,5 | LLL | 5,1 | LSS | 4,6 |
| | PS | 8,6 | PS | 10,6 | LLL | 1,5 | PS | | SP | | LLS | 5,6 |
| | SP | 6,9 | SP | 6,10 | PS | | PL | | LP | | SP | |
| | SLS | 6,6,1 | SSS | 6,6,6 | PL | | | | | | LP | |

*FIG. 36*

SYSTEMS AND METHODS FOR WORD IDENTIFICATION THAT USE BUTTON PRESS TYPE ERROR ANALYSIS

TECHNICAL FIELD

This description generally relates to the field of electronic devices and, more particularly, to user interfaces of electronic devices.

BRIEF SUMMARY

A computer processor-implemented method may be summarized as including: receiving, by at least one computer processor, input resulting from actuation of a plurality of buttons; interpreting, by at least one computer processor, a sequence of button press values and a sequence of button press types from the received input; based on the received input, identifying, by at least one computer processor, one or more alternative sequences of button press types that each has a same number of button actuations as the received input; and converting, by at least one computer processor, the one or more alternative sequences of button press types to corresponding one or more alternative sequences of characters according to the interpreted sequence of button press values.

The computer processor-implemented method may further include: identifying, by at least one computer processor, a presumed word from the interpreted sequence of button press values and the interpreted sequence of button press types; and comparing the presumed word with at least one of the one or more corresponding alternative sequences of characters.

The computer processor-implemented method may further include comparing the presumed word and at least one of the one or more corresponding alternative sequences of characters with a library of known words.

The computer processor-implemented method may further include accepting, by at least one computer processor, one of the corresponding alternative character sequences as input in place of the presumed word.

The computer processor-implemented method may further include separating the one or more identified alternative sequences of button press types into at least two categories based on the likelihood of occurrence according to a chosen criteria and the received input.

The comparing the presumed word with at least one of the one or more corresponding alternative sequences of characters may occur only for the one or more alternative sequences of characters that correspond to alternative sequences of button press types categorized as likely.

The computer processor-implemented method may further include ranking the one or more identified alternative sequences of button press types based on the likelihood of occurrence according to a chosen criteria and the received input.

The comparing the presumed word with at least one of the one or more corresponding alternative sequences of characters may occur in the order that the one or more identified alternative sequences of button presses to which each of the one or more alternative sequences of characters correspond are ranked.

A system may be summarized as including: at least one computer processor; and at least one memory coupled to the at least one computer processor, the at least one memory having computer executable instructions stored thereon that, when executed, cause the at least one processor to perform: interpreting a sequence of button press values and a sequence of button press types from the received input; based on the received input, identifying one or more alternative sequences of button press types that each has a same number of button actuations as the received input; and converting the one or more alternative sequences of button press types to corresponding one or more alternative sequences of characters according to the interpreted sequence of button press values.

The computer executable instructions, when executed, may further cause the at least one processor to perform: identifying a presumed word from the interpreted sequence of button press values and the interpreted sequence of button press types; and comparing the presumed word with at least one of the one or more corresponding alternative sequences of characters. The computer executable instructions, when executed, may further cause the at least one processor to perform comparing the presumed word and at least one of the one or more corresponding alternative sequences of characters with a library of known words. The computer executable instructions, when executed, may further cause the at least one processor to perform accepting one of the corresponding alternative character sequences as input in place of the presumed word. The computer executable instructions, when executed, may further cause the at least one processor to perform separating the one or more identified alternative sequences of button press types into at least two categories based on the likelihood of occurrence according to a chosen criteria and the received input. The comparing the presumed word with at least one of the one or more corresponding alternative sequences of characters may occur only for the one or more alternative sequences of characters that correspond to alternative sequences of button press types categorized as likely.

A non-transitory computer-readable medium may be summarized as having computer executable instructions stored thereon that, when executed, cause at least one processor to perform: interpreting a sequence of button press values and a sequence of button press types from the received input; based on the received input, identifying one or more alternative sequences of button press types that each has a same number of button actuations as the received input; and converting the one or more alternative sequences of button press types to corresponding one or more alternative sequences of characters according to the interpreted sequence of button press values.

The computer executable instructions, when executed, may further cause the at least one processor to perform: identifying a presumed word from the interpreted sequence of button press values and the interpreted sequence of button press types; and comparing the presumed word with at least one of the one or more corresponding alternative sequences of characters. The computer executable instructions, when executed, may further cause the at least one processor to perform comparing the presumed word and at least one of the one or more corresponding alternative sequences of characters with a library of known words. The computer executable instructions, when executed, may further cause the at least one processor to perform accepting one of the corresponding alternative character sequences as input in place of the presumed word. The computer executable instructions, when executed, may further cause the at least one processor to perform separating the one or more identified alternative sequences of button press types into at least two categories based on the likelihood of occurrence according to a chosen criteria and the received input. The comparing the presumed word with at least one of the one or more corresponding alternative sequences of characters may occur only for the one or more alternative sequences of characters that correspond to alternative sequences of button press types categorized as likely.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 13 is a table of error cases of a method to interpret button presses according to one illustrated embodiment.

FIGS. 16-18 are examples of characteristics of a method to interpret button presses according to one illustrated embodiment.

FIG. 27 is a table of error cases of a method to interpret button presses according to one illustrated embodiment.

FIG. 32 is a table of error cases of a method to interpret button presses according to one illustrated embodiment.

FIGS. 33-36 are tables of characteristics of a method to interpret button presses according to one illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks, including various types of telecommunications networks, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Various embodiments are described herein that provide systems, devices and methods for input of characters with optional time-dependent button presses.

Figure 1:
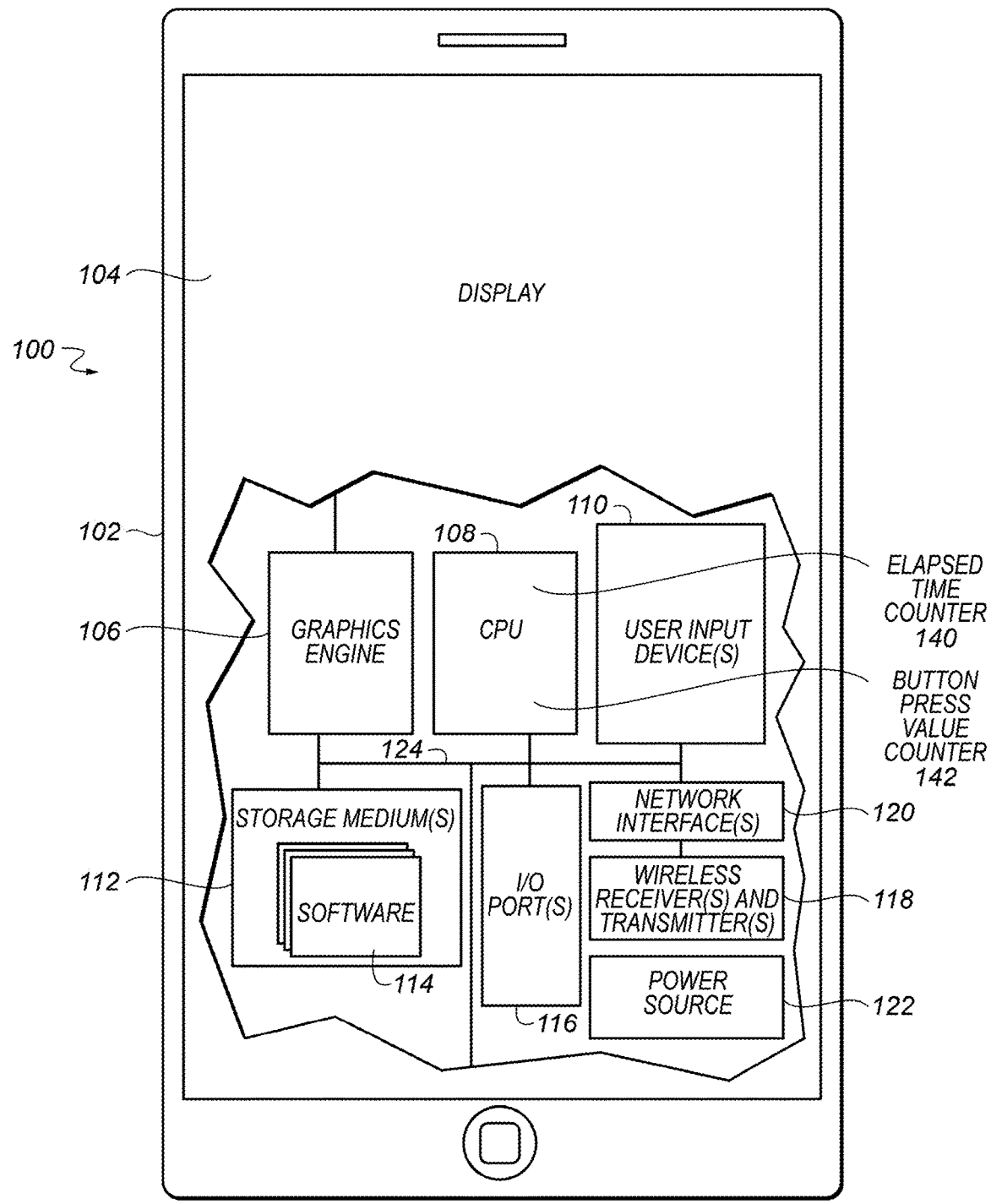
FIG. 1 is a schematic view of an example electronic device for input of characters with optional time-dependent button presses according to one illustrated embodiment, the electronic device being a mobile device having a housing, a display, a graphics engine, a central processing unit (CPU), user input device(s), one or more storage mediums having various software modules thereon that are executable by the CPU, input/output (I/O) port(s), network interface(s), wireless receiver(s) and transmitter(s), a power source, an elapsed time counter and a button press value counter.

For example, FIG. 1 is a schematic view of one example electronic device, in this case mobile device 100, for input of characters with optional time-dependent button presses according to one illustrated embodiment. The mobile device 100 shown in FIG. 1 may have a housing 102, a display 104, a graphics engine 106, a central processing unit (CPU) 108, one or more user input devices 110, one or more storage mediums 112 having various software modules 114 stored thereon comprising instructions that are executable by the CPU 108, input/output (I/O) port(s) 116, one or more wireless receivers and transmitters 118, one or more network interfaces 120, and a power source 122. In some embodiments, some or all of the same, similar or equivalent structure and functionality of the mobile device 100 shown in FIG. 1 and described herein may be that of, part of or operably connected to a communication and/or computing system of another device or machine.

The mobile device 100 may be any of a large variety of communications devices such as a cellular telephone, a smartphone, a wearable device, a wristwatch, a portable media player (PMP), a personal digital assistant (PDA), a mobile communications device, a portable computer with built-in or add-on cellular communications, a portable game console, a global positioning system (GPS), a handheld industrial electronic device, or the like, or any combination thereof. The mobile device 100 has at least one central processing unit (CPU) 108 which may be a scalar processor, a digital signal processor (DSP), a reduced instruction set (RISC) processor, or any other suitable processor. The central processing unit (CPU) 108, display 104, graphics engine 106, one or more user input devices 110, one or more storage mediums 112, input/output (I/O) port(s) 116, one or more wireless receivers and transmitters 118, and one or more network interfaces 120 may all be communicatively connected to each other via a system bus 124. The system bus 124 can employ any suitable bus structures or architectures, including a memory bus with memory controller, a peripheral bus, and/or a local bus.

The mobile device 100 also includes one or more volatile and/or non-volatile storage medium(s) 112. The storage mediums 112 may be comprised of any single or suitable combination of various types of processor-readable storage media and may store instructions and data acted on by CPU 108. For example, a particular collection of software instructions comprising software 114 and/or firmware instructions comprising firmware are executed by CPU 108. The software or firmware instructions generally control many of the operations of the mobile device 100 and a subset of the software and/or firmware instructions may perform functions to operatively configure hardware and other software in the mobile device 100 to provide the initiation, control and maintenance of applicable computer network and telecommunication links from the mobile device 100 to other devices using the wireless receiver(s) and transmitter(s) 118, network interface(s) 120, and/or I/O ports 116.

The CPU 108 includes an elapsed time counter 140. The elapsed time counter 140 may be implemented using a timer circuit operably connected to or as part of the CPU 108. Alternately some or all of the elapsed time counter 140 may be implemented in computer software as computer executable instructions stored on volatile and/or non-volatile storage medium(s) 112, for example, that when executed by CPU 108 or a processor of a timer circuit, performs the functions described herein of the elapsed time counter 140.

The CPU 108 includes a button press value counter 142. Alternately, some or all of the button press value counter 142 may be implemented in computer software as computer executable instructions stored on volatile and/or non-volatile storage medium(s) 112, for example, that when executed by CPU 108, performs the functions described herein of the button press value counter 142.

By way of example, and not limitation, the storage medium(s) 112 may be processor-readable storage media which may comprise any combination of computer storage media including volatile and nonvolatile, removable and non-removable media implemented in any method or technology for storage of information such as computer readable instructions, data structures, program modules or other data. Combinations of any of the above should also be included within the scope of processor-readable storage media.

The storage medium(s) 112 may include system memory which includes computer storage media in the form of volatile and/or nonvolatile memory such as read-only memory (ROM) and random access memory (RAM). A basic input/output system (BIOS), containing the basic routines that help to transfer information between elements within mobile device 100, such as during start-up or power-on, is typically stored in ROM. RAM typically contains data and/or program modules that are immediately accessible to and/or presently being operated on by CPU 108. By way of example, and not limitation, FIG. 1 illustrates software modules 114 including an operating system, application programs and other program modules that implement the processes and methods described herein.

The mobile device 100 may also include other removable/non-removable, volatile/nonvolatile computer storage media drives. By way of example only, the storage medium(s) 112 may include a hard disk drive or solid state storage drive that reads from or writes to non-removable, nonvolatile media, a SSD that reads from or writes to a removable, nonvolatile SSD, and/or an optical disk drive that reads from or writes to a removable, nonvolatile optical disk such as a DVD-RW or other optical media. Other removable/non-removable, volatile/nonvolatile computer storage media that can be used in an operating environment of the mobile device 100 include, but are not limited to, flash memory cards, other types of digital versatile disks (DVDs), micro-discs, digital video tape, solid state RAM, solid state ROM, and the like. The storage medium(s) are typically connected to the system bus 124 through a non-removable memory interface. The storage medium(s) 112 discussed above and illustrated in FIG. 1 provide storage of computer readable instructions, data structures, program modules and other data for the mobile device 100. In FIG. 1, for example, a storage medium may store software 114 including an operating system, application programs, other program modules, and program data. The storage medium(s) 112 may implement a file system, a flat memory architecture, a database, or any other method or combination capable for storing such information.

A user may enter commands and information into the mobile device 100 through touch screen display 104 or the one or more other input device(s) 110 such as a keypad, keyboard, tactile buttons, camera, motion sensor, position sensor, light sensor, biometric data sensor, accelerometer, or a pointing device, commonly referred to as a mouse, trackball or touch pad. Other input devices of the mobile device 100 may include a microphone, joystick, thumbstick, game pad, optical scanner, other sensors, or the like. These and other input devices are often connected to the CPU 108 through a user input interface that is coupled to the system bus 124, but may be connected by other interface and bus structures, such as a parallel port, serial port, wireless port, game port or a universal serial bus (USB). Generally, a unique software driver stored in software 114 configures each input mechanism to sense user input, and then the software driver provides data points that are acted on by CPU 108 under the direction of other software 114. The display is also connected to the system bus 124 via an interface, such as the graphics engine 106. In addition to the display 104, the mobile device 100 may also include other peripheral output devices such as speakers, a printer, a projector, an external monitor, etc., which may be connected through one or more analog or digital I/O ports 116, network interface(s) 120 or wireless receiver(s) and transmitter(s) 118. The mobile device 100 may operate in a networked environment using connections to one or more remote computers or devices, such as a remote computer or device.

When used in a LAN or WAN networking environment, the mobile device 100 may be connected via the wireless receiver(s) and transmitter(s) 118 and network interface(s) 120, which may include, for example, cellular receiver(s) and transmitter(s), Wi-Fi receiver(s) and transmitter(s), and associated network interface(s). When used in a WAN networking environment, the mobile device 100 may include a modem or other means as part of the network interface(s) for establishing communications over the WAN, such as the Internet. The wireless receiver(s) and transmitter(s) 118 and the network interface(s) 120 may be communicatively connected to the system bus 124. In a networked environment, program modules depicted relative to the mobile device 100, or portions thereof, may be stored in a remote memory storage device of a remote system.

The mobile device 100 has a collection of I/O ports 116 and/or short range wireless receiver(s) and transmitter(s) 118 and network interface(s) 120 for passing data over short distances to and from the mobile device 100 or for coupling additional storage to the mobile device 100. For example, serial ports, USB ports, Wi-Fi ports, Bluetooth® ports, IEEE 1394 (i.e., FireWire), and the like can communicatively couple the mobile device 100 to other computing apparatuses. Compact Flash (CF) ports, Secure Digital (SD) ports, and the like can couple a memory device to the mobile device 100 for reading and writing by the CPU 108 or couple the mobile device 100 to other communications interfaces such as Wi-Fi or Bluetooth transmitters/receivers and/or network interfaces.

Mobile device 100 also has a power source 122 (e.g., a battery). The power source 122 may supply energy for all the components of the mobile device 100 that require power when a traditional, wired or wireless power source is unavailable or otherwise not connected. Other various suitable system architectures and designs of the mobile device 100 are contemplated and may be utilized which provide the same, similar or equivalent functionality as those described herein.

It should be understood that the various techniques, components and modules described herein may be implemented in connection with hardware, software and/or firmware or, where appropriate, with a combination of such. Thus, the methods and apparatus of the disclosure, or certain aspects or portions thereof, may take the form of program code (i.e., instructions) embodied in tangible media, such as various solid state memory devices, DVD-RW, RAM, hard drives, flash drives, or any other machine-readable or processor-readable storage medium wherein, when the program code is loaded into and executed by a machine, such as a processor of a computer, vehicle or mobile device, the machine becomes an apparatus for practicing various embodiments. In the case of program code execution on programmable computers, vehicles or mobile devices, such generally includes a processor, a storage medium readable by the processor (including volatile and non-volatile memory and/or storage elements), at least one input device, and at least one output device. One or more programs may implement or utilize the processes described in connection with the disclosure, e.g., through the use of an API, reusable controls, or the like. Such programs are preferably implemented in a high level procedural or object oriented programming language to communicate with a computer system of mobile device 100. However, the program(s) can be implemented in assembly or machine language, if desired. In any case, the language may be a compiled or interpreted language, and combined with hardware implementations.

Figure 2:
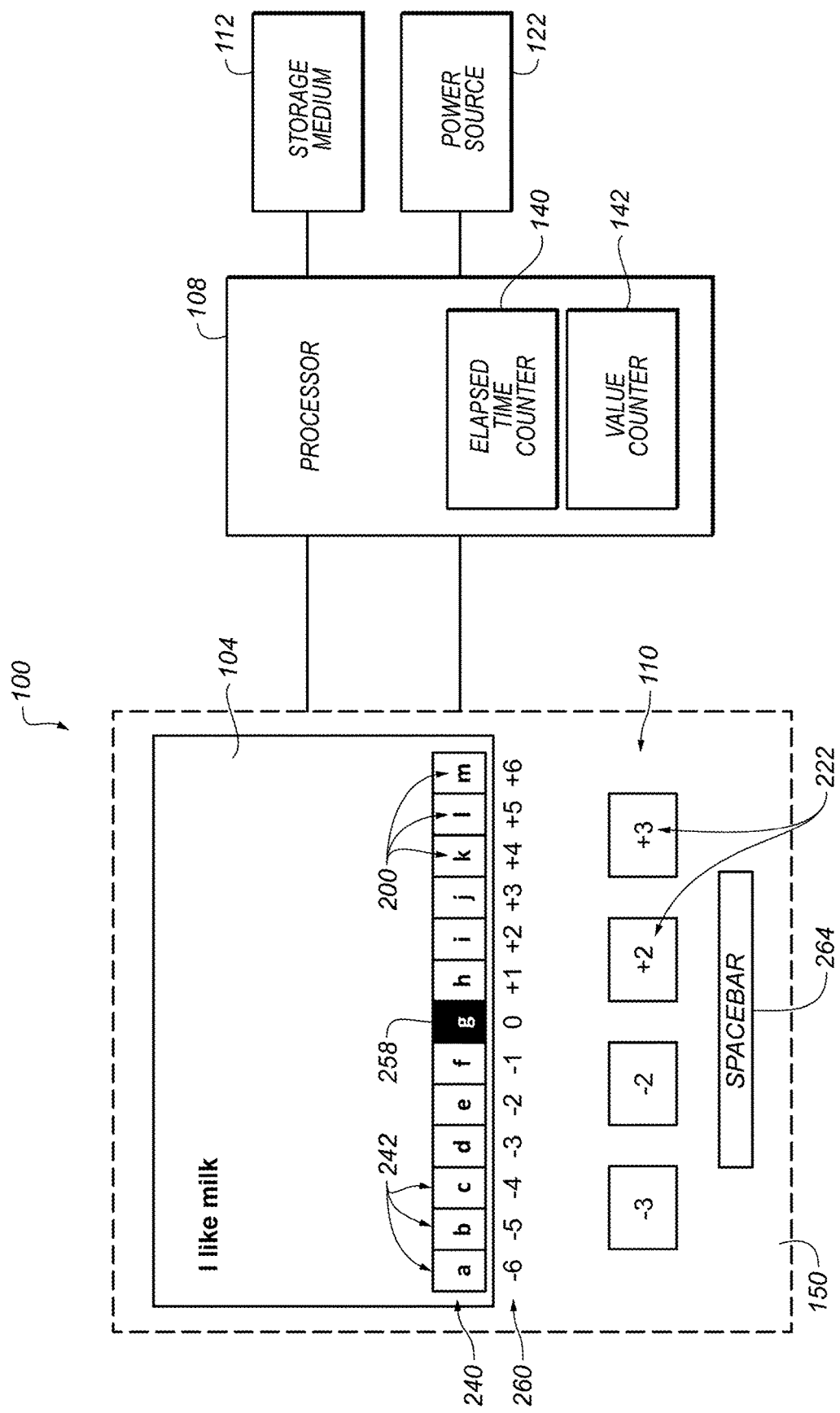
FIG. 2 is a schematic drawing of one embodiment of the electronic device 100 for input of characters. The user interface 150 was previously disclosed in FIG. 8 of U.S. Pat. No. 8,487,877, which is hereby incorporated by reference in its entirety.

FIG. 2 shows a schematic drawing of one embodiment of the electronic device 100 for input of characters. The device 100 may have some or all the components and functionality described herein with respect to the mobile device 100 of FIG. 1. The device 100 has aspects previously disclosed in FIG. 8 of U.S. Pat. No. 8,487,877, which is hereby incorporated by reference in its entirety.

The electronic device 100 includes the display 104, a plurality of characters 200 that populate positions 242 of a character menu 240, a plurality of selection buttons 110 and a spacebar button 264, which together make up a user interface 150 of the device 100. Each of the plurality of selection buttons 110 has an assigned button press value 222. Included as part or within proximity to the menu 240 is a reference 258 and an offset scale 260. The display 104, the plurality of selection buttons 110, and the spacebar button 264 are communicatively coupled with the CPU 108, as described in the embodiment of FIG. 1. The CPU 108 includes the elapsed time counter 140 and the button press value counter 142, as described in the embodiment of FIG. 1. The CPU 108 is communicatively coupled with the storage medium 112 and the power source 122, as described in the embodiment of FIG. 1.

Figure 8:
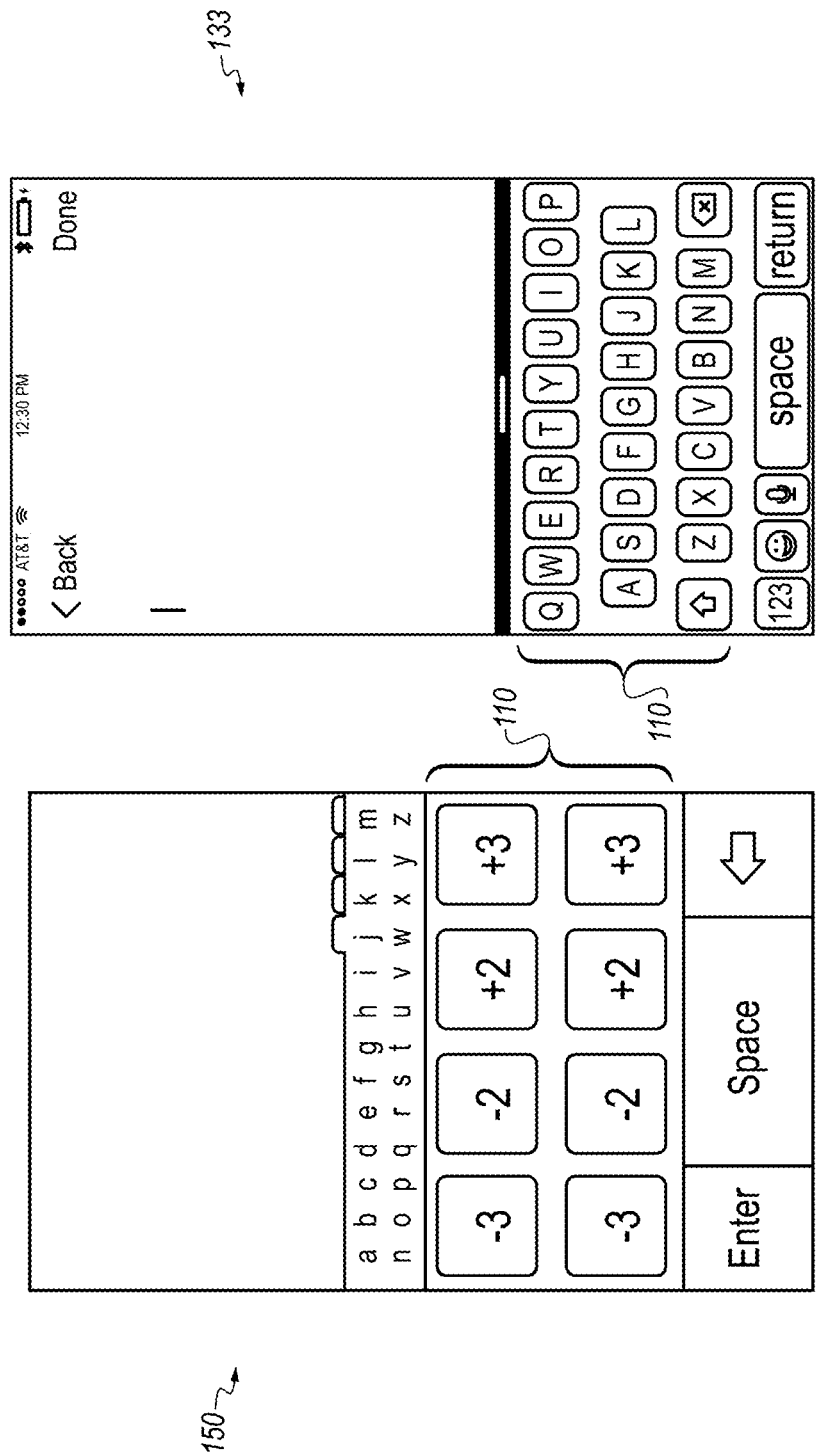
FIG. 8 is an embodiment of two different user interfaces for methods to input characters.

In the embodiment of FIG. 2, the positions 242 of the menu 240 are arranged in a one-dimensional array similar to the embodiment in FIG. 8 of U.S. Pat. No. 8,487,877, with the exception that the menu 240 is shown on the display 104 instead of as a physical feature of the user interface 150. The plurality of selection buttons 110 can be either hard keys (physical buttons) or soft keys (buttons shown on the display 104). In the embodiment of FIG. 2, the selection buttons 110 are shown as physical buttons. In either case, the buttons 110 are communicatively coupled with the CPU 108.

The menu 240 and the offset scale 260 are positioned in respective one-dimensional arrays on the user interface 150 of the device 100. In one embodiment the character menu 240 and the offset scale 260 are positioned on the user interface 150 so that they lie adjacent to and parallel with one other. In one embodiment, the character menu 240 and the offset scale 260 are programmed in software so that they appear as features on the display 104 of the device 100.

In one embodiment, positions 242 of the menu 240 are distributed in a one-dimensional array in evenly spaced increments. In a further embodiment, values of the offset scale 260 are distributed in a one-dimensional array in spatial increments that match the increment of the menu 240, so that by referencing the offset scale 260 to the menu 240, characters 200 in the menu are effectively numbered.

The reference 258 is an indicator located near or on one of the positions 242 of the menu 240. The offset scale 260 includes a value of zero that is located to correspond with the reference 258 of the menu 240. Values of the offset scale 260 increase from zero in pre-selected increments as positions of the offset scale get farther from the zero value. In a further embodiment, values of the offset scale 260 decrease from zero in pre-selected increments as positions of the offset scale get farther from the zero value in a direction opposite to the increasing direction. In one embodiment, the pre-selected increment of the offset scale 260 equals one and the values of the offset scale extend from a negative value to a positive value passing through zero. In an alternative embodiment, the increment of the offset scale 260 is 10 and positions 242 of the menu 240 are marked off in corresponding units of 10.

In one specific embodiment, the positions 242 of the menu 240 and the values of the offset scale 260 are distributed in respective one-dimensional arrays positioned adjacent to and parallel with one another, the values of the offset scale 260 count in increments of one and are spaced with respect to one another in their array to correspond with the spacing of positions 242 of the menu 240, and the zero value of the offset scale 260 corresponds to the reference 258 of the menu 240 so that the values of the offset scale 260 label the positions of the menu 240 according to how many positions a given position 242 of the menu 240 is offset from the reference 258.

The plurality of selection buttons 110 lie on the user interface 150 of the device 100 and, as described above, can be either hard or soft keys. In one embodiment, the buttons 110 are arranged in a row that corresponds to the physical alignment of the menu 240 on the user interface. Each button is communicatively coupled with the CPU 108 and is assigned a button press value 222. The assigned button press value 222 can be either positive or negative. Each button 110 has the function that when the button is pressed the value 222 assigned to the button is input to the CPU 108. In one embodiment, the assigned button press value 222 of each selection button is unique. In another embodiment there are four selection buttons and the buttons' assigned values are −3, −2, +2, and +3. In another embodiment there are four selection buttons and the buttons' assigned values are −3, −1, +1, and +3.

The space bar also lies on the user interface 150 of the device 100, can be either a hard or soft key, and is communicatively coupled with the CPU 108.

Figure 3:
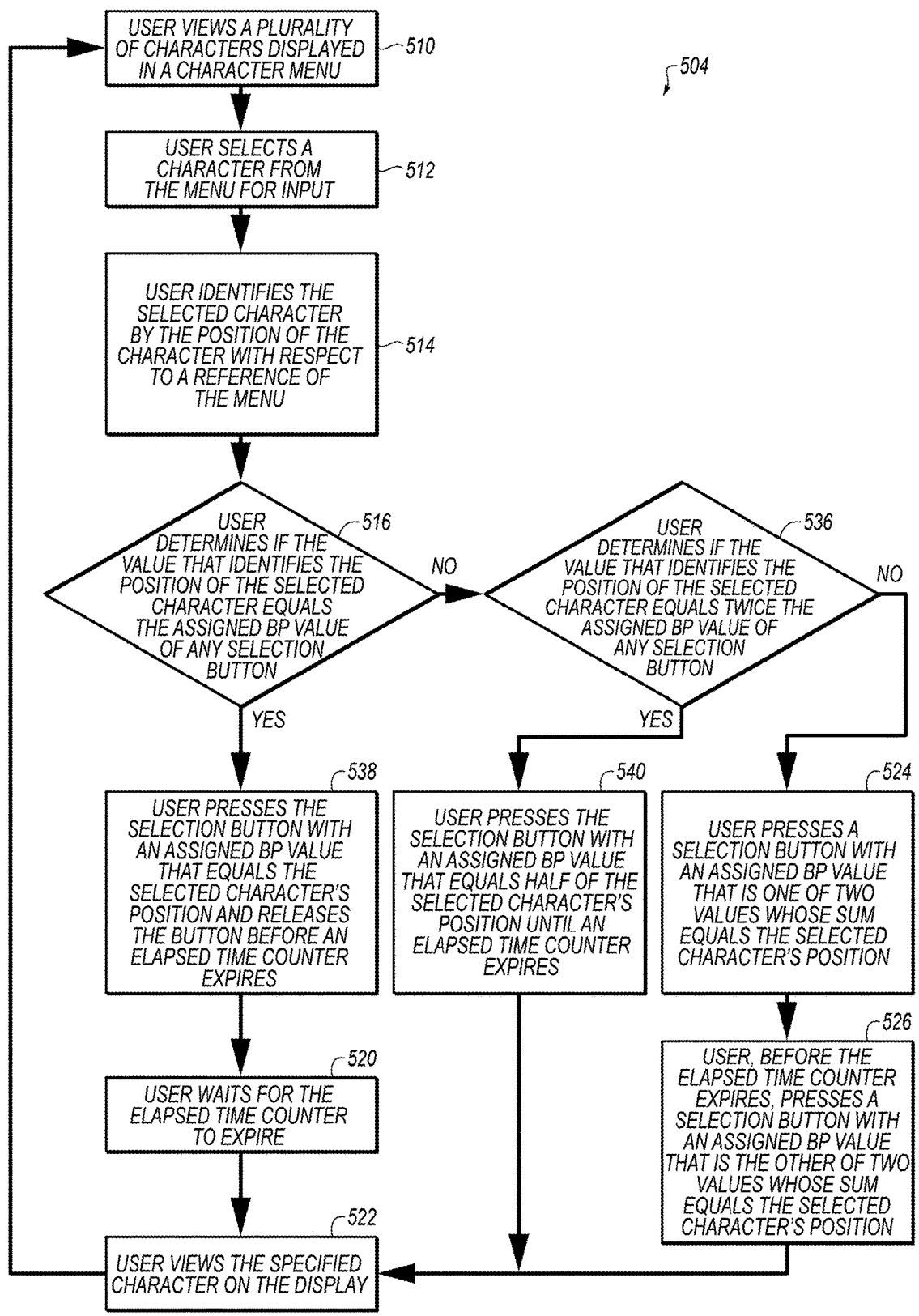
FIG. 3 is a flow diagram of a method for specifying a character from among a plurality of characters according to one illustrated embodiment.

FIG. 3 shows a flowchart of an embodiment of a method 504 for a user to specify a character from among a plurality of characters. In one step 510 of the method 504, a user views the characters 200 displayed in the menu 240. In another step 512, the user selects a character from the menu 240 for input to the electronic device 100. In another step 514, the user identifies the selected character by the position of the character with respect to the reference 258 of the menu 240, for example by a value equal to the number of positions the selected character is offset from the menu's reference 258. The user can identify the position of the selected character in a number of ways, including by referencing the position to a corresponding value in the offset scale 260, counting the number of positions that the selected character is offset from the reference 258, recalling from memory the value that identifies the particular selected character, and recalling by muscle memory the selection button keystrokes that correspond with the selected character or the selected character's position.

In another step 516, the user determines whether the value that identifies the selected character's position 242 in the menu 240 equals the assigned button press value 222 of any selection button 110.

If one of the selection buttons 110 has an assigned value 222 that is equal, in another step 538 the user presses the selection button with the assigned value that equals the selected character's position and releases the button before the elapsed time counter expires. The aforementioned step 518 inputs the assigned value 222 of the pressed selection button to the CPU 108, triggers the CPU 108 to start the elapsed time counter 140, and indicates to the CPU that the type of button press is a SHORT press. In a subsequent step 520, the user waits for the elapsed time counter 140 to expire before, in an optional step 522, the user views the specified character on the display 104. In an alternative embodiment, step 522 is bypassed.

However, if the value that identifies the selected character's position 242 in the menu 240 is not equal to the assigned value of any selection button, then in an alternate step 536, the user determines whether the value that identifies the selected character's position 242 in the menu 240 equals twice the assigned button press value 222 of any selection button 110.

If so, in another step 540 the user presses the selection button 110 with the assigned value 222 that equals half the selected character's position and maintains the button press until the elapsed time counter expires. The aforementioned step 540 inputs the assigned value 222 of the pressed selection button to the CPU 108, triggers the CPU 108 to start the elapsed time counter 140, and indicates to the processor that the type of button press is a LONG press. In an optional step 522, the user views the specified character on the display 104. In an alternative embodiment, step 522 is bypassed.

However, if none of the values 222 assigned to the selection buttons 110 equals the selected character's position 242 or is half the selected character's position, in an alternate step 524 the user presses the selection button with the assigned value 222 that is one of two values whose sum equals the selected character's position. The aforementioned step 524 inputs the assigned value 222 of the pressed selection button 110 to the CPU 108 and triggers the CPU to start the elapsed time counter 140. In a subsequent step 526, the user presses the selection button 110 with the assigned value 222 that is the other of two values whose sum equals the selected character's position 242 and does so before the elapsed time counter 140 expires. The aforementioned step 526 inputs the assigned value 222 of the pressed selection button 110 to the CPU 108 and indicates to the processor that the type of button press is PAIR. Optionally, as part of the step 526, the CPU 108 may also terminate the elapsed time counter 140. Once the user has pressed the second selection button, in another step 522 the user views the specified character on the display 104, which is an optional step and in an alternative embodiment is bypassed.

According to another embodiment of the invention, the character specification method 504 described above is used iteratively to specify series of characters from the character menu 240. In one embodiment, words and sentences are formed on the display 104 by iteratively specifying characters according the method above, with the spacebar 264 used to input spaces between words on the display.

Figure 4A:
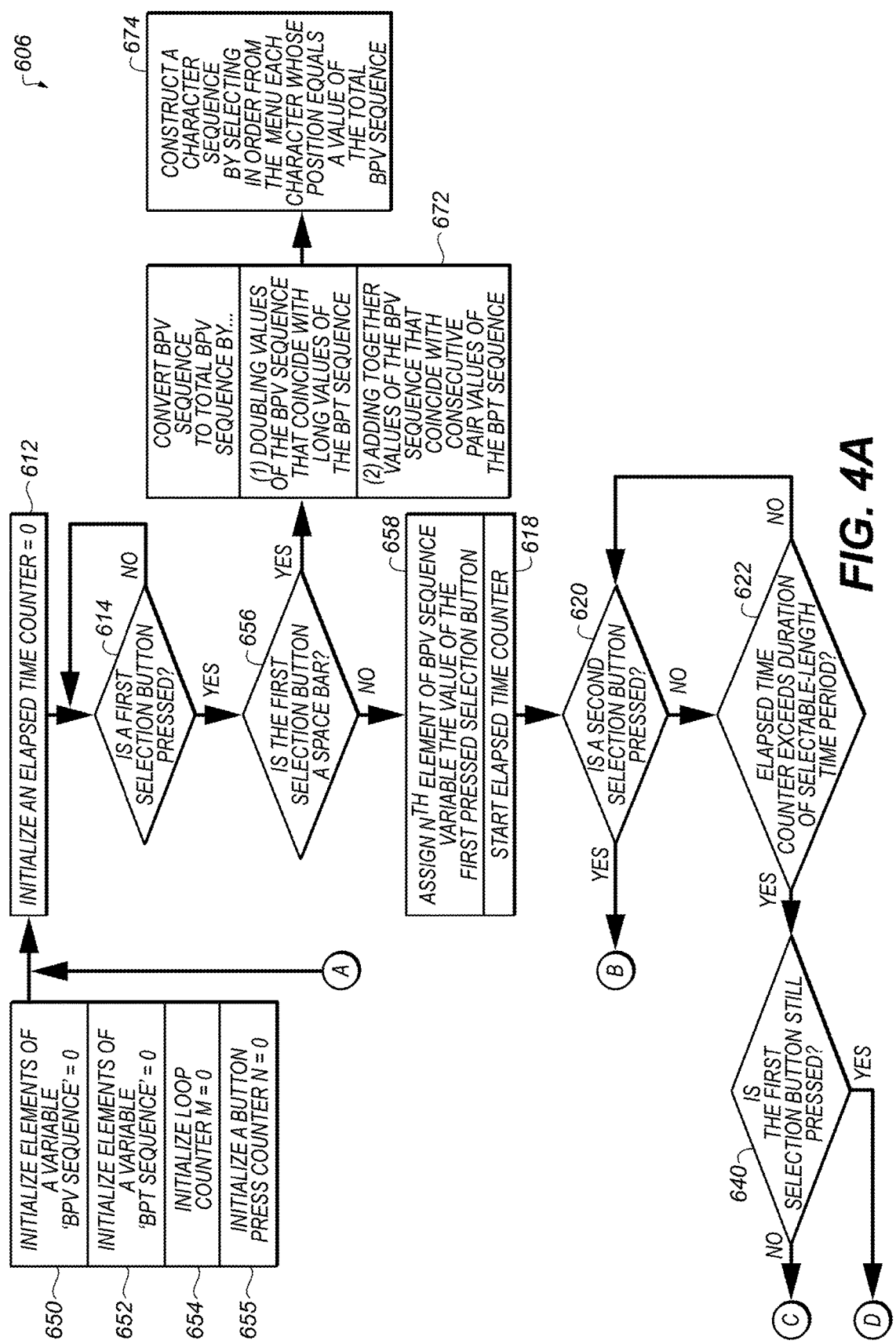
FIGS. 4A and 4B are flow diagrams of a method for an electronic device to interpret button presses according to one illustrated embodiment.
Figure 4B:
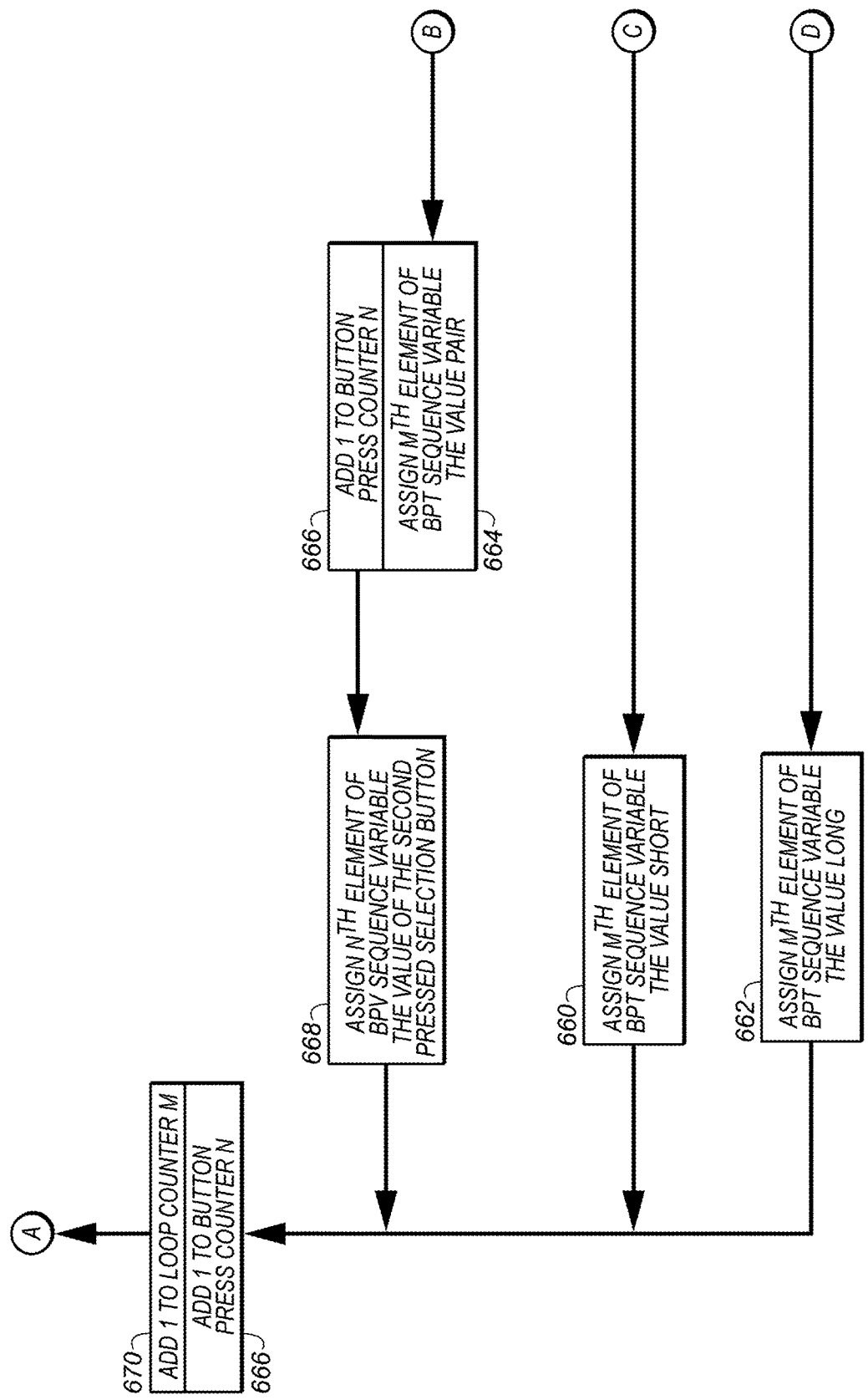

FIGS. 4A and 4B show flowcharts of an embodiment of a method 606 for the processor 108 of an electronic device to interpret sequences of button presses.

In one step 650 of the method 606, the CPU 108 initializes elements of an array variable 'sequence of button press values' 380 to zero. In another step 652 the CPU 108 initializes elements of an array variable 'sequence of button press types' 382 to zero. In another step 654 the CPU 108 initializes a variable 'number of loops m' 390 to zero. In another step 655 the CPU 108 initializes a variable 'number of button presses n' 392 to zero.

In another step 612 the CPU 108 initializes the elapsed time counter 140 to zero. In another step 614, the CPU 108 monitors the selection buttons 110 for a pressed selection button 110. Once a first selection button occurs, in another step 656, the CPU 108 determines if the first pressed selection button 110 is a press of the spacebar 264. If not, in a next step 658, the CPU 108 assigns to the $n^{th}$ element of the variable BPV sequence 380 the assigned value 222 of the first pressed selection button 110.

In another step 618, the CPU 108 starts the elapsed time counter 140. In a pair of steps 620, 622, the CPU 108 monitors the selection buttons 110 for the occurrence of a second selection button press while comparing the elapsed time counter 140 with a user chosen selectable-length time period.

If the elapsed time counter 140 exceeds the duration of the elapsed time period (i.e., expires) before an additional selection button press occurs, in a subsequent step 640 the CPU 108 determines if the first button press is still pressed.

If the first button press is not still pressed when the elapsed time period expires, then in a subsequent step 660 the CPU 108 assigns to the $m^{th}$ element of the variable BPT sequence 382 the value 'short' 340.

If, however, the first button press is still pressed when the elapsed time period expires, then in an alternate subsequent step 662 the CPU 108 assigns to the $m^{th}$ element of the variable BPT sequence 382 the value 'long' 345.

If, however, a second selection button press occurs before the elapsed time counter 140 expires, in another step 664 the CPU 108 assigns to the $m^{th}$ element of the variable BPT sequence 382 the value 'pair' 350. Then, in a subsequent step 666 the CPU 108 adds 1 to the variable number of button presses n 392. Then, in a subsequent step 668 the CPU 108 assigns to the $n^{th}$ element of the variable BPV sequence 380 the assigned value 222 of the second pressed selection button 110. Then, in the subsequent step 666 the CPU 108 again adds 1 to the variable number of button presses n 392. Then, in a subsequent step 670 the CPU 108 adds 1 to the variable number of loops m 390.

According to one embodiment of the method 606, the CPU 108 re-initializes the elapsed time counter 140 to zero and repeats the method in succession until in the step 656 the CPU 108 finds that the selection button pressed in step 614 is a press of the spacebar 264.

Then, in an alternative step 672 the CPU 108 converts the values of the variable BPV sequence 380 to values of a variable 'total BPV sequence' 386 by: (1) doubling values of the BPV sequence 380 that coincide with 'long BPT' values 345 of the BPT sequence 382, and (2) adding together values of the BPV sequence 380 that coincide with consecutive 'pair BPT' values 350 of the BPT sequence 382.

In the case of pairs occurring consecutively in the BPT sequence 382 (i.e., pairs of pairs), no value of the BPV sequence 380 is added to more than one other value. Furthermore, additions are made so that every value of the BPV sequence 380 that coincides with a pair BPT 350 gets added to a consecutive value of the BPV sequence that also coincides with a pair BPT and in such a way that no BPV that coincides with a pair BPT goes un-added.

Then, in a subsequent step 674 the CPU 108 constructs a character sequence 388 by identifying in order from the menu 240 each character 200 whose position 242 equals a value of the total BPV sequence 386.

Although the method 606 of FIGS. 4A and 4B are embodiments of a method for a processor 108 to interpret sequences of button presses, the scope of the method is not limited by this embodiment, but rather by the scope of the claims.

Figure 5:
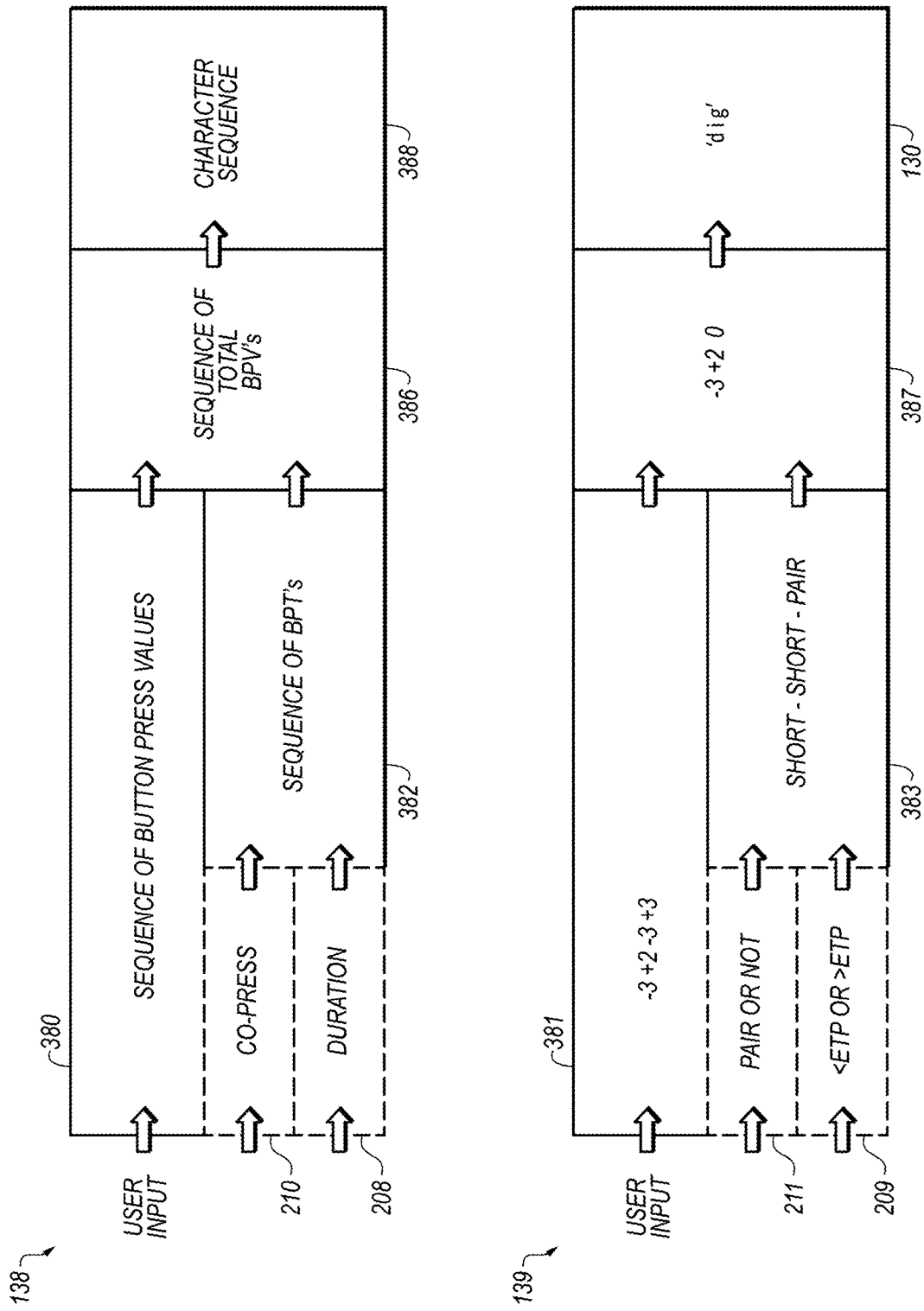
FIG. 5 is a flow diagram of variables and example values of variables of a method to interpret button presses according to one illustrated embodiment.

FIG. 5 shows a first flowchart 138 of variables and a second flowchart 139 of example values for each variable for the method 606 of FIGS. 4A and 4B and the user interface 150 of FIG. 2.

The first flowchart 138 shows that three input variables exist for the method 606 of FIGS. 4A and 4B: (1) 'sequence of button press values' 380, (2) 'co-press' 210, and (3) 'duration' 208. Next in the flowchart, the variables 'co-press' 210 and 'duration' 208 together determine the variable 'sequence of button press types' 382, which occurs as a result of repeated loops through steps 620 and 640 of FIGS. 4A and 4B. Next, the variables 'sequence of button press values' 380 and 'sequence of button press types' 382 together determine the variable 'sequence of total button press values' 386, which occurs in step 672 of the method 606 of FIGS. 4A and 4B. Finally, the variable 'sequence of total button press values' 386 determines the variable 'character sequence' 388 which occurs in step 674 of the method 606 and is based on the user interface 150 of FIG. 2.

The second flowchart 139 shows example values for each variable of the first flowchart 138 for the embodiment of the user interface 150 of FIG. 2. The variable 'sequence of button press values' 380 has the value '−3 +2 −3 +3' 381. The variable 'co-press' 210 has the values 'pair' or 'not' 211. The variable 'duration' has the values '<ETP' or '>ETP' 209. The variable 'sequence of button press types' 382 has the value 'short-short-pair' 383. The variable 'sequence of total button press values' 386 has the value '−3 +2 0' 387. The variable 'character sequence' 388 has the value 'd i g' 130, which is an example of an identified word. The values of the second flowchart 139 are examples used to demonstrate the embodiments of FIGS. 2 and 4. The scope of the invention is not limited by the variables and particular values shown here, but rather by the scope of the claims.

Figure 6:
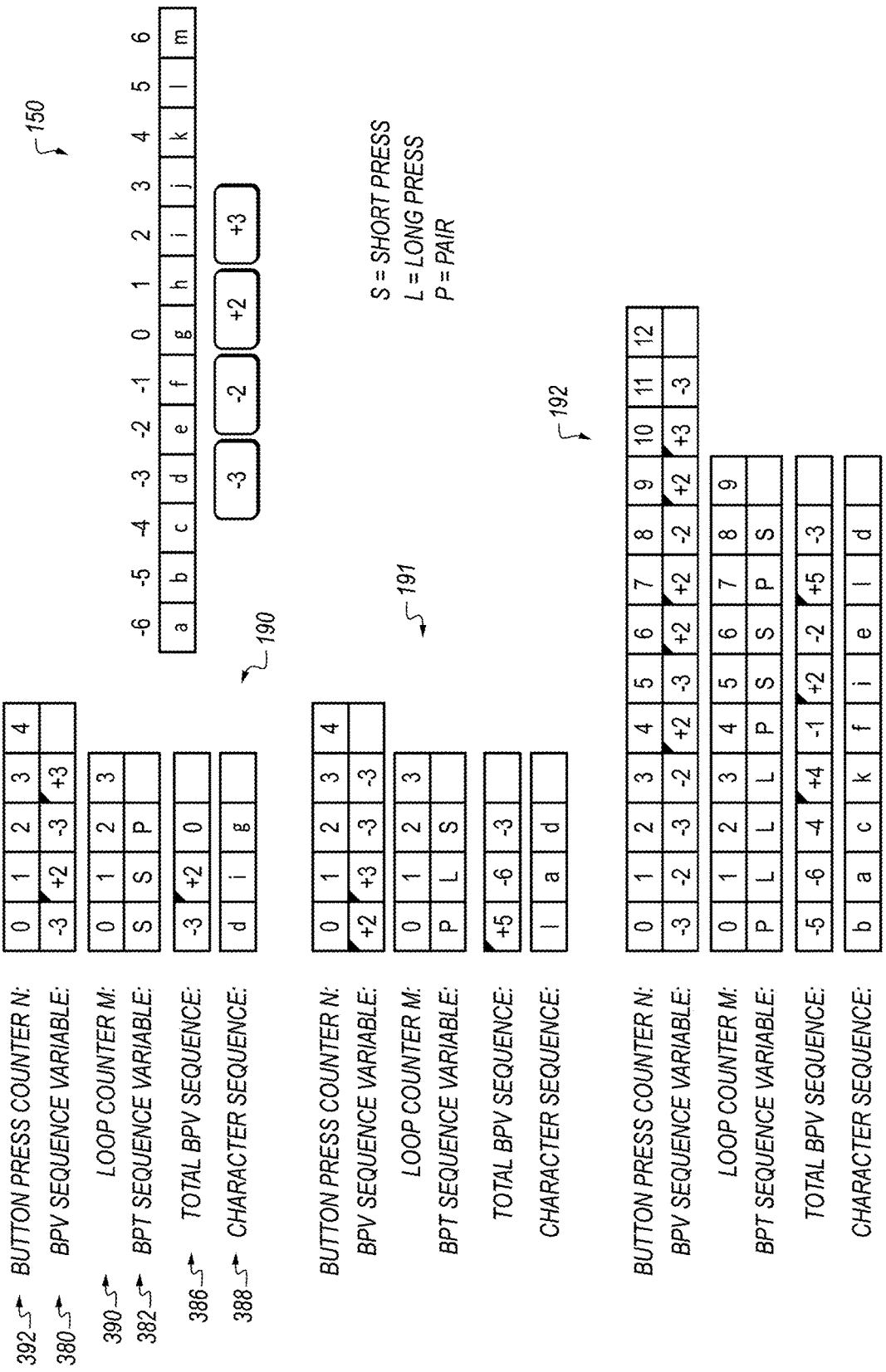
FIG. 6 is an example of an application of a method of character identification according to one illustrated embodiment.

FIG. 6 shows three examples of the method 606 of FIGS. 4A and 4B and the flow of variables of FIG. 5 for the user interface 150 of FIG. 2. Each example includes the variables 'number of button presses n' 392, 'BPV sequence' 380, 'number of loops m' 390, 'BPT sequence' 382, 'total BPV sequence' 386 and 'character sequence' 388.

In a first example 190, the variable 'number of button presses n' 392 identifies the elements (0-4) of the array variable BPV sequence 380. The BPV sequence 380 contains the BPV 222 of each consecutive button press (−3 +2 −3 +3) collected in steps 658 and/or 668 over multiple iterations of the method 606 of FIGS. 4A and 4B. The variable number of loops m 390 identifies the elements (0-3) of the array variable BPT sequence 382. The BPT sequence 382 contains the BPT 224 collected in one of steps 660, 662, or 664 of each iteration of the method 606 of FIGS. 4A and 4B (short-short-pair). The total BPV sequence 386 contains the sequence of values (−3 +2 0) that identify the menu positions 242 of the selected characters. The character sequence 388 contains the selected characters (d i g). In the first example 190, values for each of the variables above contribute, as shown in the first flowchart of FIG. 5, to select characters of the word 130 'dig'.

In a second example 191, the variable number of button presses n 392 identifies the elements (0-4) of the array variable BPV sequence 380. The BPV sequence 380 contains the BPV 222 of each consecutive button press (+2 +3 −3 −3) collected in steps 658 and/or 668 over multiple iterations of the method 606 of FIGS. 4A and 4B. The variable number of loops m 390 identifies the elements (0-3) of the array variable BPT sequence 382. The BPT sequence 382 contains the BPT 224 collected in one of steps 660, 662, or 664 of each iteration of the method 606 of FIGS. 4A and 4B (pair-long-short). The total BPV sequence 386 contains the sequence of values (+5 −6 −3) that identify the menu positions 242 of the selected characters. The character sequence 388 contains the selected characters (l a d). In the second example 191, values for each of the variables above contribute to select characters of the word 130 'lad'.

In a third example 192, the variable number of button presses n 392 identifies the elements (0-12) of the array variable BPV sequence 380. The BPV sequence 380 contains the BPV 222 of each consecutive button press (−3 −2 −3 −2 +2 −3 +2 +2 −2 +2 +3 −3) collected in steps 658 and/or 668 over multiple iterations of the method 606 of FIGS. 4A and 4B. The variable number of loops m 390 identifies the elements (0-9) of the array variable BPT sequence 382. The BPT sequence 382 contains the BPT 224 collected in one of steps 660, 662, or 664 of each iteration of the method 606 of FIGS. 4A and 4B (pair-long-long-long-pair-short-short-pair-short). The total BPV sequence 386 contains the sequence of values (−5 −6 −4 +4 −1 +2 −2 +5 −3) that identify the menu positions 242 of the selected characters. The character sequence 388 contains the selected characters (b a c k f i e l d). In the third example 192, values for each of the variables above contribute to select characters of the word 130 'backfield'.

Figure 7:
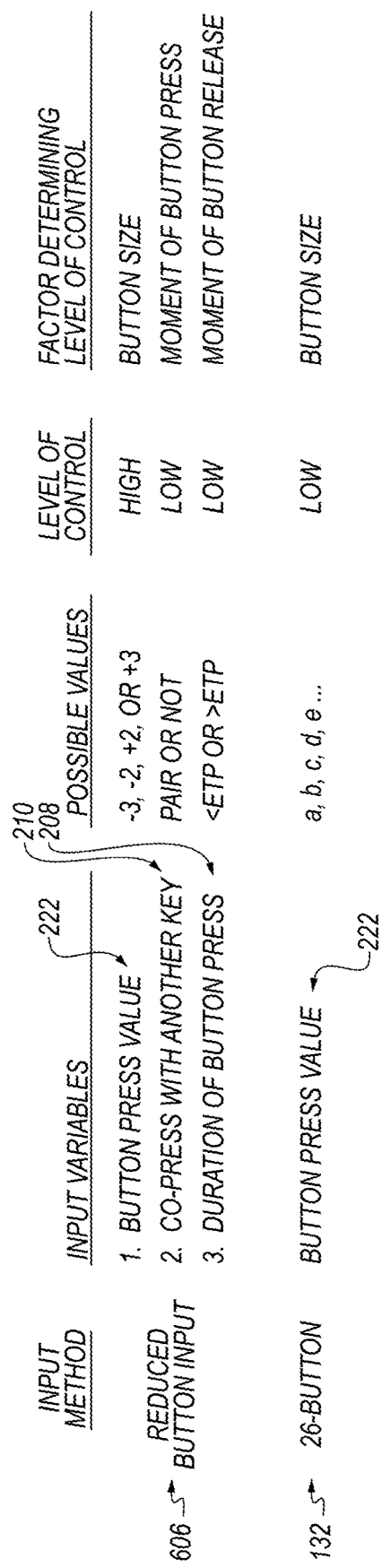
FIG. 7 is a table of characteristics of two different methods to input characters.

FIG. 7 shows a table that compares characteristics of two different input methods. One method shown is the method 606 of FIGS. 4A and 4B, also known as the reduced-button input method. Another method shown is a 26-button input method 132. A standard QWERTY keyboard is one example of the 26-button method 132.

The characteristics compared in the table of FIG. 7 are: input variables, possible values for the input variables, level of control, and the factor determining the level of control.

The reduced-button method 606 has three input variables: (1) button press value 222, (2) co-press 210 and (3) duration 208. These three variables appear as inputs in the first flowchart 138 of FIG. 5 and in steps 620, 640, 658 and 668 of the method 606 of FIGS. 4A and 4B. Possible values of these variables for the user interface 150 of FIG. 2 are: (1) −3, −2, +2 or +3, (2) pair or not, and (3)<ETP or >ETP.

The 26-button method 132 has one input variable: button press value 222. Possible values for the button press value 222 in the case of the 26-button method are the characters themselves: a, b, c, d . . . and so on.

Level of control over the three variables for the reduced-button method 606 is high for the button press value variable 222, but low for the co-press 210 and duration 208. The factor that determines the high level of control over the button press value variable 222 is the button size. Because the reduced button method 606 requires fewer buttons compared to the number of characters that are selectable, relative to other input methods there is space available to increase the button size. For example, for the 13:4 ratio between characters to buttons shown in the interface 150 of FIG. 2, only eight buttons are required to offer every character of the English alphabet. Therefore even in a compact application like a mobile device, button size can be large enough for a human finger to press them without error, so the level of control is considered high.

The factors determining the low level of control for the variables co-press 210 and duration 208 are the moment of button press and the moment of button release. Both these variables 208, 210 are time dependent and in a typical application need to be controlled to a precision less than tenths of a second. Achieving that level of control is difficult on a routine basis, so for that reason the level of control over these variables is considered low.

Level of control over the button press value variable 222 for the 26-button method 132 is low. As with the reduced button method 606, the factor determining the level of control for the button press value 222 is button size. But the difference with the 26-button method 132 is that due to the requirement to provide 26 buttons, the size of each individual button must be small in a compact application. In use, the small button size leads to button press errors, therefore the level of control for the button press value variable 222 is considered low for the 26-button method 132.

FIG. 8 shows an example of the interface 150 of FIG. 2 used with the reduced button method 606 and an example of a 26-button user interface 133 used with the 26-button method 132. The difference in size of the selection buttons 110 for each interface is noticeable. The larger selection buttons 110 of the user interface 150 used with the reduced button method 606 provide a user with a high level of control. The smaller selection buttons 110 of the 26-button interface 133 provide only a low level of control.

Figure 9:
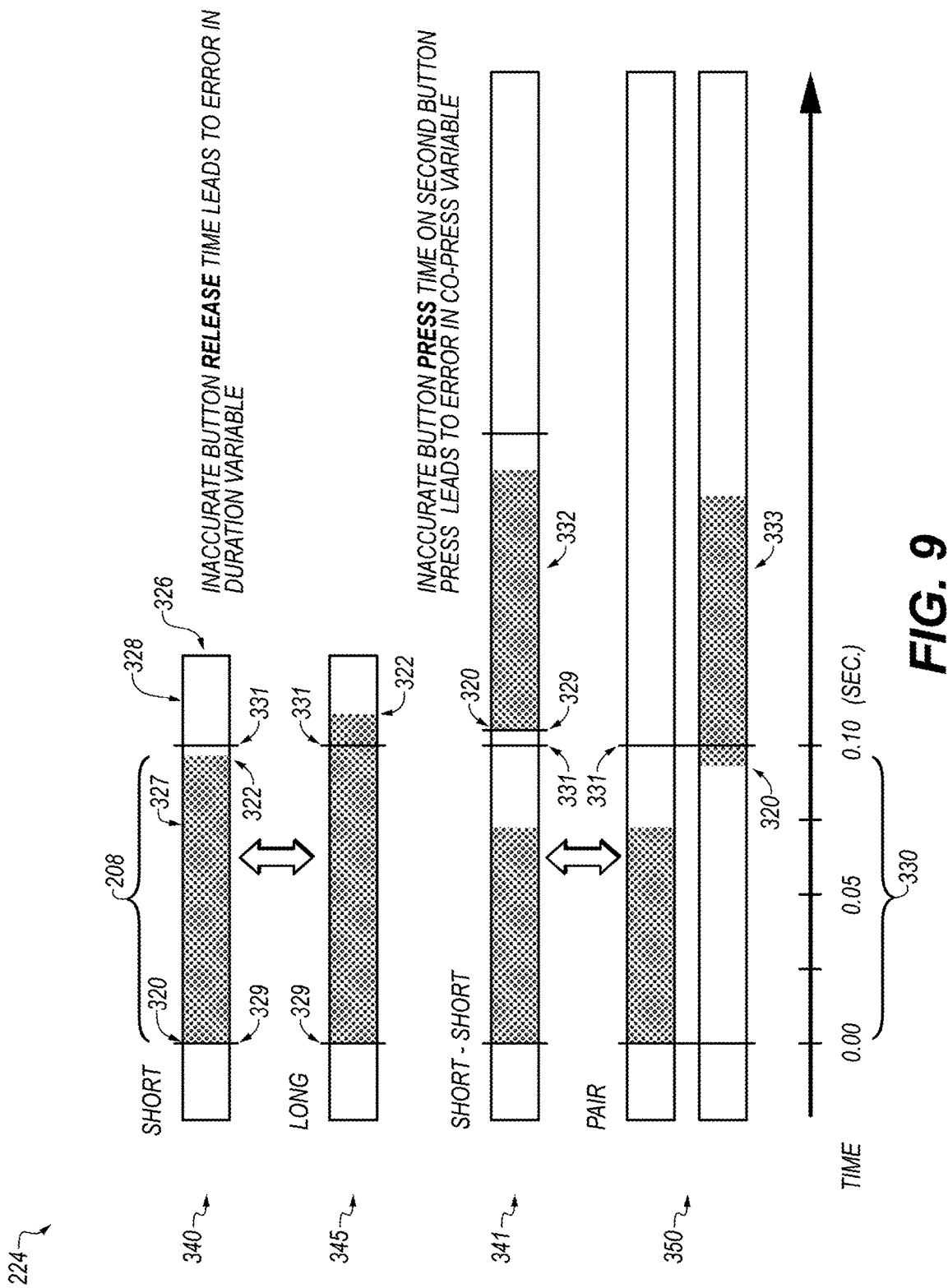
FIG. 9 is a graphical representation of button press types of a method to input characters according to one illustrated embodiment.

FIG. 9 shows a graphical representation of an example of each of the three button press types 224: the short BPT 340, the long BPT 345 and the pair BPT 350. FIG. 9 also shows a graphical representation of a sequence of two short BPTs 341.

For each example, the passage of time is represented by a horizontal bar 326. A black region 327 within the bar 326 indicates a period of time when a button is pressed. A white region 328 within the bar 326 indicates a period of time when a button is not pressed. A first solid vertical marker indicates a beginning 329 of an elapsed time period 330. A second solid vertical marker indicates an end (or expiration) 331 of the elapsed time period 330. Button presses have an onset 320 and a moment of release 322. The time between the onset 320 and the moment of release 322 is the duration 208. As dictated by steps 612, 614 and 618 of the method 606 of FIGS. 4A and 4B, the elapsed time period 330 commences with the onset 320 of a button press whenever an elapsed time period 330 is not already occurring.

As previously defined, a button press with duration 208 less than the elapse time period 330 is the short BPT 340. A button press with duration 208 longer than the elapsed time period 330 is the long BPT 345. Because the onset 320 of the button press and the elapsed time period 330 commence together, the moment of button release 322 distinguishes the short BPT 340 from a long BPT 345.

As the graphic of the short BPT 340 and long BPT 345 shows, if the moment of button release 322 occurs close (in time) to expiration 331 of the elapsed time period, then a small difference in the timing of the release can change the determination of the BPT 224. In the examples of FIG. 9, the difference in moment of release 322 between the short BPT 340 and the long BPT 345 is on the order of 0.02 seconds. This level of sensitivity is why the input variable duration 208 in the table of FIG. 7 is considered of low control. It also shows how in the method 606 of FIGS. 4A and 4B, an inaccurately timed button release by a user can lead an intended short BPT 340 to be entered as a long BPT 345, or vice-versa.

A similar risk occurs at the onset 320 of a button press, if the expiration 331 of the elapsed time period 330 is close ahead of it in time. The graphical representation of the sequence of two short BPTs 341 shows how the onset 320 of a subsequent button press 332 can nearly overlap (in time) with the expiration 331 of an expiring elapsed time period 330. If the onset 320 of the subsequent button press 332 occurs before the expiration 331 of the elapsed time period 330, then the CPU 108 interprets subsequent button press 332 as a second button press 333 of the pair BPT 350. Thus the sequence of consecutive short BPTs 341 is interpreted as the pair BPT 350. In the example of FIG. 9, the difference in the button onset 320 is on the order of 0.02 seconds. This sensitivity if why the input variable co-press 210 in the table of FIG. 7 is considered of low control. It also shows how in the method 606 of FIGS. 4A and 4B, an inaccurately timed button press by a user can lead button presses intended to be entered as consecutive BPTs to be entered as a pair BPT 350 instead, or vice-versa.

Figure 10:
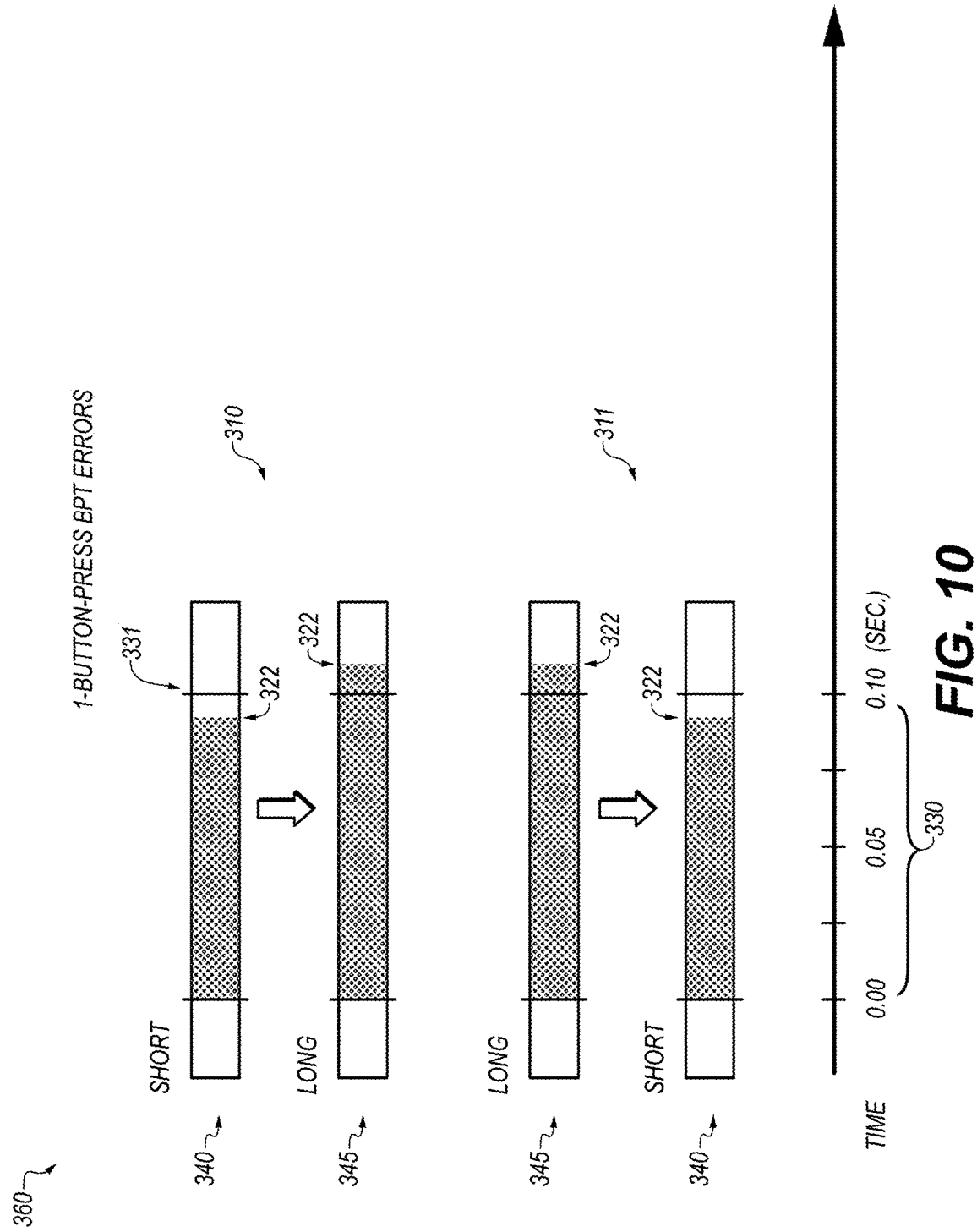
FIGS. 10-12 are graphical representations of button presses of a method to input characters according to one illustrated embodiment.
Figure 11:
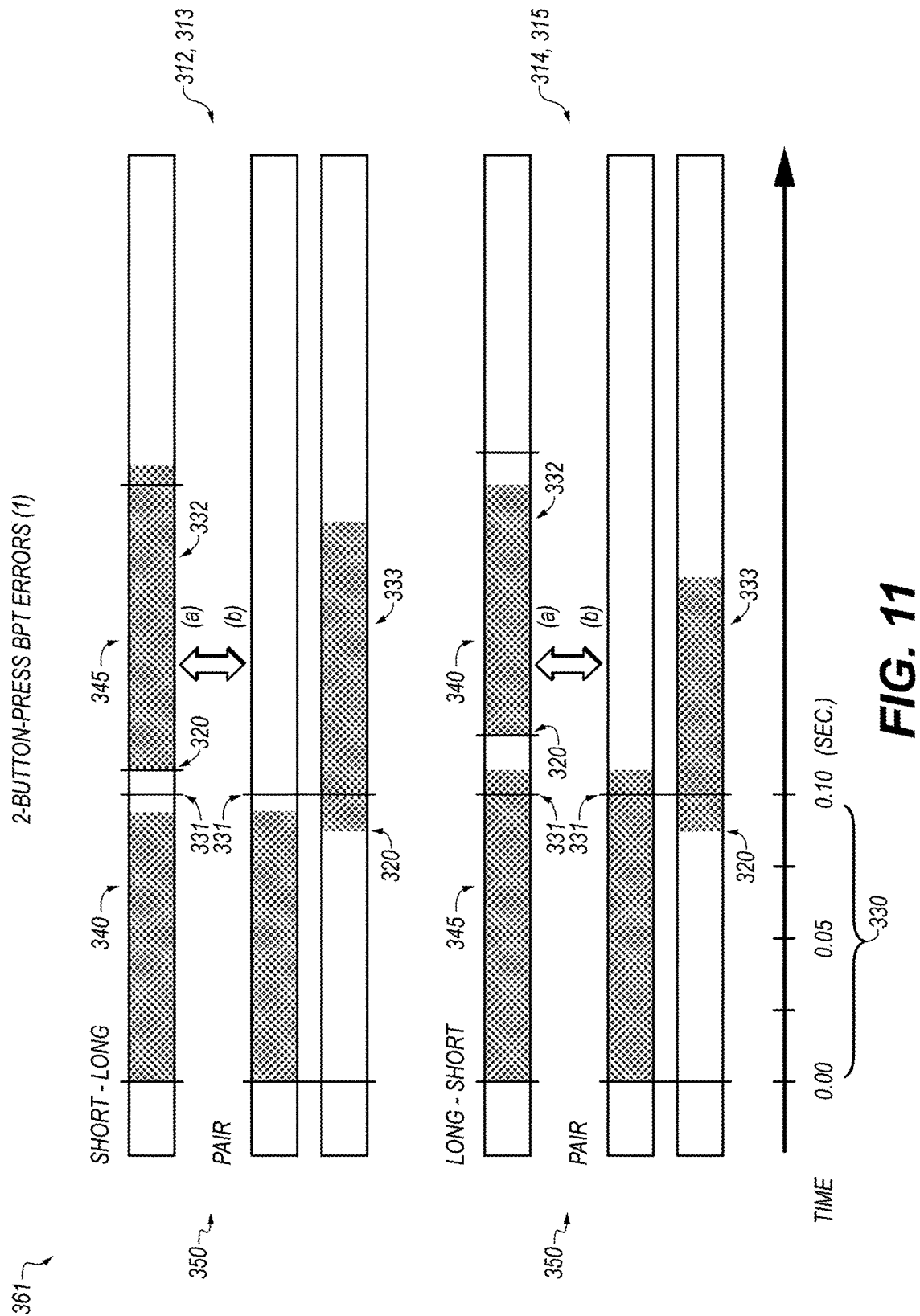
Figure 12:
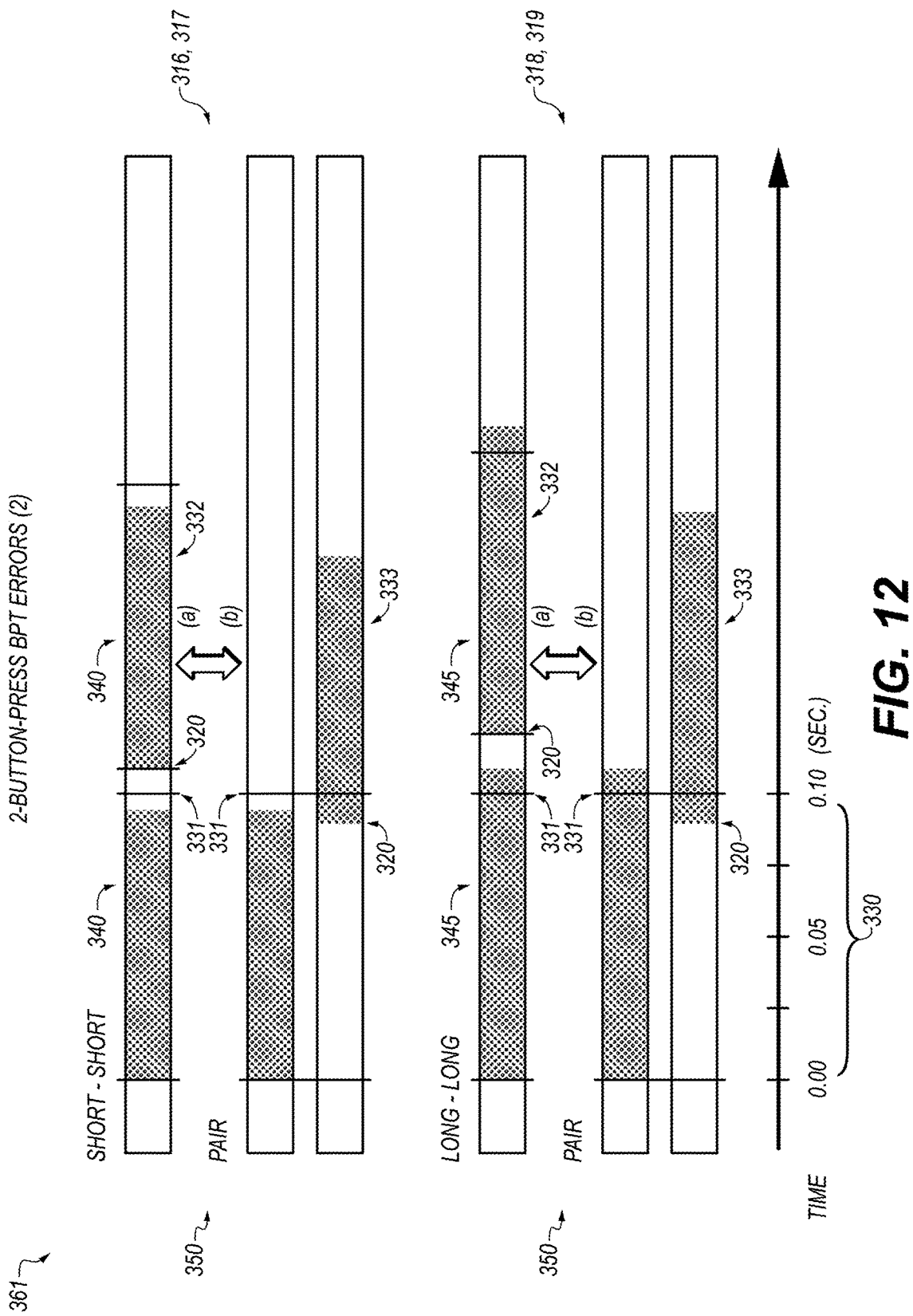

FIGS. 10, 11 and 12 show graphical representations of possible button press type errors due to inaccurate timing of button presses.

FIG. 10 shows two examples of possible single-button-press timing errors 360. In a graphical representation of a first BPT error 310, an intended short BPT 340 becomes an unintended long BPT 345 due to the moment of release 322 occurring after the expiration 331 of the ETP period 330. In a graphical representation of a second BPT error 311, an intended long BPT 345 becomes an unintended short BPT 340 due to the moment of button press release 322 occurring before the expiration 331 of the ETP 330.

FIG. 11 shows four examples of possible two-button-press timing errors 361. In a graphical representation of a third BPT error 312, a sequence intended as a short BPT 340 followed by a long BPT 345 (*a*) becomes an unintended pair BPT 350 (*b*) due to the onset 320 of the subsequent button press 332 occurring before the expiration 331 of the elapsed time period 330. The same graphical representation shows a fourth BPT error 313, an intended pair BPT 350 (*b*) becomes an unintended sequence of a short BPT 340 followed by a long BPT 345 (*a*) due to the onset 320 of the second button press 333 of the pair 350 occurring after the expiration 331 of the ETP 330.

In a graphical representation of a fifth BPT error 314, a sequence intended as a long BPT 345 followed by a short BPT 340 (*a*) becomes an unintended pair BPT 350 (*b*) due to the onset 320 of the subsequent button press 332 occurring before the expiration 331 of the elapsed time period 330. The same graphical representation shows a sixth BPT error 315, an intended pair BPT 350 (*b*) becomes an unintended sequence of a long BPT 345 followed by a short BPT 340 (*a*) due to the onset 320 of the second button press 333 of the pair 350 occurring after the expiration 331 of the ETP 330.

FIG. 12 shows four additional examples of possible two-button-press timing errors 361. In a graphical representation of a seventh BPT error 316, a sequence intended as two consecutive short BPTs 340 (*a*) becomes an unintended pair BPT 350 (*b*) due to the onset 320 of the subsequent button press 332 occurring before the expiration 331 of the elapsed time period 330. The same graphical representation shows an eighth BPT error 317, an intended pair BPT 350 (*b*) becomes an unintended sequence of short BPTs 340 (*a*) due to the onset 320 of the second button press 333 of the pair 350 occurring after the expiration 331 of the ETP 330.

In a graphical representation of a ninth BPT error 318, a sequence intended as two consecutive long BPTs 345 (*a*) becomes an unintended pair BPT 350 (*b*) due to the onset 320 of the subsequent button press 332 occurring before the expiration 331 of the elapsed time period 330. The same graphical representation shows a tenth BPT error 319, an intended pair BPT 350 (*b*) becomes an unintended sequence of two consecutive long BPTs 345 (*a*) due to the onset 320 of the second button press 333 of the pair 350 occurring after the expiration 331 of the ETP 330.

FIG. 13 lists each possible error case 397 demonstrated in FIGS. 10-12. Each case 397 has an intended button press type (or types) 400 and an errant button press type (or types) 402. FIG. 13 includes an explanation 404 for each case 397 that describes the button press timing error that leads an intended BPT (or BPTs) 400 to become an errant BPT (or BPTs) 402. Because button press types can have either one press (short BPT 340 and long BPT 345) or two button presses (pair BPT 350), ten unique BPT error cases 397 are possible. Any deviation between an accurate and an errant BPT sequence 382 that is due to button press timing errors can be accounted for by one or more of the cases 397 of FIG. 13.

Figure 14:
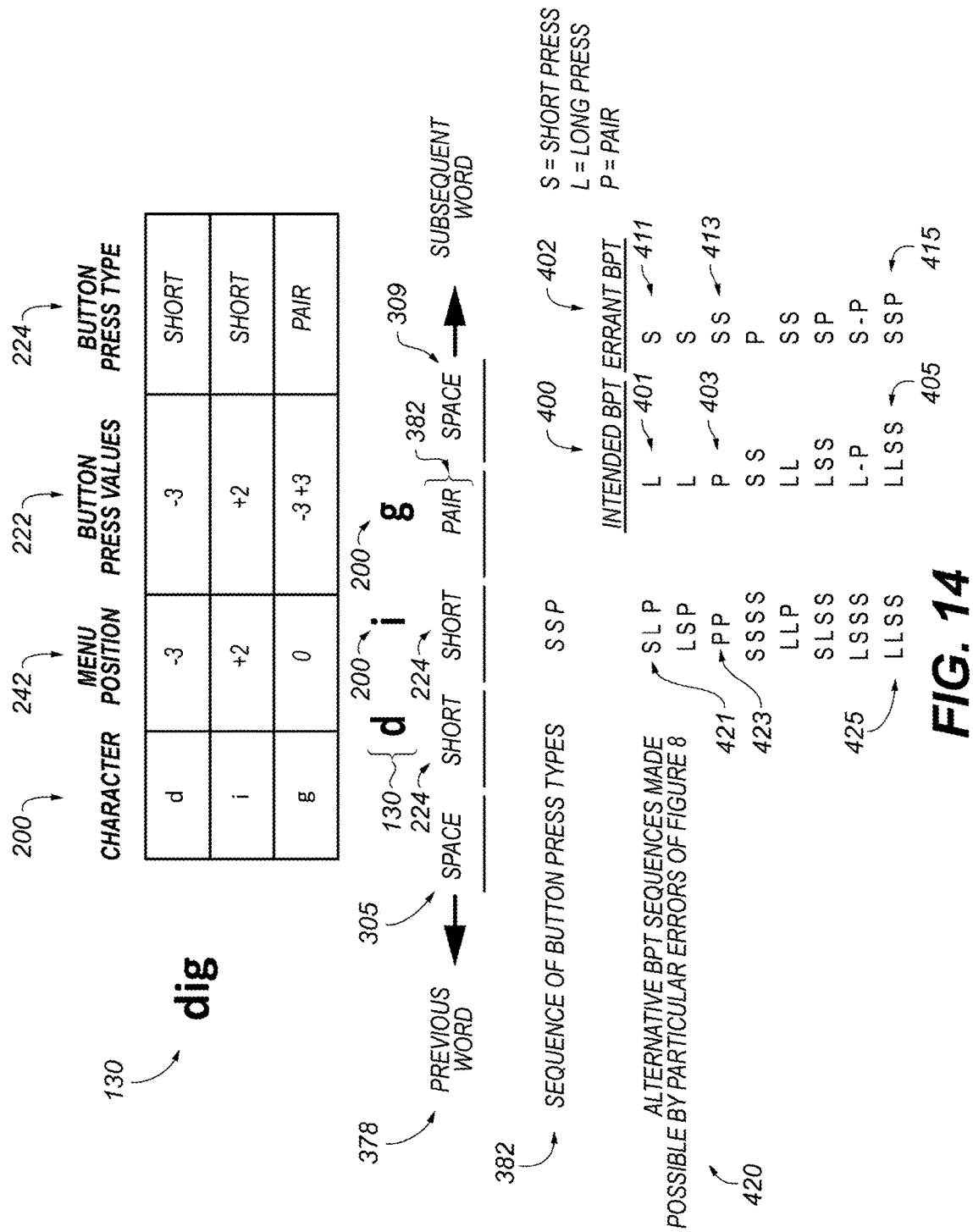
FIG. 14 is variable values for an example of one embodiment of a method of word identification.

FIG. 14 shows a table of values that are applicable to the word 130 'dig'. The table shows values for the variables 'character' 200, 'menu position' 242, 'button press values' 222, and 'button press type' 224. FIG. 14 also shows a button press progression 378, the sequence of button press types 382, a plurality of alternative BPT sequences 420, a plurality of intended BPTs 400, and a plurality of errant BPTs 402 applicable to the word 'dig'.

Values for the variable 'character' 200 derive directly from the word 130. Values for the variable 'menu position' 242 derive from the position of each character 200 in the menu 240 according to the user interface 150 of FIG. 2 and as shown in FIG. 9 of Seed IP Matter No. 680065.40501.

Values for the variables 'button press values' 222 and 'button press type' 224 derive from execution of the method 606, according to FIGS. 4A and 4B and its description. Furthermore, the first example 190 of FIG. 6 shows how values for each array element of each variable are derived for the specific case of the word 'dig'. The BPV sequence 380 for 'dig' for the user interface 150 of FIG. 2 is '−3 +2 −3 +3'. The BPT sequence 382 for 'dig' for the user interface 150 of FIG. 2 is 'short-short-pair'.

The button press progression 378 shows in sentence-like form the sequence of button press types 382 and the correspondence between the individual button press types 224 and the characters 200 of the word 130. Spaces 309 define the extent of the BPT sequence 382 for the word 130 relative to previous and subsequent words.

Each alternative BPT sequence 420 derives from an inverse application of one or more BPT error cases 397 of FIG. 13 to the BPT sequence 382. Comparison of the intended BPT 400 and the errant BPT 402 shows the particular error case 397 needed to create a particular alternative BPT sequence 420. Each alternative BPT sequence 420 is the inverse result of applying one or more of the error cases 397 to the BPT sequence 382.

For example, for the alternative BPT sequence S L P 421, the intended BPT L 401 in the second position of the BPT sequence S L P 382 is entered as the errant BPT S 411 creating S S P 382. This is an example of the error of Case 2 in FIG. 13. In another example, for the alternative BPT sequence P P 423, the intended BPTs P 403 is entered as the errant BPT S S 413 creating S S P 382. This is an example of the error of Case 7 in FIG. 13. In yet another example, for the alternative BPT sequence L L S S 425, the intended BPTs L L S S 405 are entered as the errant BPTs S S P 415 creating S S P 382. This is an example of the error of Case 2 occurring twice and the error of Case 5 occurring once.

A notable outcome of this analysis is the realization that for a BPT sequence 382 of a given number of button presses 392, the number of possible alternative BPT sequences 420 having the same number of button presses is finite. Furthermore, for any BPT sequence 382 of a given number of button presses 392, the number of possible alternative BPT sequences 420 is always the same. So even though the number of possible alternative BPT sequences 420 does not depend uniformly on the number of BPTs 224 in the BPT sequence 382, the number of possible alternatives 420 does depend uniformly on the number of button presses 392 in the BPT sequence 382.

In other words, the number of possible unique BPT sequences is not constant for a given number of BPTs in a BPT sequence, but is constant for a given number of button presses in a BPT sequence. Said yet another way, the list of possible unique BPT sequences is finite and always the same for a BPT sequence of a given number of button presses.

Figure 15:
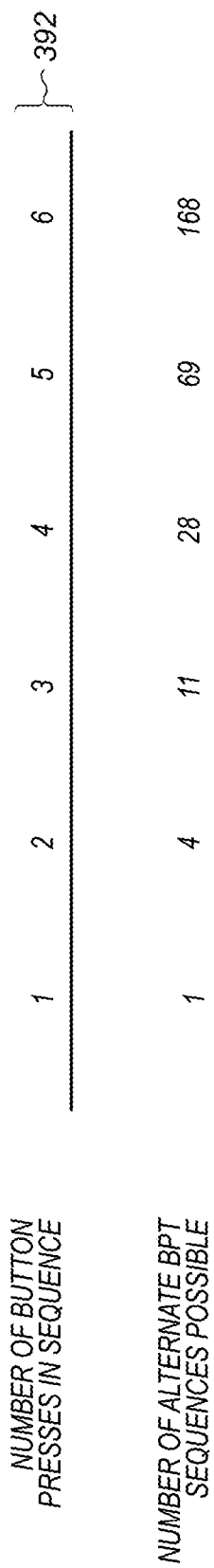
FIG. 15 is a table of characteristics of a method to interpret button presses according to one illustrated embodiment.

FIGS. 15-18 show a table and examples that disclose the relationship between the number of button presses 392 in a given BPT sequence 382 and the number of alternative BPT sequences 420 possible for that given BPT sequence 382. The table of FIG. 15 summarizes results from the examples of FIGS. 16-18.

Figure 16:
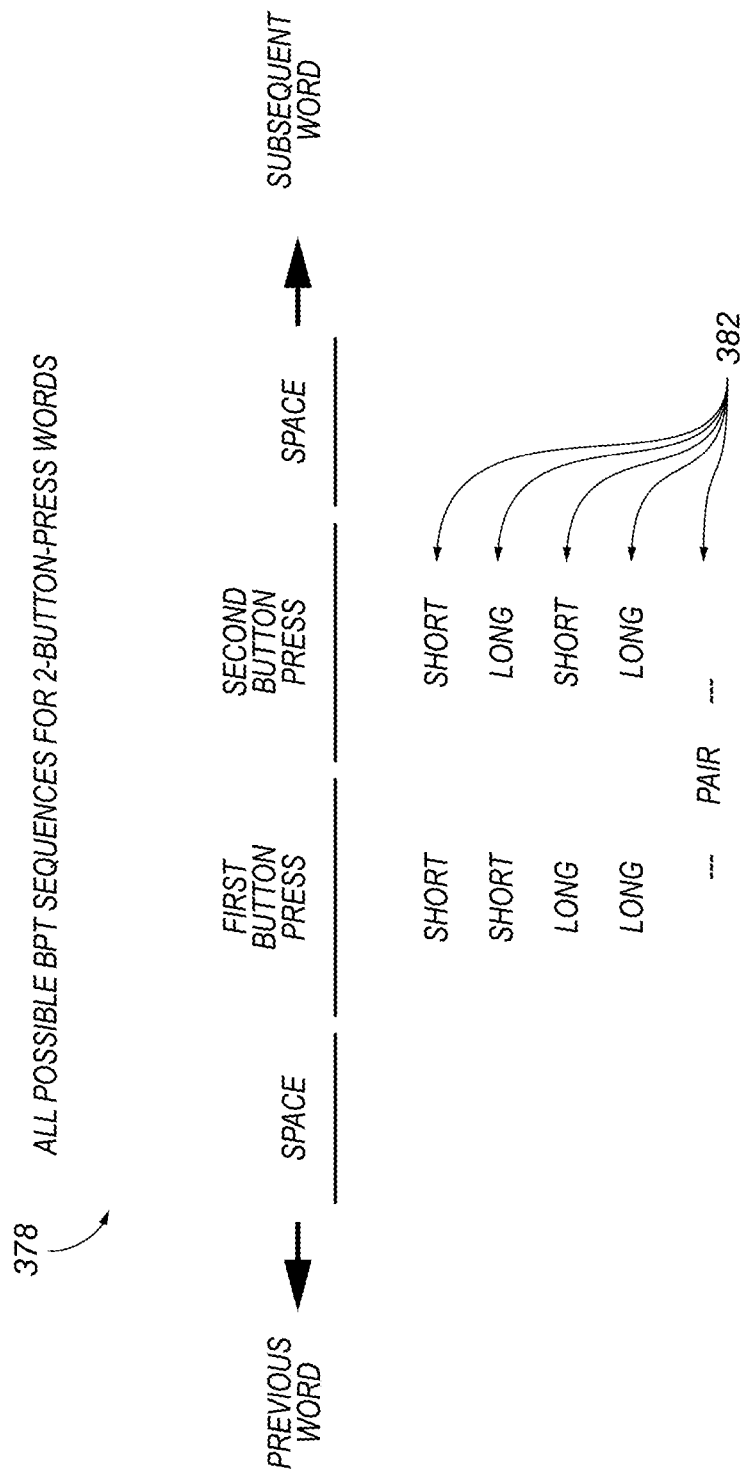

FIG. 16 demonstrates that for a BPT sequence 382 having a button progression 378 with two presses, the possible BPT sequences are 'short-short', 'short-long', 'long-short', 'long-long', and 'pair'. The number of possible unique BPT sequences 382 is 5. The number of possible alternative BPT sequences 420 is the number of possible unique BPT sequences minus one: 4.

Figure 17:
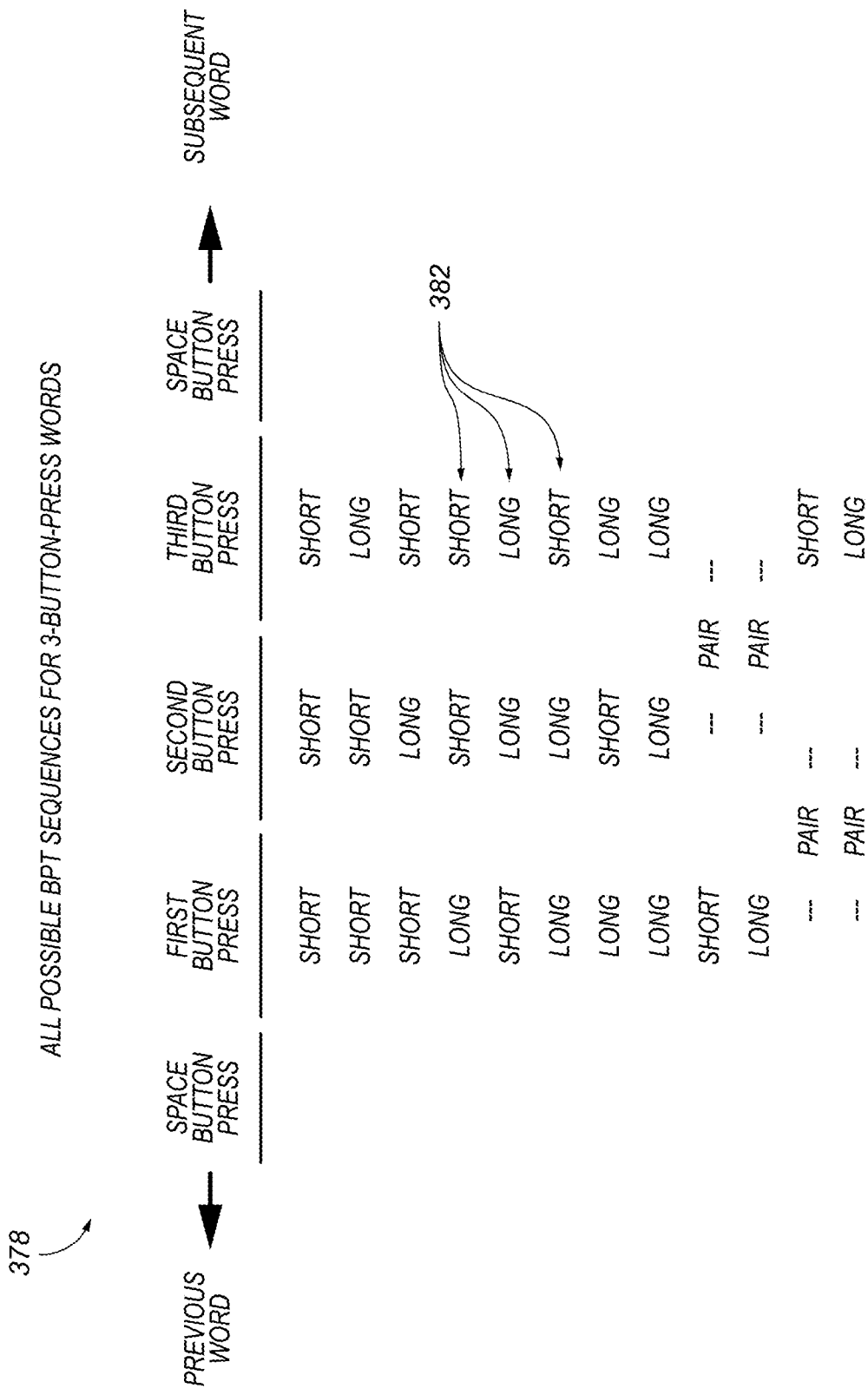

FIG. 17 demonstrates that for a BPT sequence 382 having a button progression 378 with three presses, the possible BPT sequences are those listed. The number of possible unique BPT sequences 382 is 12. The number of possible alternative BPT sequences 420 is the number of possible unique BPT sequences minus one: 11.

FIG. 18 demonstrates that for a BPT sequence 382 having a button progression 378 with four presses, the possible BPT sequences are those listed. The number of possible unique BPT sequences 382 is 29. The number of possible alternative BPT sequences 420 is the number of possible unique BPT sequences minus one: 28.

Figure 19:
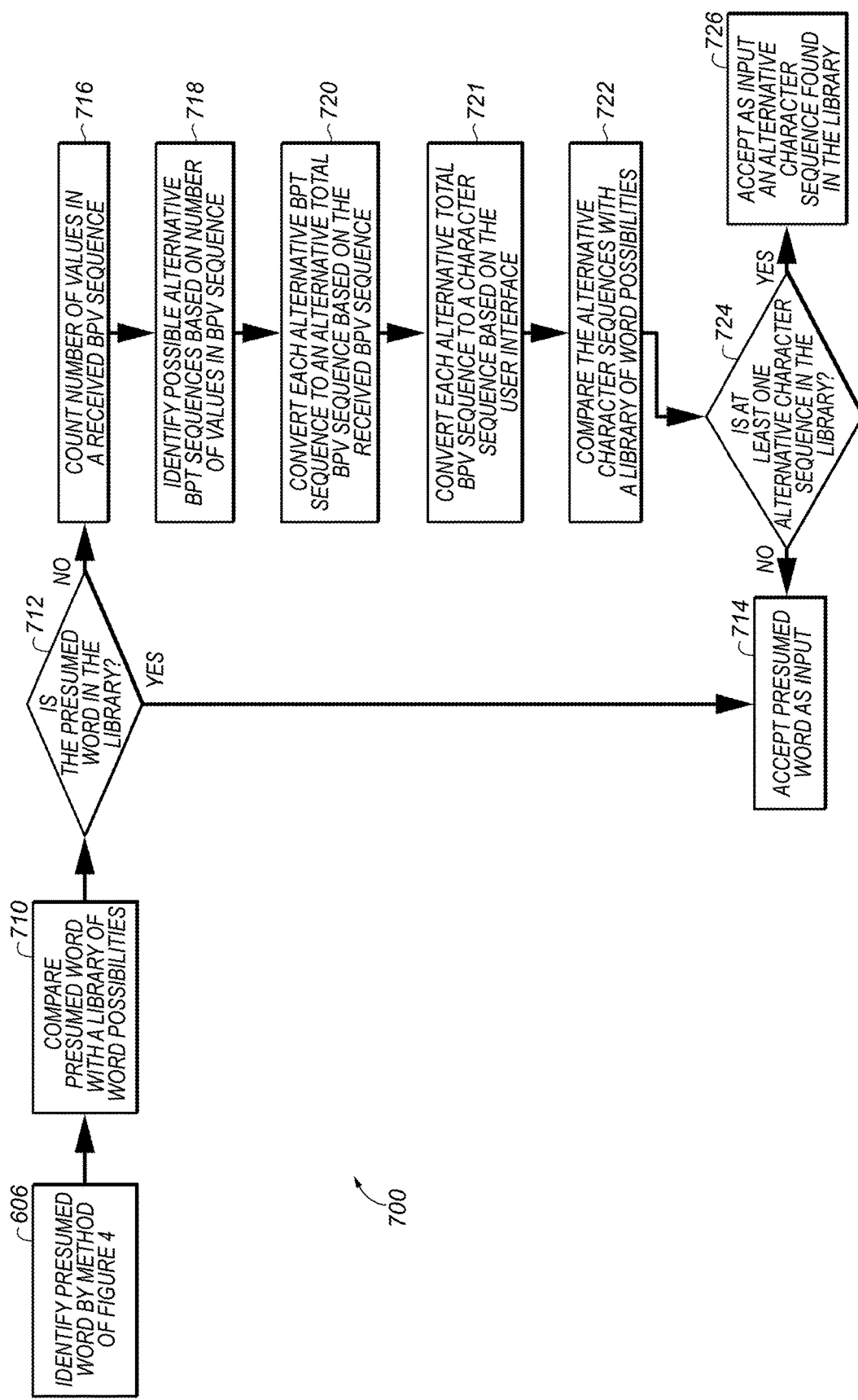
FIG. 19 is a flow diagram of another method for an electronic device to interpret button presses according to one illustrated embodiment.

FIG. 19 shows a method 700 that uses button press types 224 to identify a word from a received sequence of button presses. The method 700 uses the fact that for a word represented by a given number of button presses, only a finite and known number of button press type sequences is possible, as shown in FIGS. 15-18. The method is applicable to the problem of button press timing errors, such as those described in FIGS. 9-12.

The first step of the method 700 of FIG. 19 is the method 606 of FIGS. 4A and 4B. In the method 606 of FIGS. 4A and 4B, the CPU 108 interprets received button presses and from them constructs the character sequence 388. When used within the method 700 of FIG. 19, the constructed character sequence 388 is a presumed word 134.

In a next step 710 of the method 700, the CPU 108 compares the presumed word 134 with a library 136 of word possibilities. In a next step 712, the CPU 108 determines whether the presumed word 134 is found in the library 136 or not.

If the presumed word 134 is in the library 136, then in a next step 714 the CPU 108 accepts the presumed word as input.

If, however, the presumed word 134 is not in the library 136, then in a next step 716, the CPU 108 determines a number of values 202 in the BPV sequence 380. In one embodiment, the CPU 108 refers to the number of button presses 392 to determine the number of values 202 in the BPV sequence 380.

In a next step 718, the CPU 108 identifies the possible alternative BPT sequences 420. The possible alternative BPT sequences 420 are possible combinations of BPTs 224 with a number of button presses equal to the number of values 202 in the BPV sequence 380, excluding the received BPT sequence 382.

In a next step 720, the CPU 108 converts each alternative BPT sequence 420 to an alternative total BPV sequence 426 based on the received BPV sequence 380.

In a next step 721, the CPU 108 converts each alternative total BPV sequence 426 to an alternative character sequence 445 based on the characters 200 and menu positions 242 of the user interface 150.

In a next step 722, the CPU 108 compares each alternative character sequence 445 with the library 136 of word possibilities. Next, in a step 724 the CPU 108 determines whether any alternative character sequence 445 is found in the library 136.

If at least one alternative character sequence 445 is in the library 136, then in a step 7726 the CPU 108 accepts one of the found alternative sequences as input. If no alternative sequence 445 is in the library 136, then in the step 714 the CPU 108 accepts the presumed word 134 as input.

Figure 20:
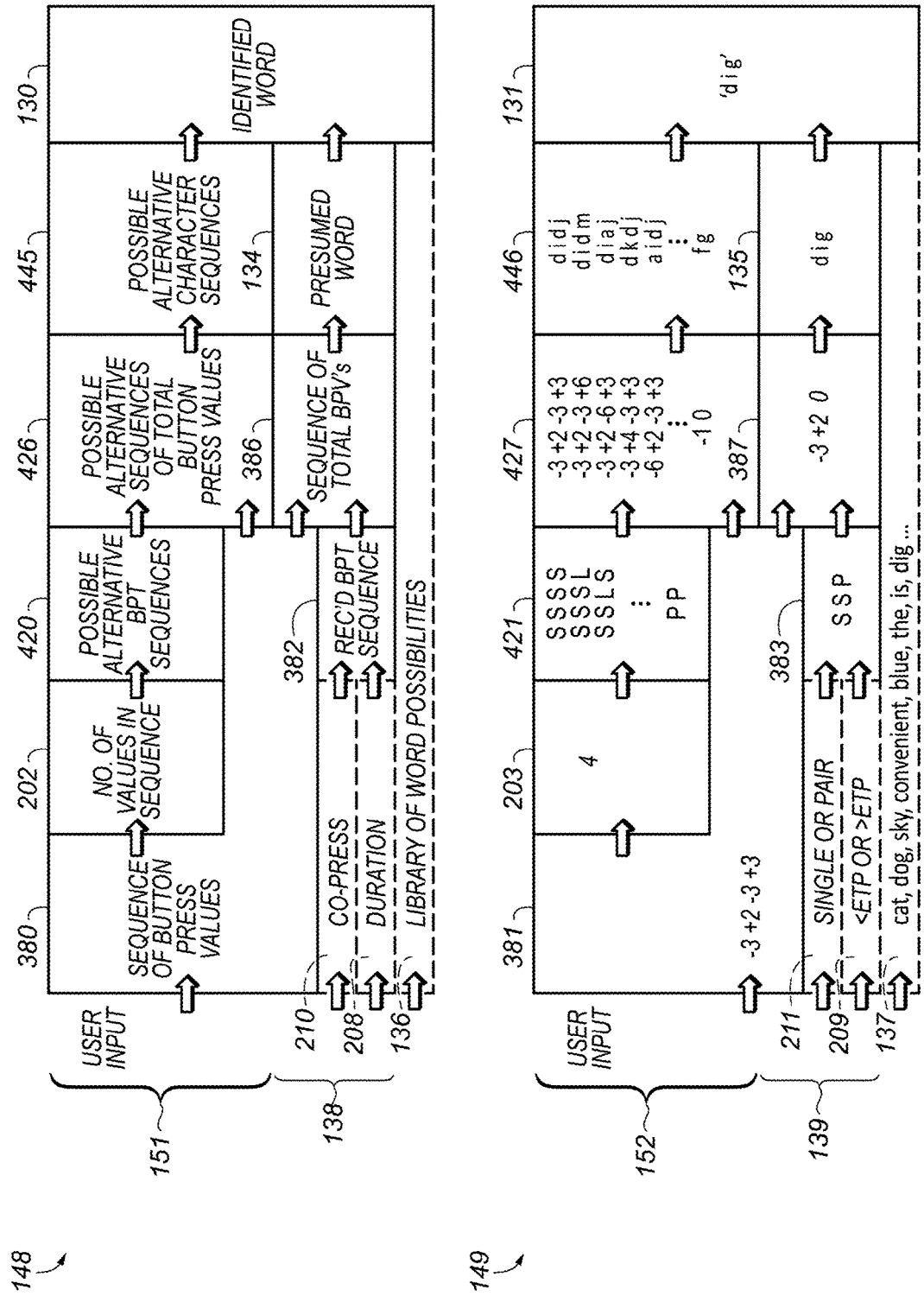
FIG. 20 is a flow diagram of variables and example values of variables of another method to interpret button presses according to one illustrated embodiment.

FIG. 20 shows third and fourth flowcharts 148, 149. The third flowchart 148 shows variables of the method 700 of FIG. 19. The fourth flowchart 149 shows example values for the variables of the third flowchart 148.

The third flowchart 148 includes within it three broad paths: (1) the first flowchart 138 of FIG. 5, (2) a sub-flowchart 151, and (3) the library 136 of word possibilities. The first flowchart 138 shows the progression of variables through the method 606 of FIGS. 4A and 3B that leads to the presumed word 134. The sub-flowchart 151 shows the progression of variables through the method 700 of FIG. 19 that lead to the possible alternative character sequences 445.

Of note is that the combination of the sub-flowchart 151 with the first flowchart 138 does not require any additional input variables. All the variables of the method 700 of FIG. 19 acquire their inputs from the variables already present in the method 606 of FIGS. 4A and 4B.

The first flowchart 138 of FIG. 5 has three initial input variables: (1) 'sequence of button press values' 380, (2) 'co-press' 210, and (3) 'duration' 208. Next in the flowchart, the variables 'co-press' 210 and 'duration' 208 together determine the variable 'sequence of button press types' 382, which occurs as a result of repeated loops through steps 620 and 640 of FIGS. 4A and 4B. Next, the variables 'sequence of button press values' 380 and 'sequence of button press types' 382 together determine the variable 'sequence of total button press values' 386, which occurs in step 672 of the method 606 of FIGS. 4A and 4B. Finally, the variable 'sequence of total button press values' 386 determines the variable 'presumed word' 134 which occurs in step 674 of the method 606 and is based on the user interface 150 of FIG. 2. The variable 'character sequence' 388 of FIG. 5 is the variable 'presumed word' 134 when used in the context of the method 700 of FIG. 19.

The sub-flowchart 151 has as user input only the variable 'sequence of button press values' 380. Next in the flowchart, the variable 'sequence of button press values' 380 determines the variable 'number of values in sequence' 202, which occurs in step 716 of the method 700. Next in the flowchart, the variable 'number of values in sequence' 202 determines the variable 'possible alternative BPT sequences' 420, which occurs in step 718. Next, the variables 'sequence of button press values' 380 and 'possible alternative BPT sequences' 420 together determine the variable 'possible alternative sequences of total BPVs' 426, which occurs in step 720. Next, the variable 'possible alternative sequences of total BPVs' 426 determines the variable 'possible alternative character sequences' 445, which occurs in step 721. Finally, the variables 'possible alternative character sequences' 445 and 'presumed word' 134 are compared with the variable 'library of words' 136 to determine the variable 'identified word' 130, which occurs in steps 710 and 722.

The fourth flowchart 149 shows example values for each variable of the third flowchart 148 for the embodiment of the user interface 150 of FIG. 2.

The variable 'sequence of button press values' 380 has the value '−3 +2 −3 +3' 381. The variable 'co-press' 210 has the values 'pair' or 'not' 211. The variable 'duration' has the values '<ETP' or '>ETP' 209. The variable 'sequence of button press types' 382 has the value 'short-short-pair' 383. The variable 'sequence of total button press values' 386 has the value '−3 +2 0' 387. The variable 'presumed word' 134 has the value 'd i g' 135. The variable 'number of values in sequence' 202 has the value '4' 203. The variable 'possible alternative BPT sequences' 420 has as values an array of BPTs 'S S S S, S S S L, S S L S P P' 421. The variable 'possible alternative sequences of total BPVs' 426 has as values an array of value sequences '−3 +2 −3 +3, −3 +2 −3 +6, −3 +2 −6 +3 . . . −1 0' 427. The variable 'possible alternative character sequences' 445 has as values an array of character sequences 'd i d j, d i d m, d i a j . . . f g' 446. The variable 'identified word' 130 has the value 'd i g' 131. The variable library 136 of word possibilities has as values word possibilities such as 'cat, dog, sky, convenient, blue, the, is, dig . . . ' 137.

The values of the fourth flowchart 149 are examples used to demonstrate the embodiments of FIGS. 2, 4 and 19. The scope of the invention is not limited by the variables and particular values shown here, but rather by the scope of the claims.

Figure 21:
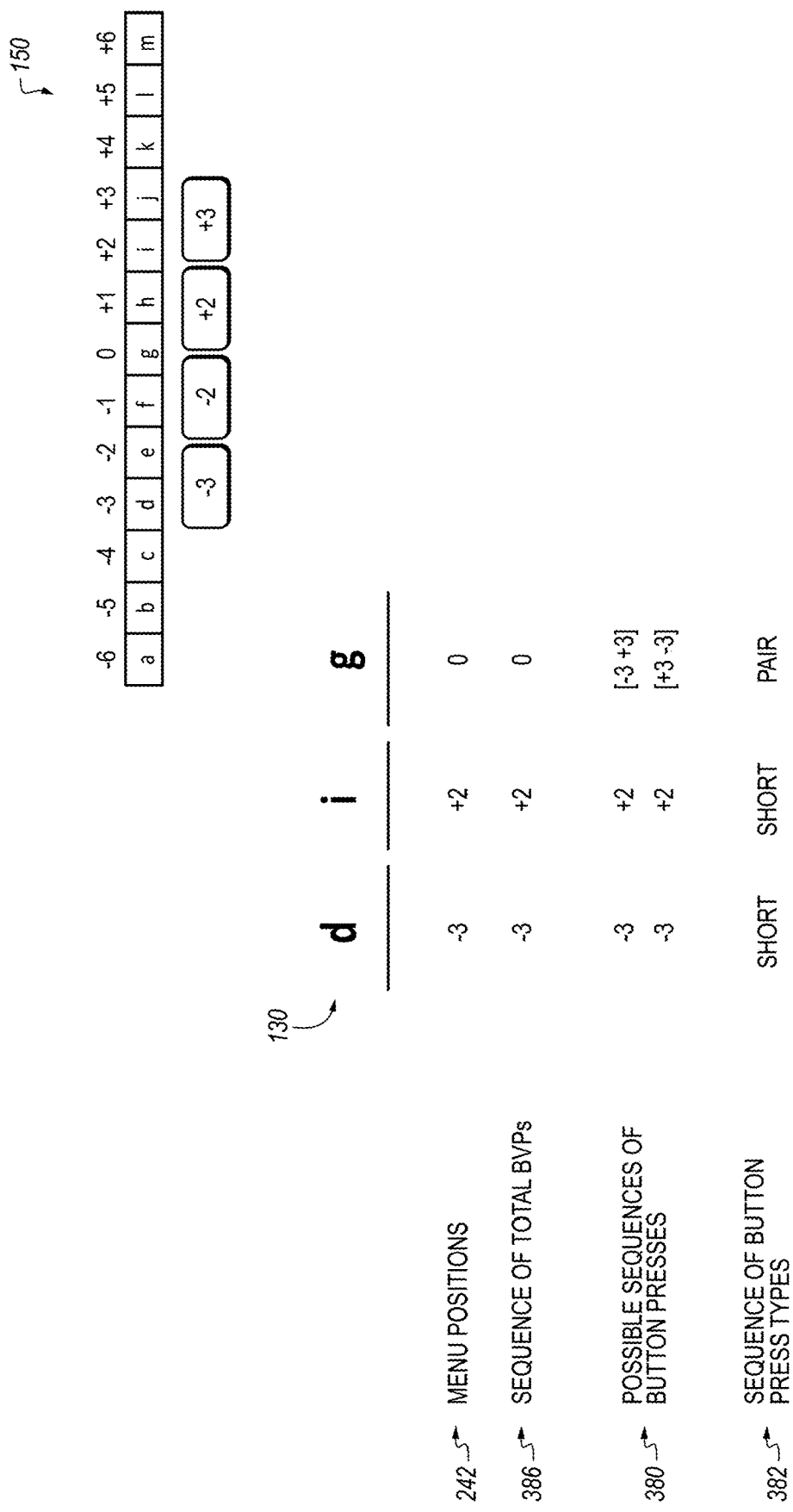
FIGS. 21-23 are examples of an application of a method of word identification according to one illustrated embodiment.

FIG. 21 shows values for the variables 'sequence of BPVs' 380 and 'sequence of BPTs' 382 that identify the word 130 'dig' according to the user interface 150 of FIG. 2. The menu positions 242 are '−3 +2 0'. The sequence of total BPVs 386 is '−3 +2 0'. The possible sequences of BPVs 380 are '−3 +2 −3 +3' and '−3 +2 +3 −3'. Two BPV sequences are possible because the third and fourth values of the sequence are values of a pair BPT 350. So in pressing buttons 110 to input the character 200 'g', a user could input those values in either order. The sequence of BPTs 382 is 'short-short-pair'.

Figure 22:
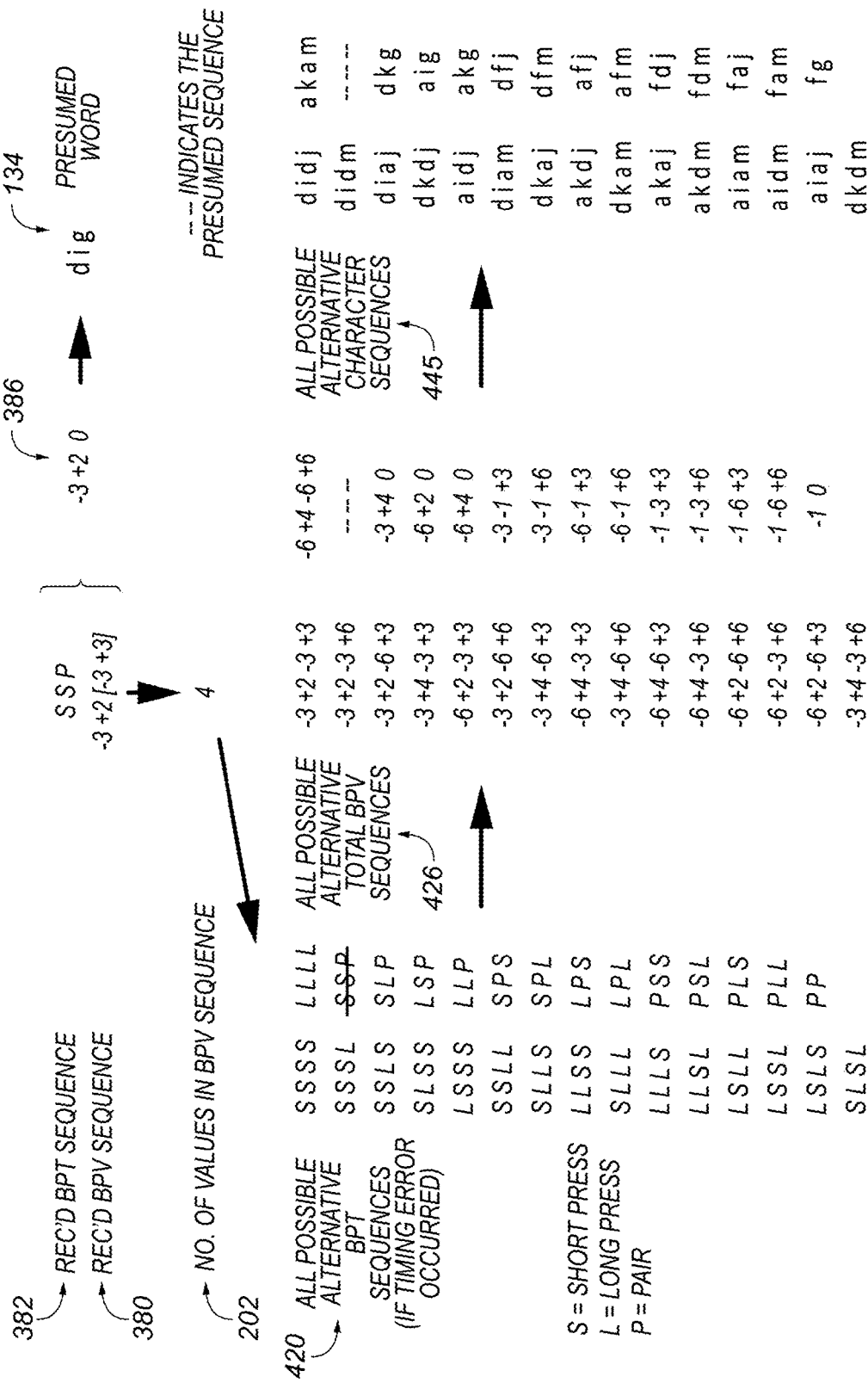
Figure 23:
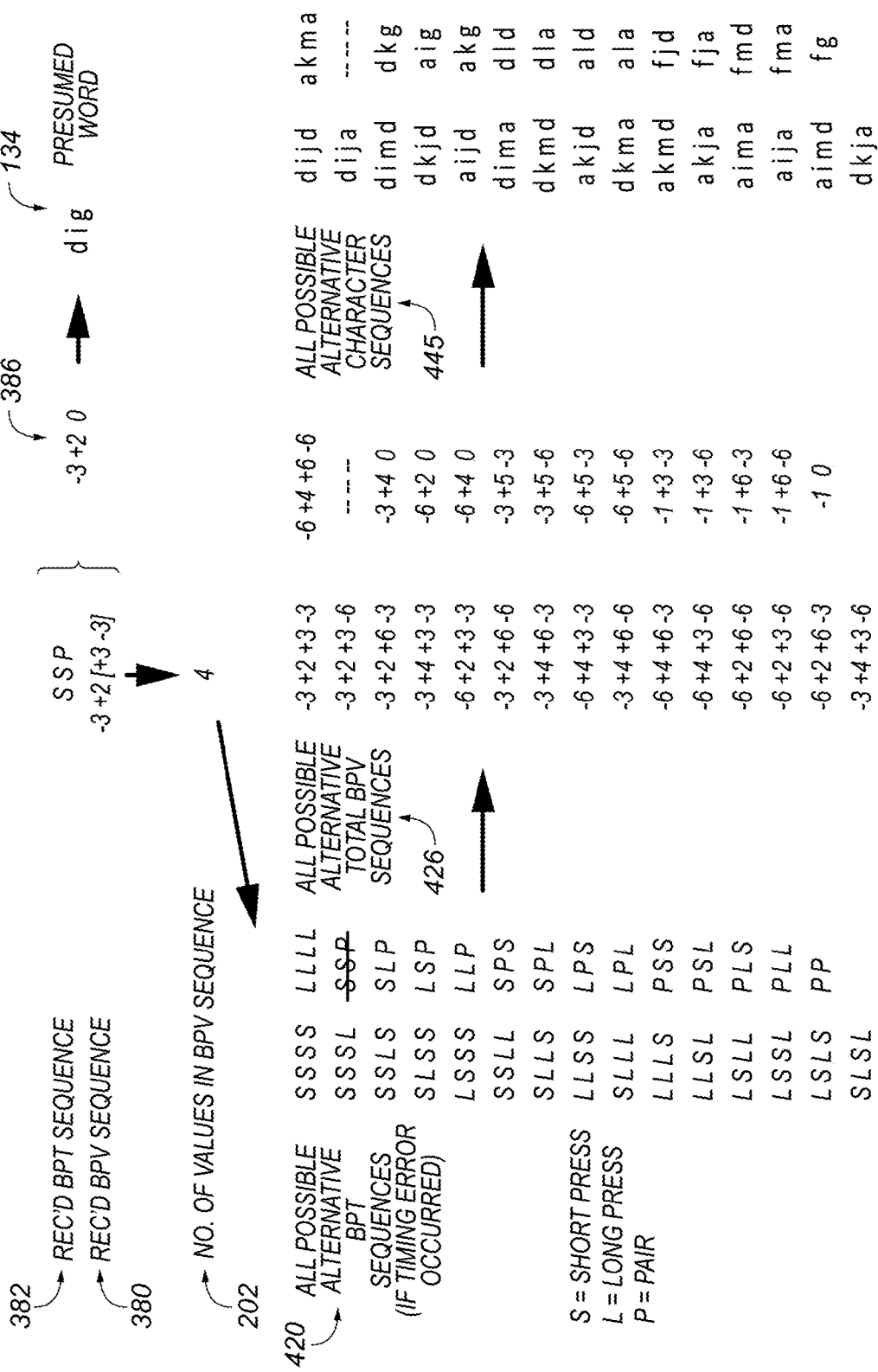

FIGS. 22 and 23 each show an example of the method 700 of FIG. 19 that interprets a received sequence of button presses to identify the word 'dig'.

For the example of FIG. 22, the received BPV sequence 380 is '−3 +2 −3 +3'. The received BPT sequence 382 is 'short-short-pair'. The first step 606 of the method 700 of FIG. 19 yields the total BPV sequence 386 '−3 +2 0' and then the presumed word 134 'dig'. The step 716 of the method 700 of FIG. 19 yields the number of values in BPV sequence 202, which is 4. The step 718 of the method 700 yields the possible alternative BPT sequences 420 shown of which there are 28. The step 720 of the method 700 yields the possible alternative total BPV sequences 426 shown. The step 721 of the method 700 yields the possible alternative character sequences 445 shown. The steps 710 and 722 of the method 700 compare the presumed word 134 'dig' and the 28 possible alternative character sequences 445 with the library 136 of word possibilities. For the example of FIG. 22, no sensible word alternatives exist, therefore in the step 714 the presumed word 134 'dig' is interpreted as input.

For the example of FIG. 23, the received BPV sequence 380 is '−3 +2 +3 −3'. The received BPT sequence 382 is 'short-short-pair'. The first step 606 of the method 700 of FIG. 19 yields the total BPV sequence 386 '−3 +2 0' and then the presumed word 134 'dig'. The step 716 of the method 700 of FIG. 19 yields the number of values in BPV sequence 202, which is 4. The step 718 of the method 700 yields the possible alternative BPT sequences 420 shown of which there are 28. The step 720 of the method 700 yields the possible alternative total BPV sequences 426 shown. The step 721 of the method 700 yields the possible alternative character sequences 445 shown. The steps 710 and 722 of the method 700 compare the presumed word 134 'dig' and the 28 possible alternative character sequences 445 with the library 136 of word possibilities. For the example of FIG. 23, no sensible word alternatives exist, therefore in the step 714 the presumed word 134 'dig' is interpreted as input.

Figure 24:
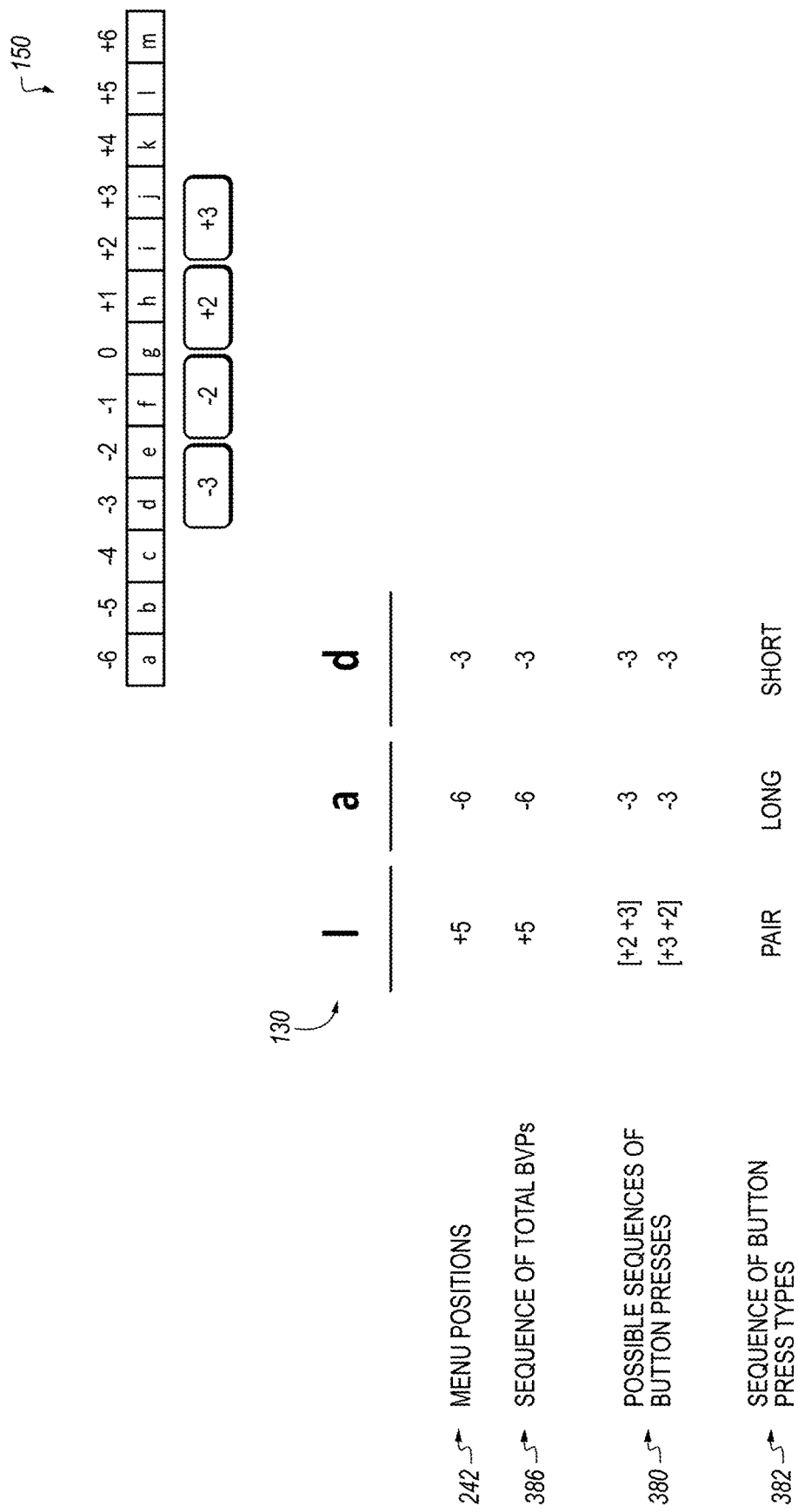
FIGS. 24-26 are additional examples of an application of a method of word identification according to one illustrated embodiment.

FIG. 24 shows values for the variables 'sequence of BPVs' 380 and 'sequence of BPTs' 382 that identify the word 130 'lad' according to the user interface 150 of FIG. 2. The menu positions 242 are '+5 −6 −3'. The sequence of total BPVs 386 is '+5 −6 −3'. The possible sequence of BPVs 380 are '+2 +3 −3 −3' and '+3 +2 −3 −3'. Two BPV sequences are possible because the first and second values of the sequence are values of a pair BPT 350. So in pressing buttons 110 to input the character 200 'l', a user could input those values in either order. The sequence of BPTs 382 is 'pair-long-short'.

Figure 25:
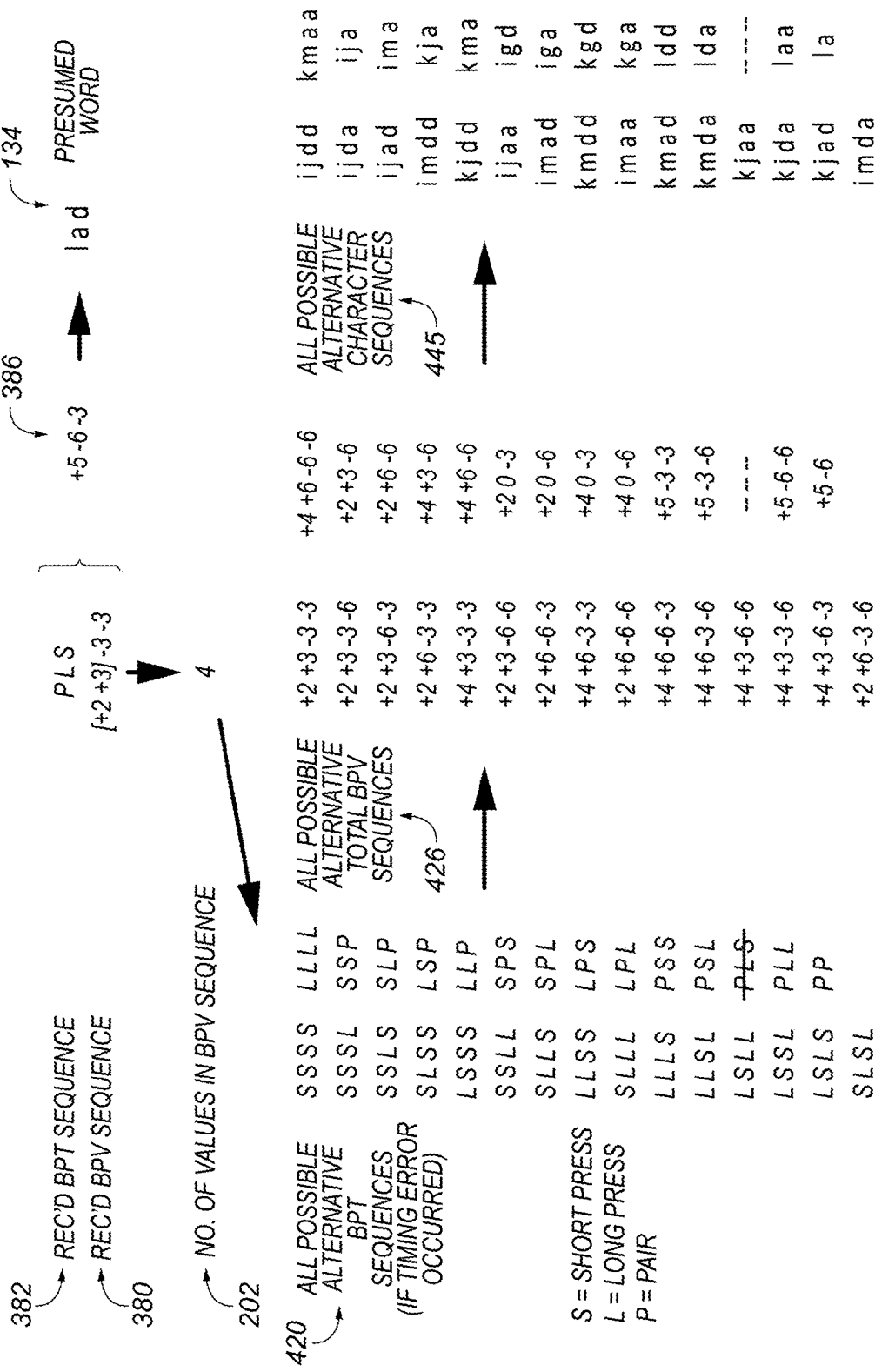
Figure 26:
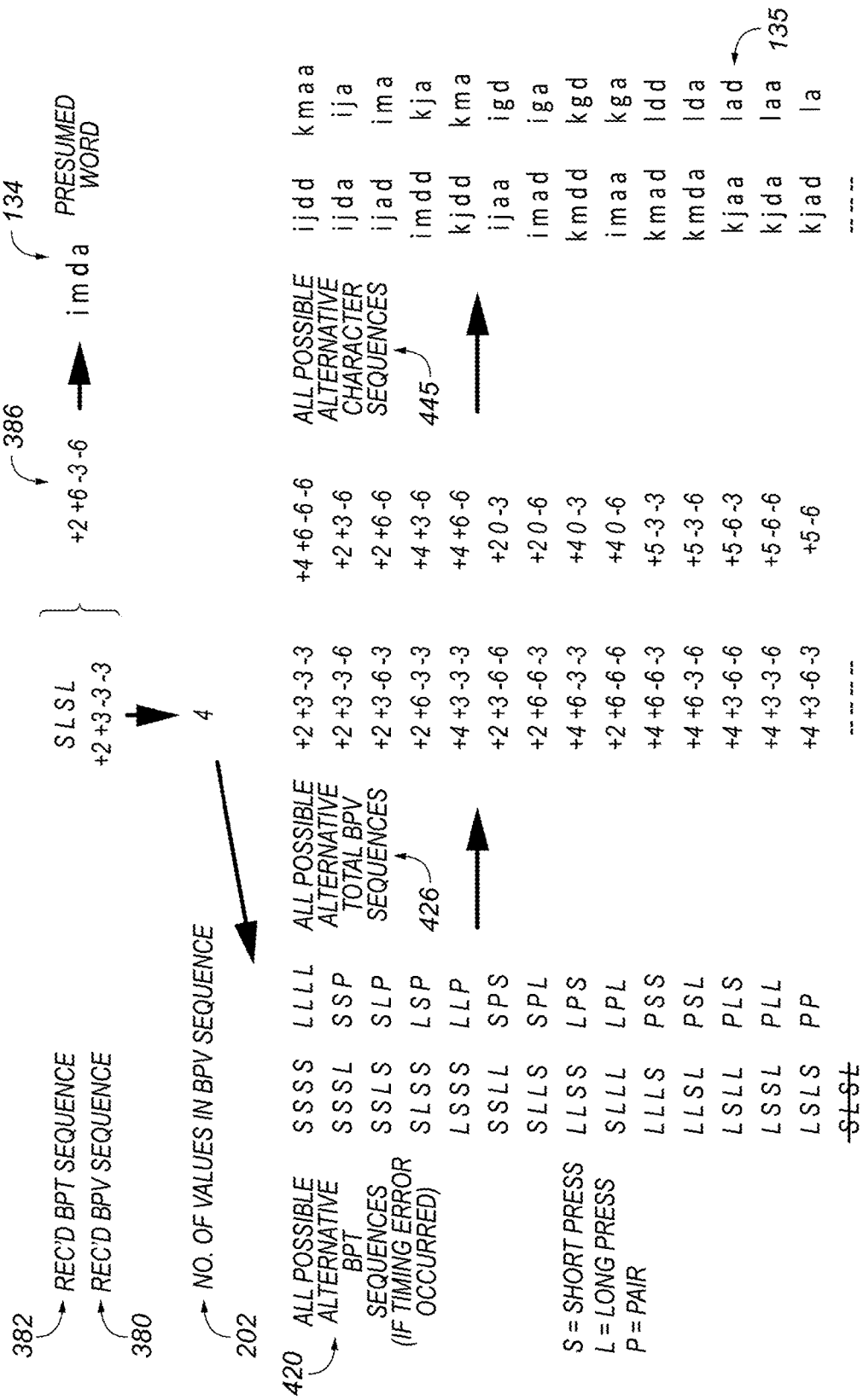

FIGS. 25 and 26 each show an example of the method 700 of FIG. 19 that interprets a received sequence of button presses to identify the word 'lad'.

For the example of FIG. 25, the received BPV sequence 380 is '+2 +3 −3 −3'. The received BPT sequence 382 is 'pair-long-short'. The first step 606 of the method 700 of FIG. 19 yields the total BPV sequence 386 '+5 −6 −3' and then the presumed word 134 'lad'. The step 716 of the method 700 of FIG. 19 yields the number of values in BPV sequence 202, which is 4. The step 718 of the method 700 yields the possible alternative BPT sequences 420 shown of which there are 28. The step 720 of the method 700 yields the possible alternative total BPV sequences 426 shown. The step 721 of the method 700 yields the possible alternative character sequences 445 shown. The steps 710 and 722 of the method 700 compare the presumed word 134 'lad' and the 28 possible alternative character sequences 445 with the library 136 of word possibilities. For the example of FIG. 25, no sensible word alternatives exist, therefore in the step 714 the presumed word 134 'lad' is interpreted as input.

For the example of FIG. 26, the received BPV sequence 380 is '+3 +2 −3 −3'. The received BPT sequence 382 is 'pair-long-short'. The first step 606 of the method 700 of FIG. 19 yields the total BPV sequence 386 '+5 −6 −3' and then the presumed word 134 'lad'. The step 716 of the method 700 of FIG. 19 yields the number of values in BPV sequence 202, which is 4. The step 718 of the method 700 yields the possible alternative BPT sequences 420 shown of which there are 28. The step 720 of the method 700 yields the possible alternative total BPV sequences 426 shown. The step 721 of the method 700 yields the possible alternative character sequences 445 shown. The steps 710 and 722 of the method 700 compare the presumed word 134 'lad' and the 28 possible alternative character sequences 445 with the library 136 of word possibilities. For the example of FIG. 26, no sensible word alternatives exist, therefore in the step 714 the presumed word 134 'lad' is interpreted as input.

For the example of FIG. 26, the received BPV sequence 380 is also '+2 +3 −3 −3', but the received BPT sequence 382 is 'short-long-short-long', which is not accurate for the intended word 'lad'. The first step 606 of the method 700 of FIG. 19 yields the total BPV sequence 386 '+2 +6 −3 −6' and then the presumed word 134 'imda'. The step 716 of the method 700 of FIG. 19 yields the number of values in BPV sequence 202, which is 4. The step 718 of the method 700 yields the possible alternative BPT sequences 420 shown of which there are 28. The step 720 of the method 700 yields the possible alternative total BPV sequences 426 shown. The step 721 of the method 700 yields the possible alternative character sequences 445 shown. The steps 710 and 722 of the method 700 compare the presumed word 134 'imda' and the 28 possible alternative character sequences 445 with the library 136 of word possibilities. For the example of FIG. 26, the presumed word is not sensible but the known word 'lad' appears in the list of alternatives. Therefore, in the step 726 a particular alternative character sequence 135 'lad' is interpreted as input.

FIG. 27 lists the error cases 397 of FIG. 13 with an additional column that identifies a likelihood 406 that each error case occurs. Due to the nature of the user interface 150, some error cases 397 are significantly less likely than others. The explanation 404 describes the button timing error that must happen in order for each error case 397 to occur. In general, error cases that result from pressing a button too soon are more likely than errors caused by pressing a button too late. FIG. 27 separates the error cases into two categories (high 409 and low 407) based on the likelihood 406 that the error case occurs.

Figure 28:
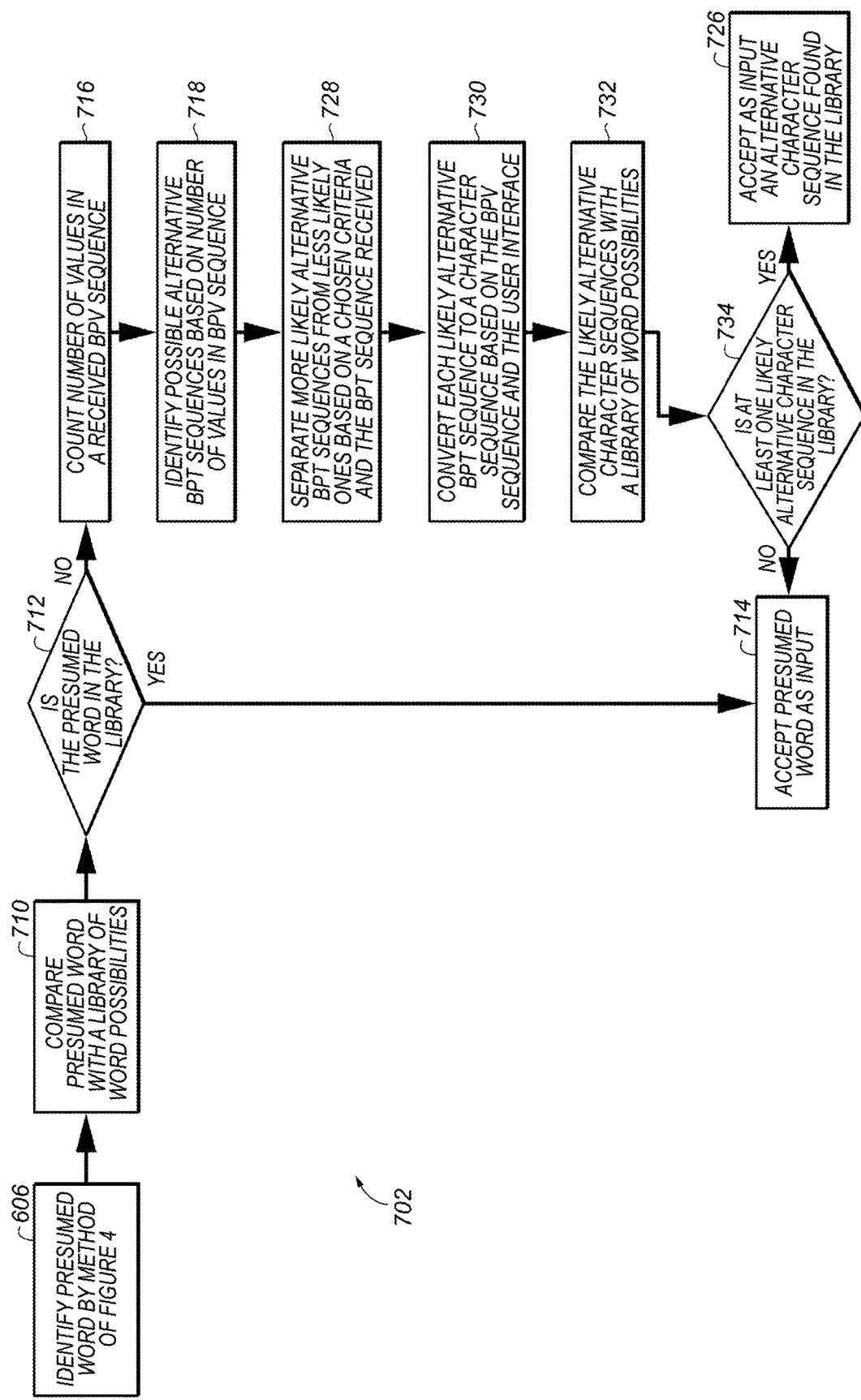
FIG. 28 is a flow diagram of yet another method for an electronic device to interpret button presses according to one illustrated embodiment.

FIG. 28 shows a method 702 that uses button press types and the likelihood 406 of the error case 397 to identify a word from a received sequence of button presses. The method 702 uses the fact that for button press timing errors, some error cases 397 are more likely than others.

The first step of the method 702 of FIG. 28 is the method 606 of FIGS. 4A and 4B. In the method 606 of FIGS. 4A and 4B, the CPU 108 interprets received button presses and from them constructs the character sequence 388. When used within the method 702 of FIG. 28, the constructed character sequence 388 is the presumed word 134.

In the next step 710 of the method 702, the CPU 108 compares the presumed word 134 with a library 136 of word possibilities. In the next step 712, the CPU 108 determines whether the presumed word 134 is found in the library 136 or not.

If the presumed word 134 is in the library 136, then in the next step 714 the CPU 108 accepts the presumed word as input.

If, however, the presumed word 134 is not in the library 136, then in the next step 716, the CPU 108 determines the number of values 202 in the BPV sequence 380. In one embodiment, the CPU 108 refers to the number of button presses 392 to determine the number of values 202 in the BPV sequence 380.

In the next step 718, the CPU 108 identifies the possible alternative BPT sequences 420. The possible alternative BPT sequences 420 are possible combinations of BPTs 224 with a number of button presses equal to the number of values 202 in the BPV sequence 380, excluding the received BPT sequence 382.

In a next step 728, the CPU 108 separates possible alternative BPT sequences 420 that are more likely from ones that are less likely. The CPU 108 separates the sequences 420 based on the BPT sequence 382 received and one or more of the following: (1) the error case or cases 397 of FIG. 13 that would have to take place for each alternative BPT sequence 420 to become the received BPT sequence 382, (2) the likelihood of occurrence for the particular error case 397 to take place, (3) the number of error cases 397 needed for the alternative BPT sequence 420 to become the received BPT sequence 382, and (4) any other criteria that impacts likelihood of occurrence.

In a next step 730, the CPU 108 converts each likely alternative BPT sequence 420 to a likely alternative character sequence 446 based on the BPV sequence 380 and the characters 200 and menu positions 242 of the user interface 150.

In a next step 732, the CPU 108 compares each likely alternative character sequence 446 with the library 136 of word possibilities. Next, in a step 734 the CPU 108 determines whether any likely alternative character sequence 446 is found in the library 136.

If at least one likely alternative character sequence 446 is in the library 136, then in the step 726 the CPU 108 accepts one of the found alternative sequences as input. If no likely alternative sequence 446 is in the library 136, then in the step 714 the CPU 108 accepts the presumed word 134 as input.

Figure 29:
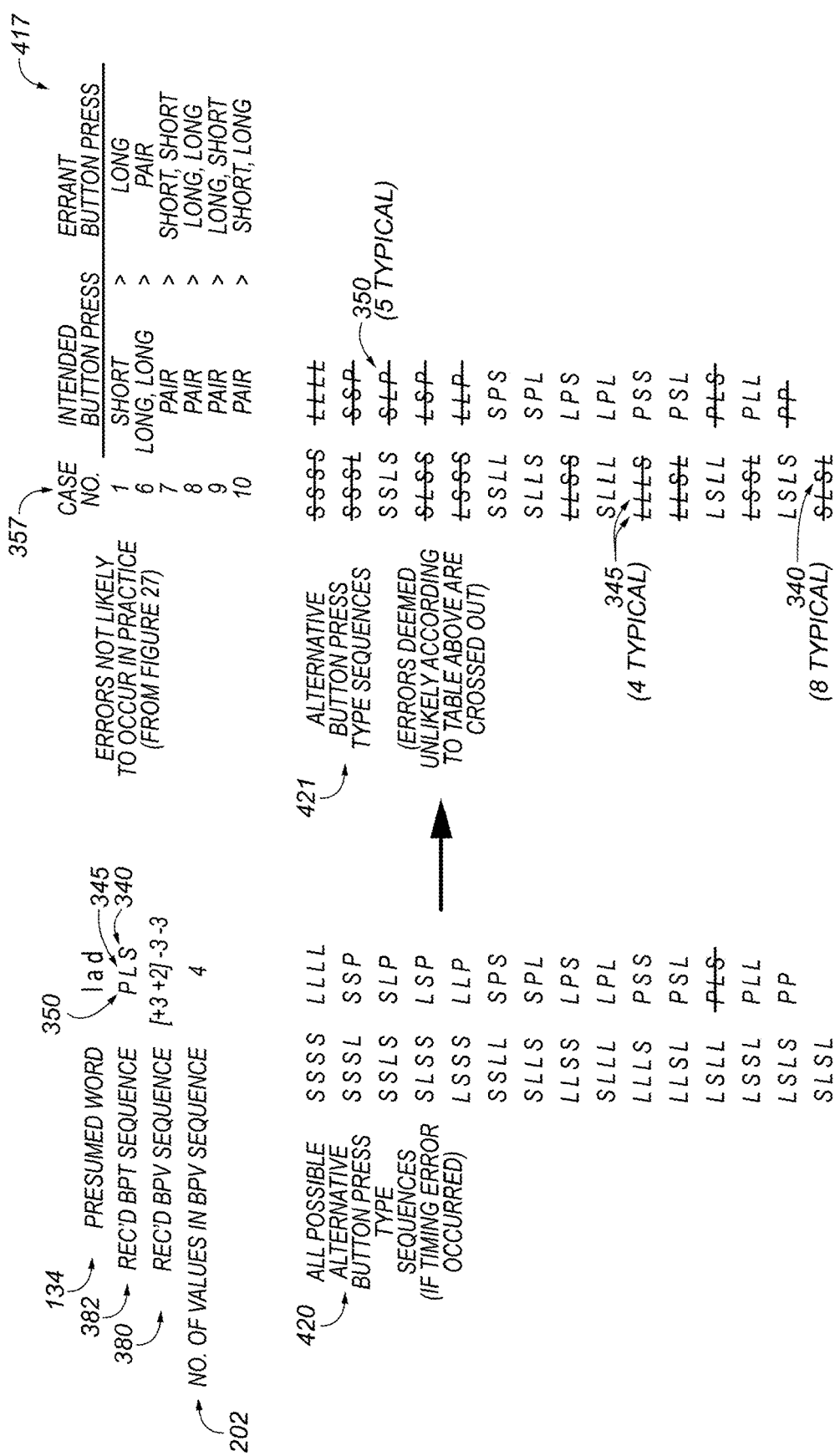
FIGS. 29-31 are additional examples of an application of yet another method of word identification according to one illustrated embodiment.

FIG. 29 shows a table of unlikely error cases 417, the presumed word 134 'lad', the BPT sequence 382, the received BPV sequence 380, the number of values in the sequence 202, the possible alternative BPT sequences 420 for a 4-button-press sequence, and a plurality of likely alternative BPT sequences 421. The likely alternative BPT sequences 421 do not include those BPT sequences that would require the error cases 397 of the table 417 to occur in order for the received BPT sequence 382 'pair-long-short' to be received. The likely alternative BPT sequences 421 are the alternative BPT sequences not crossed out.

For example, all the alternative BPT sequences in which the third position is the short BPT 340 are removed. These sequences are removed because the 'long' BPT 345 is in the third button press position of the BPT sequence 382 and Case 1 in the table 417 indicates that an error from the short BPT 340 to the long BPT 345 is not likely. The unlikelihood of Case 1 removes eight BPT sequences 420 from consideration.

In another example, the sequences 420 having the long BPT 345 in the first two button press positions are removed. For these sequences 420 to be likely, they require Case 6 to occur, i.e., for two consecutive long BPTs to become the pair BPT 350.

In another example, the sequences 420 having the pair BPT 30 in the third and fourth button press positions are removed. Not only are these alternative BPTs 420 unlikely based on Case 9, they are actually impossible due to the fact that the BPV sequence 380 has the same value in both the third and fourth positions of the sequence 420. The pair BPT 350 must be two different BPVs, so these particular alternative BPT sequences 420 are impossible.

Figure 30:
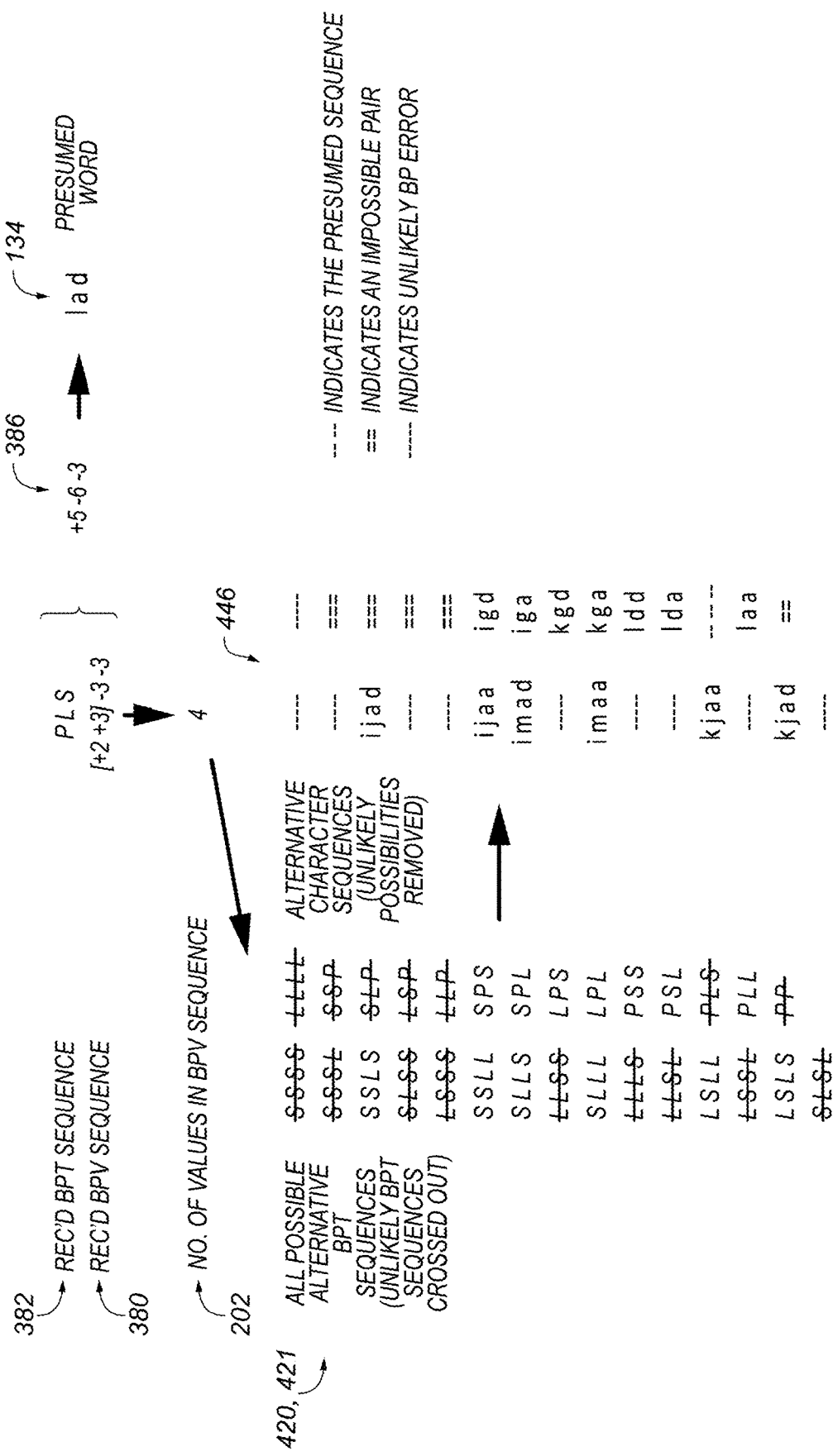
Figure 31:
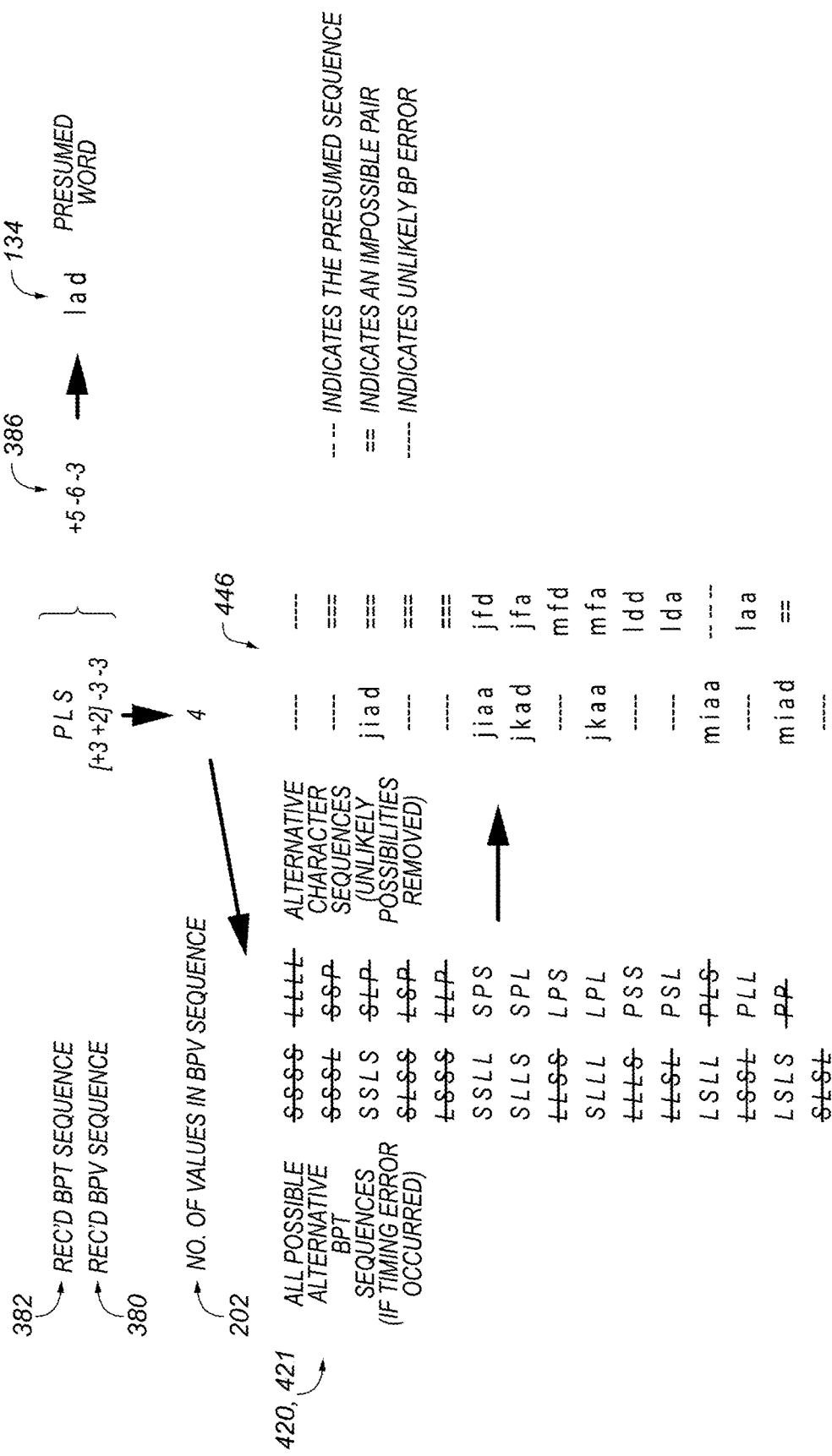

FIGS. 30 and 31 each show an example of the method 702 of FIG. 28 that interprets a received sequence of button presses. In these examples, the method 702 identifies the word 'lad'.

For the example of FIG. 30, the received BPV sequence 380 is '+2 +3 −3 −3'. The received BPT sequence 382 is 'pair-long-short'. The first step 606 of the method 702 of FIG. 28 yields the total BPV sequence 386 '+5 −6 −3' and then the presumed word 134 'lad'. The step 716 of the method 702 of FIG. 28 yields the number of values in BPV sequence 202, which is 4. The step 718 of the method 702 yields the possible alternative BPT sequences 420 shown of which there are 28. The step 728 of the method 702 yields likely alternative BPT sequences 421 based on the BPT sequence 382 received and the table of unlikely error cases 417 of FIG. 29. The likely alternative BPT sequences 421 are those sequences not crossed out in FIG. 30. The step 730 of the method 702 yields the likely alternative character sequences 446. The steps 710 and 732 of the method 702 compare the presumed word 134 'lad' and the 13 likely alternative character sequences 446 with the library 136 of word possibilities. For the example of FIG. 30, no sensible word alternatives exist, therefore in the step 714 the presumed word 134 'lad' is interpreted as input.

For the example of FIG. 31, the received BPV sequence 380 is '+3 +2 −3 −3'. The received BPT sequence 382 is 'pair-long-short'. The first step 606 of the method 702 of FIG. 28 yields the total BPV sequence 386 '+5 −6 −3' and then the presumed word 134 'lad'. The step 716 of the method 702 of FIG. 28 yields the number of values in BPV sequence 202, which is 4. The step 718 of the method 702 yields the possible alternative BPT sequences 420 shown of which there are 28. The step 728 of the method 702 yields the likely alternative BPT sequences 421 based on the BPT sequence 382 received and the table of unlikely error cases 417 of FIG. 29. The likely alternative BPT sequences 421 are those sequences not crossed out in FIG. 31. The step 730 of the method 702 yields the likely alternative character sequences 446. The steps 710 and 732 of the method 702 compare the presumed word 134 'lad' and the 13 likely alternative character sequences 446 with the library 136 of word possibilities. For the example of FIG. 31, no sensible word alternatives exist, therefore in the step 714 the presumed word 134 'lad' is interpreted as input.

FIG. 32 shows the error cases 397 of FIG. 13 ranked according to likelihood of occurrence. The cases 397 are ranked 408 from most to least likely. The likelihood of occurrence depends on the particular button press error (or errors) that must occur for a received BPT sequence 382 to be created from the alternative BPT sequence 420. The intended BPT 400 is the individual BPT (or BPTs) 224 of the alternative character sequence 420 that distinguishes the alternative BPT sequence from the received BPT sequence 382. The errant BPT 402 is the individual BPT (or BPTs) 224 of the received BPT sequence 382 that were errantly entered.

Case 2 is the highest ranked case because it is the error that occurs when a user presses selection buttons too quickly. The long BPT 345 requires a user to press and hold the selection button until the elapsed time period (ETP) 330 expires. When typing in haste, a user may intend to hold the selection button 110 until expiration 331 but accidentally release the button too quickly, as represented in the bottom graphic 311 of FIG. 10. This error is common when a user speeds up their typing pace.

Cases 3-6 are the next highest ranked for the same reason as Case 2, except instead of releasing a selection button 110 before expiration 330, the cause is pressing the subsequent button press 332 before expiration of the ETP. Error cases 3-6 cause button presses intended to be consecutive to become the pair BPT 450. Each of these four error cases is represented by the graphics 312, 314, 316, 318 in FIGS. 11 and 12 by a downward progression from (a) to (b) of the bi-directional arrow.

Case 1 is the next highest ranked error case 397. Case 1 occurs when a user fails to release the selection button 110 before expiration 331 of the ETP 330. Typically a user chooses the duration 208 of the ETP 330 that avoids this from happening, so in practice Case 1 is not a common error.

Cases 7-10 typically occur when the duration 208 of the ETP 330 is set too short for practical use. In these cases, a user fails to complete the second selection button press 333 of the pair BPT 350 before expiration 331 of the ETP 330. Each of these four error cases is represented by the graphics 313, 315, 317, 319 in FIGS. 11 and 12 by a upward progression from (b) to (a) of the bi-directional arrow. In practice, when these errors occur, there are lots of them. One solution is to increase the ETP 330.

FIG. 33 shows all possible alternative BPT sequences 420 for each of three example BPT sequences 382: S S L, S L S, L S L. As explained in FIGS. 15-18, the unique BPT sequences that can be derived from a BPT sequence 382 is a function only of the number of button presses in the sequence. Therefore the 3-button-press examples of FIG. 33 all have the same list of possible alternative BPT sequences 420, except for the received BPT sequence 382 itself, which for each example is omitted from the list of alternates 420. As shown in FIG. 17, for a 3-button-press word the number of possible unique BPT sequences is 12. Therefore, after omitting the received BPT sequence 382 as a possibility, for each example the number of possible alternative BPT sequences 420 is 11.

FIG. 33 also shows individual BPT errors required to create each of the alternative BPT sequences 420 for each example. As described in FIG. 32, the intended BPT 400 is the individual BPT (or BPTs) 224 of the alternative character sequence 420 that distinguishes the alternative BPT sequence from the received BPT sequence 382. The errant BPT 402 is the individual BPT (or BPTs) 224 of the received BPT sequence 382 that are errantly entered and lead to the received BPT sequence 382. The difference in BPT between the intended BPT 400 and the errant BPT 402 is the error case 397 identified for each alternative BPT sequence 420 of FIG. 33.

For example, for the received BPT sequence S S L, a first alternative BPT sequence 451 is S S S. To create the BPT sequence S S L from S S S requires that an intended BPT S be errantly entered as L, which corresponds with Case 1 of FIG. 13. In another example, for the received BPT sequence S L S, a second alternative BPT sequence 452 is L P. To create the BPT sequence S L S from L P requires that an intended BPT L be errantly entered as S, and an intended BPT P be errantly entered as L S. These errors correspond with Case 2 and Case 9, respectively. In another example, for the received BPT sequence L S L, a third alternative BPT sequence 453 is S L L. To create the BPT sequence L S L from S L L requires that an intended BPT S be errantly entered as L, and an intended BPT L be errantly entered as S. These errors correspond with Case 1 and Case 2, respectively.

FIG. 34 shows all possible alternative BPT sequences 420 for all five possible 2-button-press BPT sequences 382: S S, S L, L S, L L, and P. Furthermore, the alternative BPT sequences 420 for each BPT sequence 382 are shown as a plurality of ranked alternative BPT sequences 425.

Each 2-button-press BPT sequence 382 has four possible alternative BPT sequences 420. For each alternative BPT sequence 420, the rank 408 of the error case 397 required to create the received BPT sequence 382 for that alternative BPT sequence 420 is also shown.

For example, for the received BPT sequence S L, a fourth alternative BPT sequence 454 is S S. To create the BPT sequence S L from S S requires that an intended BPT S be errantly entered as L, which corresponds with Case 1 of FIG. 13. FIG. 32 shows that Case 1 corresponds with Rank 6, as shown for the example alternative BPT sequence 454 of FIG. 34. In another example, for the received BPT sequence P, a fifth alternative BPT sequence 455 is L L. To create the BPT sequence P from L L requires that an intended BPT L L be errantly entered as P, which corresponds with Case 6 of FIG. 13. FIG. 32 shows that Case 6 corresponds with Rank 5, as shown for the example alternative BPT sequence 455 of FIG. 34.

FIG. 34 shows the alternative BPT sequences 420 for each BPT sequence 382 listed in order of error rank 408 from most to least likely to occur. For BPT sequences 382 where, in some instances, more than one error case is needed to create the received BPT sequence 382, alternative BPT sequences 420 that require fewer error cases to create are prioritized ahead of sequences 420 that require more error cases to create.

FIGS. 35 and 36 together show all possible alternative BPT sequences 420 for all twelve possible 3-button-press BPT sequences 382: S S S, S S L, S L S, L S S, S L L, L L S, L S L, L L L, S P, L P, P S, and P L. Furthermore, the alternative BPT sequences 420 for each BPT sequence 382 are shown as a plurality of ranked alternative BPT sequences 425.

Each 3-button-press BPT sequence 382 has eleven possible alternative BPT sequences 420. For each alternative BPT sequence 420, the rank 408 of the error case 397 required to create the received BPT sequence 382 for that alternative BPT sequence 420 is also shown.

For example, for the received BPT sequence S L S, a sixth alternative BPT sequence 456 is S P. To create the BPT sequence S L S from S P requires that an intended BPT P be errantly entered as L S, which corresponds with Case 9 of FIG. 13. FIG. 32 shows that Case 9 corresponds with Rank 8, as shown for the example alternative BPT sequence 456 of FIG. 35. In another example, for the received BPT sequence P S, a seventh alternative BPT sequence 457 is L S L. To create the BPT sequence P S from L S L requires that an intended BPT L S be errantly entered as P, and an intended BPT L be errantly entered as S. These errors correspond with Case 4 and Case 2, respectively, of FIG. 13. FIG. 32 shows that Case 4 corresponds with Rank 4, and Case 2 corresponds with Rank 1, both of which are shown for the example alternative BPT sequence 456 of FIG. 36.

The alternative BPT sequences 420 for each BPT sequence 382 are listed in order by rank 408 from most to least likely to occur. For BPT sequences 382 where, in some instances, more than one error case is needed to create the received BPT sequence 382, alternative BPT sequences 420 that require fewer error cases to create are prioritized ahead of sequences 420 that require more error cases to create. In instances of more than one alternative BPT sequences 420 with more than one rank 408, the highest error rank is the first tie-breaker, the next highest rank is the next tie-breaker, and so on.

Figure 37A:
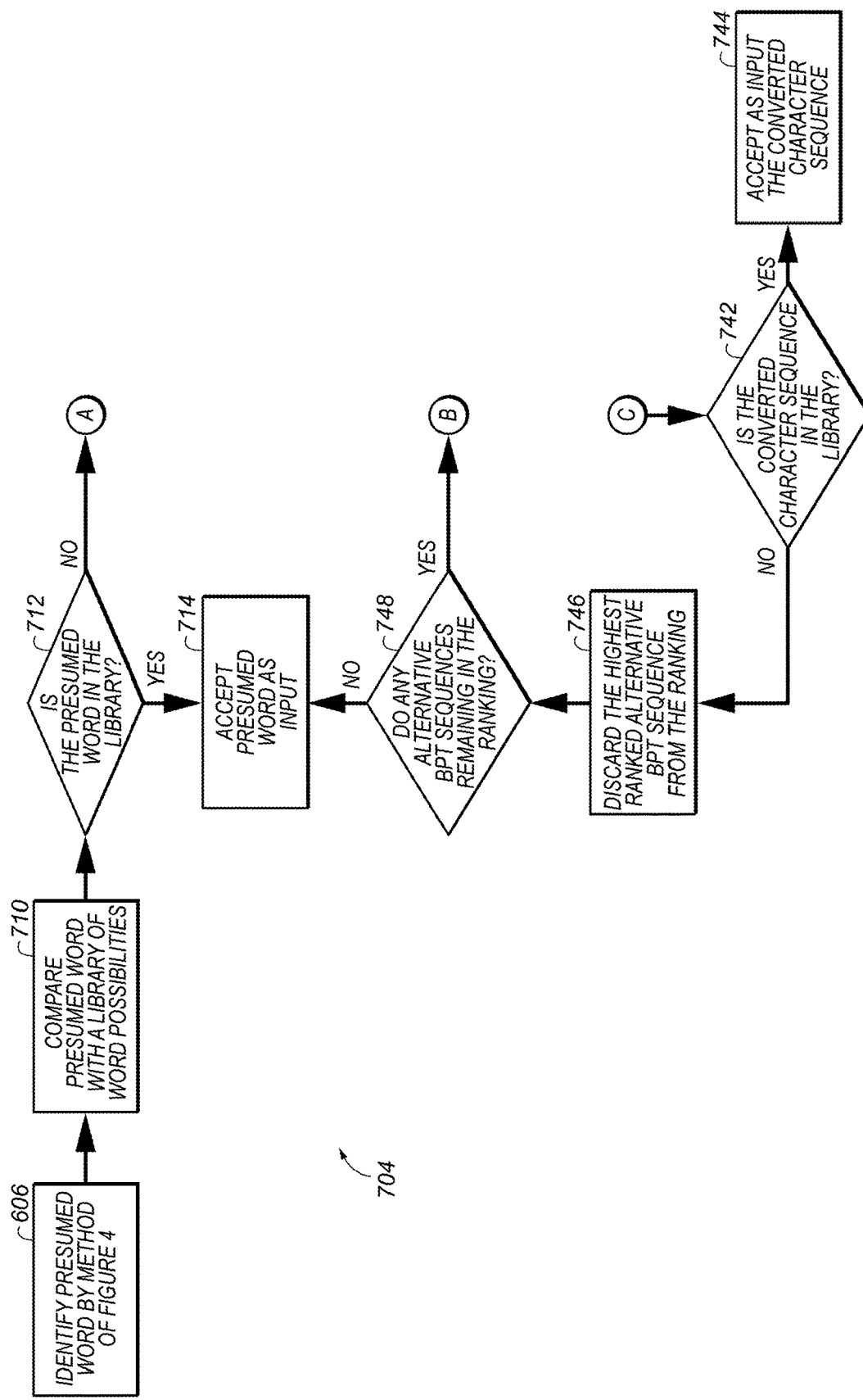
FIGS. 37A and 37B are flow diagrams of yet another method for an electronic device to interpret button presses according to one illustrated embodiment
Figure 37B:
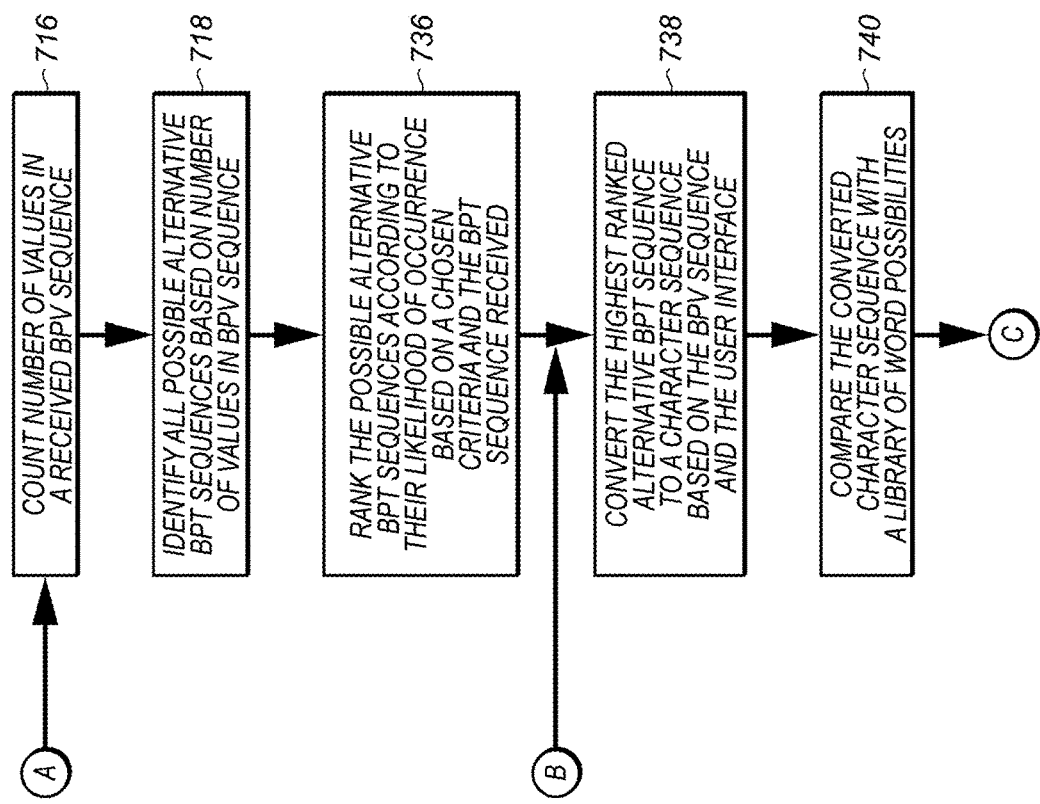

FIGS. 37A and 37B show a method 704 that uses button press types and the ranking 408 of error cases 397 to identify a word from a received sequence of button presses. The method 704 uses the fact that for button press timing errors, some error cases 397 are more likely than others.

The first step of the method 704 of FIGS. 37A and 37B are the method 606 of FIGS. 4A and 4B. In the method 606 of FIGS. 4A and 4B, the CPU 108 interprets received button presses and from them constructs the character sequence 388. When used within the method 704 of FIGS. 37A and 37B, the constructed character sequence 388 is the presumed word 134.

In the next step 710 of the method 704, the CPU 108 compares the presumed word 134 with a library 136 of word possibilities. In the next step 712, the CPU 108 determines whether the presumed word 134 is found in the library 136 or not.

If the presumed word 134 is in the library 136, then in the next step 714 the CPU 108 accepts the presumed word as input.

If, however, the presumed word 134 is not in the library 136, then in the next step 716, the CPU 108 determines the number of values 202 in the BPV sequence 380. In one embodiment, the CPU 108 refers to the number of button presses 392 to determine the number of values 202 in the BPV sequence 380.

In the next step 718, the CPU 108 identifies the possible alternative BPT sequences 420. The possible alternative BPT sequences 420 are possible combinations of BPTs 224 with a number of button presses equal to the number of values 202 in the BPV sequence 380, excluding the received BPT sequence 382.

In a next step 736, the CPU 108 assembles the identified alternative BPT sequences 420 into a plurality of ranked alternative BPT sequences 425. The CPU 108 orders the alternative BPT sequences 420 based on the received BPT sequence 382 and a ranking criteria. In one embodiment, the ranking criteria is the number of individual BPT errors required to create a received BPT sequence 382 from an intended alternative BPT sequence and/or the likelihood of each required individual BPT error occurring. In a further embodiment, the ranked likelihood of each required individual BPT error occurring is the ranking 408 of FIG. 32.

In a next step 738, the CPU 108 converts the highest ranked alternative BPT sequence 420 to the alternative character sequence 445 based on the BPV sequence 380 and the characters 200 and menu positions 242 of the user interface 150.

In a next step 740, the CPU 108 compares the alternative character sequence 445 with the library 136 of word possibilities. Next, in a step 742 the CPU 108 determines whether the alternative character sequence 445 is found in the library 136 of word possibilities. If the alternative character sequence 445 is found in the library 136, then in a step 744 the CPU 108 accepts the alternative character sequence 445 as input. If the alternative character sequence 445 is not in the library 136, in a next step 746 the CPU 108 discards the highest ranked alternative BPT sequence 420 from the plurality of ranked alternative BPT sequences 425.

In a next step 748, the CPU 108 determines if any alternative BPT sequences 420 remain among the plurality of ranked alternative character BPT sequences 425. If at least one alternative BPT sequence 420 remains, the CPU 108 converts the next highest ranked alternative BPT sequence 420 to an alternative character sequence 445 and the method 704 executes another loop. If in the step 748 no alternative BPT sequences 420 remain, then in the step 714 the CPU 108 accepts the presumed word 134 as input.

Figure 38:
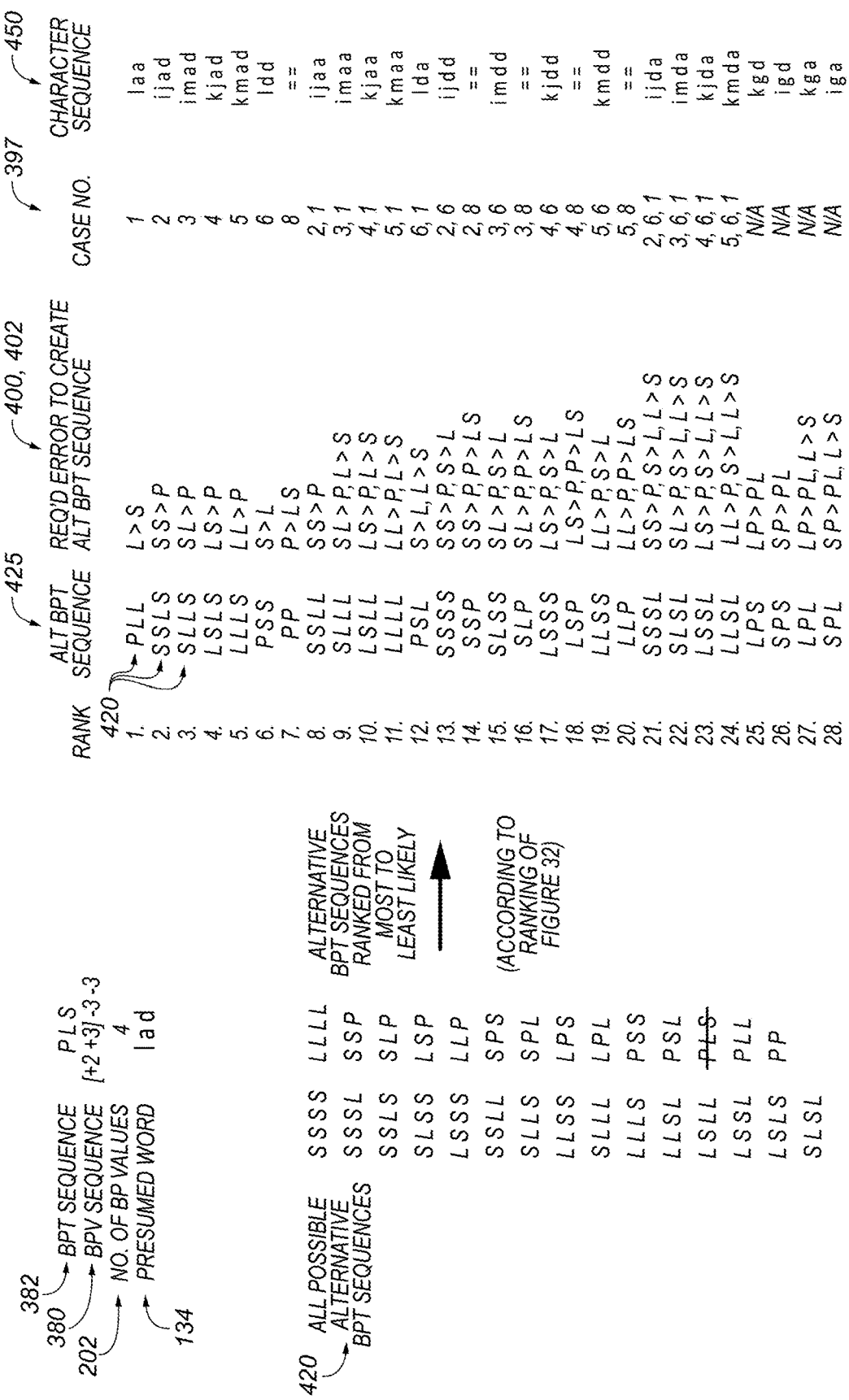
FIGS. 38 and 39 are examples of an application of yet another method of character identification according to one illustrated embodiment.
Figure 39:
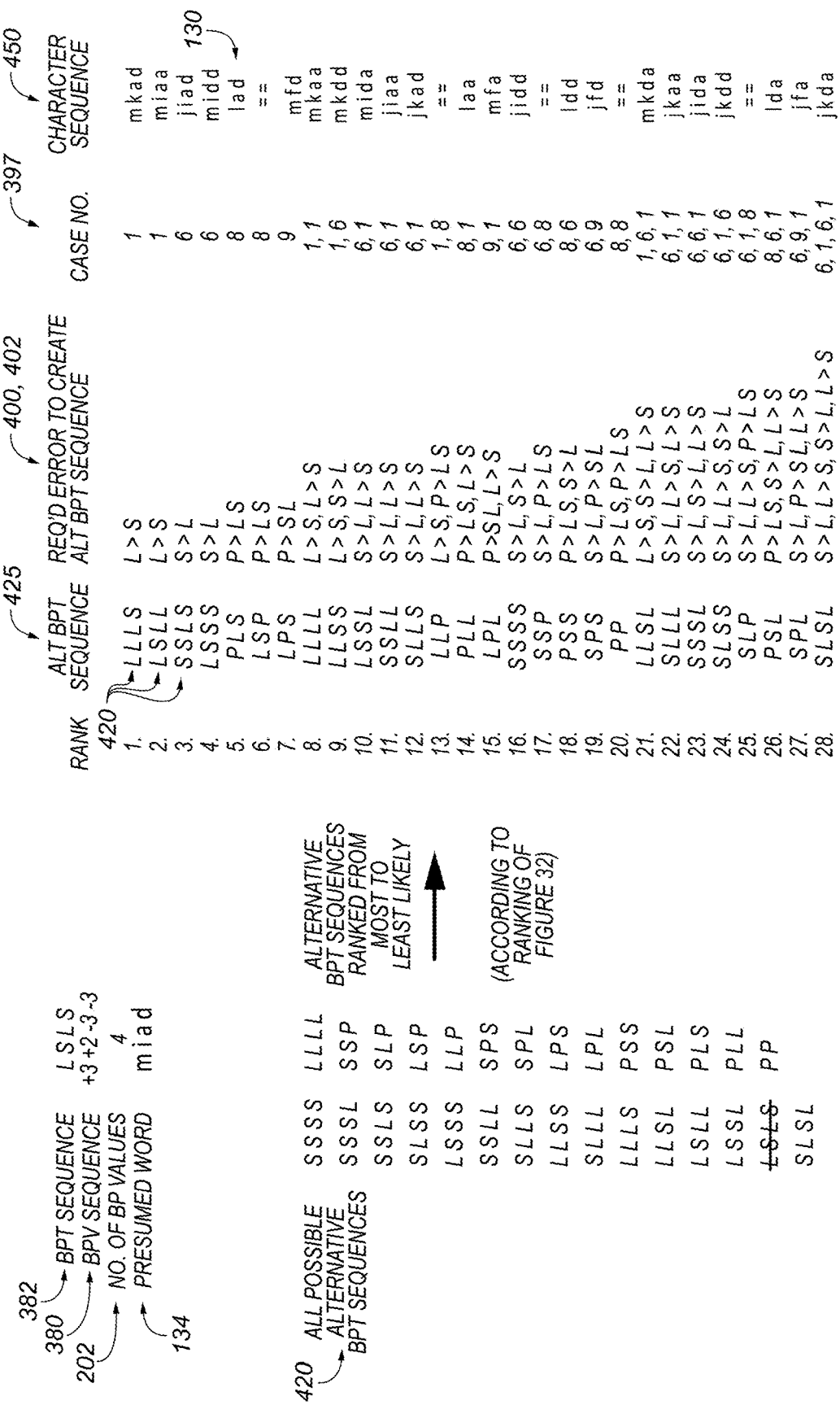

FIGS. 38 and 39 each show an example of the method 704 of FIGS. 37A and 37B that interprets a received sequence of button presses. In these examples, the method 704 identifies the word 'lad'. The examples take values for several of the variables from the example of FIG. 24.

For the example of FIG. 38, the received BPV sequence 380 is '+2 +3 −3 −3'. The received BPT sequence 382 is 'pair-long-short'. The first step 606 of the method 704 of FIGS. 37A and 37B yields the total BPV sequence 386 '+5 −6 −3' (not shown) and then the presumed word 134 'lad'. The step 716 of the method 704 yields the number of values in BPV sequence 202, which is 4. The step 718 of the method 704 yields the possible alternative BPT sequences 420, of which there are 28.

The step 736 of the method 704 yields the plurality of ranked alternative BPT sequences 425. The individual BPT sequences 420 are ranked by case 397 from most to least likely using the ranking criteria of FIG. 32. The individual BPT error 400, 402 required to create the BPT sequence 382 'pair-long-short' from each alternative BPT sequence 420 is also shown.

The step 738 yields the character sequences 450. The step 738 yields one character sequence 450 per executed cycle of the method 704. The character sequences 450 are yielded in the same order as the plurality of ranked alternative BPT sequences 425 from which the character sequences 450 derive.

Steps 740-748 compare one-by-one the character sequences 450 with the library 136 of word possibilities. The method discards the next highest ranked alternative BPT sequence 420 for each cycle of the method 704 until either a match is found or no alternative BPT sequences remain in the plurality of ranked alternative BPT sequences 425. For the example of FIG. 38, no sensible word alternatives exist, which means no match in the library 136 is found; therefore in the step 714 the presumed word 134 'lad' is interpreted as input.

For the example of FIG. 39, the received BPV sequence 380 is '+3 +2 −3 −3'. The received BPT sequence 382 is 'long-short-long-short'. The first step 606 of the method 704 of FIGS. 37A and 37B yields the total BPV sequence 386 '+6 +2 −6 −3' (not shown) and then the presumed word 134 'miad'. The step 716 of the method 704 yields the number of values in BPV sequence 202, which is 4. The step 718 of the method 704 yields the possible alternative BPT sequences 420, of which there are 28.

The step 736 of the method 704 yields the plurality of ranked alternative BPT sequences 425. The individual BPT sequences 420 are ranked by case 397 from most to least likely using the ranking criteria of FIG. 32. The individual BPT error 400, 402 required to create the BPT sequence 382 'long-short-long-short' from each alternative BPT sequence 420 is also shown.

The step 738 yields the character sequences 450. The step 738 yields one character sequence 450 per executed cycle of the method 704. The character sequences 450 are yielded in the same order as the plurality of ranked alternative BPT sequences 425 from which the character sequences 450 derive.

Steps 740-748 compare one-by-one the character sequences 450 with the library 136 of word possibilities. The method discards the next highest ranked alternative BPT sequence 420 for each cycle of the method 704 until either a match is found or no alternative BPT sequences remain in the plurality of ranked alternative BPT sequences 425. For the example of FIG. 39, the presumed word 134 'miad' is not known, therefore in the step 712 the method 704 decides 'no'. In step 740 of the fifth iteration of steps 738-748, the character sequence 388 'l a d' matches with the word 'lad' in the library 136 of word possibilities. In the step 744 for the method 704 terminates and the identified word 130 'lad' is accepted as input.

Figure 40:
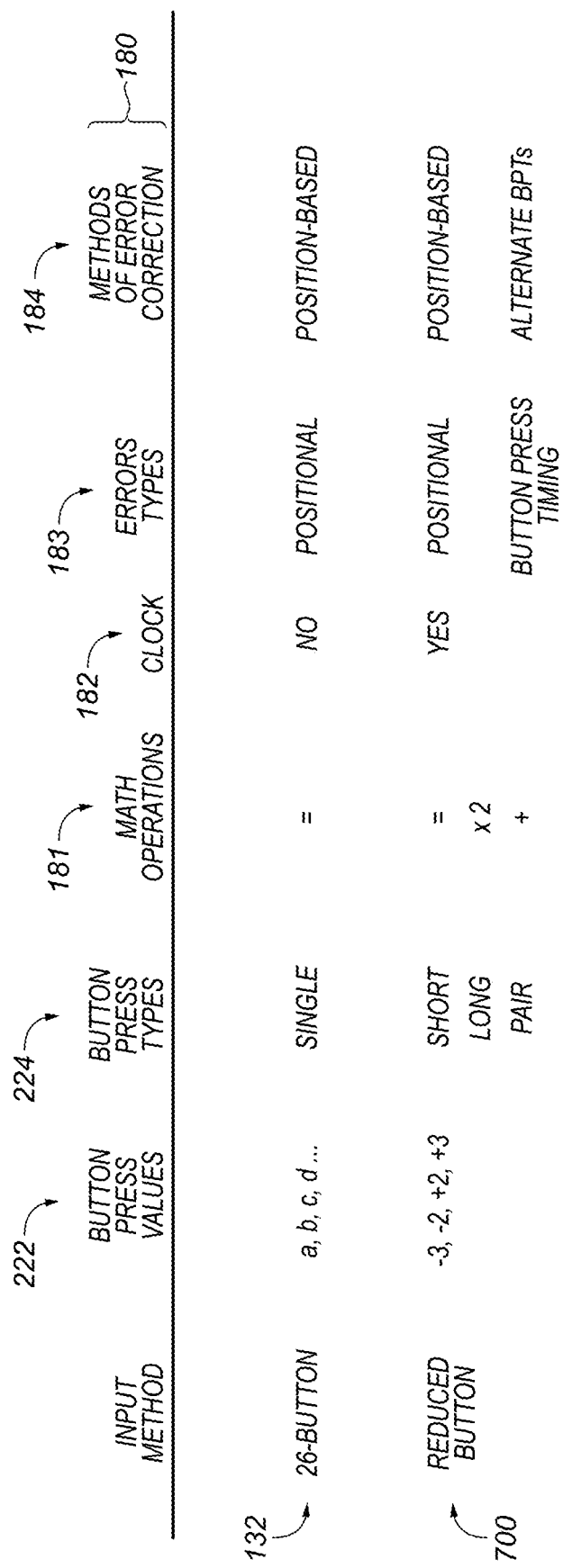
FIG. 40 is a table of characteristics of a method to interpret button presses according to one illustrated embodiment.

FIG. 40 is a table that compares example values of various characteristics 180 of the 26-button character entry method 132 with those of the reduced button method 700 of FIG. 19. The characteristics 180 compared are the variable 'button press values' 222, the variable 'button press types' 224, math operations 181, an elapsed time clock 182, error types 183, and methods of error correction 184.

For the 26-button method 132, typical values for the variable 'button press values' 222 are the characters themselves: 'a, b, c, d, e, f . . . '. For the reduced button method 700, typical values for the variable 'button press types' 224 are numerical values: '−3, −2, +2, +3'. The 26-button method has only one value for the variable 'button press types' 224: 'single'. The reduced button method 700 has three 'button press types' 224: 'short BPT' 340, 'long BPT' 345 and 'pair BPT' 350. The 26-button method has only one math operation: 'equals'. The reduced button method 700 has three math operations 181: 'equals', 'times 2' and 'sum'. The 26-button method 132 has no clock and is time-independent, while the reduced button method 700 has an elapsed time counter 140 and is time-dependent. The 26-button method has one error type 183: 'positional errors'. The reduced button method 700 has two error types 183: 'positional errors' and 'button press timing errors'. The 26-button method has one method of error correction 184: 'position-based correction'. The reduced button method 700 has two methods of error correction 184: 'position-based correction' and 'button press type (BPT) error analysis'.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer processor-implemented method comprising:
   receiving, by at least one computer processor, input resulting from actuation of a plurality of buttons;
   interpreting, by at least one computer processor, a sequence of button press values and a sequence of button press types from the received input, wherein the button press types of the interpreted sequence of button press types are short, long and pair presses;
   based on the received input, identifying, by at least one computer processor, one or more alternative sequences of button press types that each has a same number of button actuations as the received input; and converting, by at least one computer processor, the one or more alternative sequences of button press types to corresponding one or more alternative sequences of characters according to the interpreted sequence of button press values.

2. The method of claim 1 further comprising:
identifying, by at least one computer processor, a presumed word from the interpreted sequence of button press values and the interpreted sequence of button press types; and
comparing the presumed word with at least one of the one or more corresponding alternative sequences of characters.

3. The method of claim 2 further comprising comparing the presumed word and at least one of the one or more corresponding alternative sequences of characters with a library of known words.

4. The method of claim 2 further comprising accepting, by at least one computer processor, one of the corresponding alternative character sequences as input in place of the presumed word.

5. The method of claim 2 further comprising separating the one or more identified alternative sequences of button press types into at least two categories based on the likelihood of occurrence according to a chosen criteria and the received input.

6. The method of claim 5 wherein the comparing the presumed word with at least one of the one or more corresponding alternative sequences of characters occurs only for the one or more alternative sequences of characters that correspond to alternative sequences of button press types categorized as likely.

7. The method of claim 2 further comprising ranking the one or more identified alternative sequences of button press types based on the likelihood of occurrence according to a chosen criteria and the received input.

8. The method of claim 7 wherein the comparing the presumed word with at least one of the one or more corresponding alternative sequences of characters occurs in the order that the one or more identified alternative sequences of button presses to which each of the one or more alternative sequences of characters correspond are ranked.

9. A system comprising:
at least one computer processor; and
at least one memory coupled to the at least one computer processor, the at least one memory having computer executable instructions stored thereon that, when executed, cause the at least one processor to perform:
interpreting a sequence of button press values and a sequence of button press types from the received input, wherein the button press types of the interpreted sequence of button press types are short, long and pair presses;
based on the received input, identifying one or more alternative sequences of button press types that each has a same number of button actuations as the received input; and
converting the one or more alternative sequences of button press types to corresponding one or more alternative sequences of characters according to the interpreted sequence of button press values.

10. The system of claim 9 wherein the computer executable instructions, when executed, further cause the at least one processor to perform:
identifying a presumed word from the interpreted sequence of button press values and the interpreted sequence of button press types; and
comparing the presumed word with at least one of the one or more corresponding alternative sequences of characters.

11. The system of claim 10 wherein the computer executable instructions, when executed, further cause the at least one processor to perform:
comparing the presumed word and at least one of the one or more corresponding alternative sequences of characters with a library of known words.

12. The system of claim 10 wherein the computer executable instructions, when executed, further cause the at least one processor to perform:
accepting one of the corresponding alternative character sequences as input in place of the presumed word.

13. The system of claim 10 wherein the computer executable instructions, when executed, further cause the at least one processor to perform:
separating the one or more identified alternative sequences of button press types into at least two categories based on the likelihood of occurrence according to a chosen criteria and the received input.

14. The system of claim 13 wherein the comparing the presumed word with at least one of the one or more corresponding alternative sequences of characters occurs only for the one or more alternative sequences of characters that correspond to alternative sequences of button press types categorized as likely.

15. A non-transitory computer-readable medium having computer executable instructions stored thereon that, when executed, cause at least one processor to perform:
interpreting a sequence of button press values and a sequence of button press types from the received input, wherein the button press types of the interpreted sequence of button press types are short, long and pair presses;
based on the received input, identifying one or more alternative sequences of button press types that each has a same number of button actuations as the received input; and
converting the one or more alternative sequences of button press types to corresponding one or more alternative sequences of characters according to the interpreted sequence of button press values.

16. The computer-readable medium of claim 15 wherein the computer executable instructions, when executed, further cause the at least one processor to perform:
identifying a presumed word from the interpreted sequence of button press values and the interpreted sequence of button press types; and
comparing the presumed word with at least one of the one or more corresponding alternative sequences of characters.

17. The computer-readable medium of claim 16 wherein the computer executable instructions, when executed, further cause the at least one processor to perform:
comparing the presumed word and at least one of the one or more corresponding alternative sequences of characters with a library of known words.

18. The computer-readable medium of claim 16 wherein the computer executable instructions, when executed, further cause the at least one processor to perform:
accepting one of the corresponding alternative character sequences as input in place of the presumed word.

19. The computer-readable medium of claim 16 wherein the computer executable instructions, when executed, further cause the at least one processor to perform:

separating the one or more identified alternative sequences of button press types into at least two categories based on the likelihood of occurrence according to a chosen criteria and the received input.

20. The computer-readable medium of claim 19 wherein the comparing the presumed word with at least one of the one or more corresponding alternative sequences of characters occurs only for the one or more alternative sequences of characters that correspond to alternative sequences of button press types categorized as likely.

* * * * *